(12) United States Patent
Page

(10) Patent No.: US 7,499,500 B2
(45) Date of Patent: Mar. 3, 2009

(54) DATA COMMUNICATION SYSTEM, METHOD AND APPARATUS FOR COMMUNICATING A DATA SIGNAL FORMED OF SUCCESSIVE DATA ELEMENTS

(75) Inventor: Michael Page, Oxford (GB)

(73) Assignee: Sony United Kingdom Limited, Weybridge (GB)

( * ) Notice: Subject to any disclaimer, the term of this patent is extended or adjusted under 35 U.S.C. 154(b) by 683 days.

(21) Appl. No.: 10/803,621

(22) Filed: Mar. 18, 2004

(65) Prior Publication Data

US 2004/0234000 A1    Nov. 25, 2004

(30) Foreign Application Priority Data

Mar. 21, 2003    (GB) ................................. 0306602.4

(51) Int. Cl.
*H04L 27/00* (2006.01)
*H03K 9/00* (2006.01)

(52) U.S. Cl. ......................... 375/295; 375/316; 375/324

(58) Field of Classification Search ................. 375/354, 375/355, 356, 365, 316, 324, 295
See application file for complete search history.

(56) References Cited

U.S. PATENT DOCUMENTS

2005/0078683 A1*    4/2005    Page ........................ 370/395.5
2005/0213693 A1*    9/2005    Page ........................... 375/354

FOREIGN PATENT DOCUMENTS

| EP | 0 368 549 A2 | 5/1990 |
| GB | 2 187 364 | 9/1987 |
| GB | 2 342 015 | 3/2000 |

OTHER PUBLICATIONS http://www.sonyoxford.co.uk/pub/dmap/download/mac-dsd-prot-spec-v1-1.pdf, "MAC-DSD Multi-channel Audio Connection for DSD", Michael Page, version 1.1, Jan. 11, 2002.
Patent Abstracts of Japan, JP 59-107673, Jun. 21, 1984.

* cited by examiner

*Primary Examiner*—Chieh M Fan
*Assistant Examiner*—Jason M. Perilla
(74) *Attorney, Agent, or Firm*—Oblon, Spivak, McClelland, Maier & Neustadt, P.C.

(57) ABSTRACT

A data communications system for communicating a data signal formed of successive data elements, said system comprising a transmission node; a reception node; and a link providing a data connection from said transmission node to said reception node; in which: said transmission node comprises a clock signal transmitter for transmitting a synchronisation clocking signal to said reception node via said link, said synchronisation clocking signal having synchronising features occurring at a frequency lower than a data element rate; an assembler for assembling elements of said data signal into data frames, each data frame having a plurality of successive data elements of said data signal, for transmission to said reception node via said link, said assembler being responsive to said synchronisation clocking signal so as to set a synchronisation flag associated with a data element having a first predetermined temporal relationship with a synchronising feature of said synchronisation clocking signal; and said reception node comprises: a detector detecting a synchronising feature of said synchronisation clocking signal received from said transmission node; a disassembler for disassembling received data frames to regenerate said data signal, said disassembler being operable to detect a data element associated with a set synchronisation flag; an output unit for outputting a data element associated with a set synchronisation flag at a second predetermined temporal relationship with respect to said synchronising feature of said received synchronisation clocking signal; said first and second predetermined temporal relationships being arranged so that a predetermined system latency exists between input of a data element to said transmission node and subsequent output of that data element by said reception node.

21 Claims, 55 Drawing Sheets

| PRE-AMBLE | DEST. MAC ADDRESS | SOURCE MAC ADDRESS | DATA LENGTH | NETWOR-KING HEADERS | RESER-VED FIELD | FRAME TYPE | AUDIO DATA PAYLOAD | CRC |
|---|---|---|---|---|---|---|---|---|
| 8 Bytes | 6 Bytes | 6 Bytes | 2 Bytes | 28 Bytes | 12 Bitss | 4 Bits | 1480 Bytes | 4 Bytes |

AUDIO DATA FRAME

FIGURE 17

AUDIO DATA FRAME

| Word | B31-B28 | B27-B24 | B23-B20 | B19-B16 | B15-B12 | B11-B8 | B7-B4 | B3-B0 |
|---|---|---|---|---|---|---|---|---|
| 0 | 5h | 5h | 5h | 5h | 5h | 5h | 5h | 5h |
| 1 | Dh | 5h | 5h | 5h | 5h | 5h | 5h | 5h |
| 2 | Reserved for destination MAC address ||||||||
| 3 | Reserved for source MAC address | | | | Reserved for dest. MAC address ||||
| 4 | Reserved for source MAC address ||||||||
| 5 | | | | | | | Length - always 1510 bytes (0x5E6) ||
| 6 | Reserved for networking headers ||||||||
| 7 | ||||||||
| 8 | ||||||||
| 9 | ||||||||
| 10 | ||||||||
| 11 | ||||||||
| 12 | reserved | reserved | reserved | frame type |||||
| 13-382 | 370 samples 32-channel DSD audio ||||||||
| 383 | CRC ||||||||

FIGURE 18A

| Word | B31-B28 | B27-B24 | B23-B20 | B19-B16 | B15-B12 | B11-B8 | B7-B4 | B3-B0 |
|---|---|---|---|---|---|---|---|---|
| 0 | 5h | 5h | 5h | 5h | 5h | 5h | 5h | 5h |
| 1 | Dh | 5h | 5h | 5h | 5h | 5h | 5h | 5h |
| 2 | Reserved for destination MAC address ||||||||
| 3 | Reserved for source MAC address | | | | Reserved for destination MAC address ||||
| 4 | Reserved for source MAC address ||||||||
| 5 | IP Type of Service | | IP Hdr Lnth | IP Version | Length – 1446 bytes (0x05A6) ||||
| 6 | IP Datagram ID ||||  IP Flgs | IP Datagram Length |||
| 7 | IP Protocol | | IP TTL | | IP Fragment Offset ||||
| 8 | Source IP Address (low 16) |||| IP Header Checksum ||||
| 9 | Destination IP Address (low 16) |||| Source IP Address (high 16) ||||
| 10 | IP Options (low 16) |||| Destination IP Address (high 16) ||||
| 11 | UDP Source Port |||| IP Header Padding | | IP Options (high 8) ||
| 12 | UDP Length |||| UDP Destination Port ||||
| 13 | Frame format ID (0) |||||||| 
| 14 | Frame format ID (2) |||| Frame format ID (1) ||||
| 15-366 | 1408-byte frame payload (352 DSD samples, 24 channels, plus 88 bytes aux data) ||||||||
| 367 | CRC ||||||||

Fig 18B

CONTROL DATA FRAME

| Word | B31-B28 | B27-B24 | B23-B20 | B19-B16 | B15-B12 | B11-B8 | B7-B4 | B3-B0 |
|---|---|---|---|---|---|---|---|---|
| 0 | 5h | 5h | 5h | 5h | 5h | 5h | 5h | 5h |
| 1 | Dh | 5h | 5h | 5h | 5h | 5h | 5h | 5h |
| 2 | Reserved for destination MAC address | | | | | | | |
| 3 | Reserved for source MAC address | | | | Reserved for dest. MAC address | | | |
| 4 | Reserved for source MAC address | | | | | | | |
| 5 | Length | | | | | | | |
| 6 | Reserved for networking headers | | | | | | | |
| 7 | | | | | | | | |
| 8 | | | | | | | | |
| 9 | | | | | | | | |
| 10 | | | | | | | | |
| 11 | | | | | | | | |
| 12 | reserved | reserved | reserved | frame type | | | | |
| 13-24 | 48 bytes control data (of arbitrary format) | | | | | | | |
| 25 | CRC | | | | | | | |

FIGURE 19

| Bits 15:12 | Bits 11:8 | Bits 7:4 | Bits 3:0 |
|---|---|---|---|
| Flags | Frame Type | Protocol Major Ver. | Protocol Minor Ver. |

Fig. 20

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| P5 | P4 | P3 | A1 | P2 | A0 | 24 | 23 | P1 | 22 | 21 | 20 | 19 | 18 | 17 | P0 | 15 | 14 | 13 | 12 | 11 | 10 | 9 | 8 | 7 | 6 | 5 | 4 | 3 | 2 | 1 | |

| Parity bit | Data block elements XNOR'd to generate parity bit | | | | | | | | | | | | | | |
|---|---|---|---|---|---|---|---|---|---|---|---|---|---|---|---|
| P0 | 1 | 2 | 3 | 4 | 5 | 6 | 7 | 8 | 9 | 10 | 11 | 12 | 13 | 14 | 15 |
| P1 | 1 | 2 | 3 | 4 | 5 | 6 | 7 | 8 | 16 | 17 | 18 | 19 | 20 | 21 | 22 |
| P2 | 1 | 2 | 3 | 4 | 9 | 10 | 11 | 12 | 16 | 17 | 18 | 19 | 23 | 24 | A0 |
| P3 | 1 | 2 | 5 | 6 | 9 | 10 | 13 | 14 | 16 | 17 | 20 | 21 | 23 | 24 | A1 |
| P4 | 1 | 3 | 5 | 7 | 9 | 11 | 13 | 15 | 16 | 18 | 20 | 22 | 23 | 24 | A1 |
| P5 | (all elements – global parity bit) | | | | | | | | | | | | | | |

FIGURE 23B

| Syndrome bit | Data block elements XOR'd to generate syndrome bit | | | | | | | | | | | | | | | |
|---|---|---|---|---|---|---|---|---|---|---|---|---|---|---|---|---|
| $s_0$ | 1 | 2 | 3 | 4 | 5 | 6 | 7 | 8 | 9 | 10 | 11 | 12 | 13 | 14 | 15 | P0 |
| $s_1$ | 1 | 2 | 3 | 4 | 5 | 6 | 7 | 8 | 16 | 17 | 18 | 19 | 20 | 21 | 22 | P1 |
| $s_2$ | 1 | 2 | 3 | 4 | 9 | 10 | 11 | 12 | 16 | 17 | 18 | 19 | 23 | 24 | A0 | P2 |
| $s_3$ | 1 | 2 | 5 | 6 | 9 | 10 | 13 | 14 | 16 | 17 | 20 | 21 | 23 | 24 | A1 | P3 |
| $s_4$ | 1 | 3 | 5 | 7 | 9 | 11 | 13 | 15 | 16 | 18 | 20 | 22 | 23 | 24 | A1 | P4 |
| $s_5$ | (all elements including parity bits) | | | | | | | | | | | | | | | |

| Nibble | Bit 3 | Bit 2 | Bit 1 | Bit 0 |
|---|---|---|---|---|
| 0 | B3[0] | B2[0] | B1[0] | B0[0] |
| 1 | B7[0] | B6[0] | B5[0] | B4[0] |
| 2 | B11[0] | B10[0] | B9[0] | B8[0] |
| ... | | | | |
| 7 | B31[0] | B30[0] | B29[0] | B28[0] |
| 8 | B3[1] | B2[1] | B1[1] | B0[1] |
| 9 | B7[1] | B6[1] | B5[1] | B4[1] |
| ... | | | | |
| 254 | B27[31] | B26[31] | B25[31] | B24[31] |
| 255 | B31[31] | B30[31] | B29[31] | B28[31] |
| 256 | B35[0] | B34[0] | B33[0] | B32[0] |
| 257 | B39[0] | B38[0] | B37[0] | B36[0] |
| ... | | | | |
| 2814 | B347[31] | B346[31] | B345[31] | B344[31] |
| 2815 | B351[31] | B350[31] | B349[31] | B348[31] |

Fig 24

| 0 | 3 | 4 | 27 | 28 | | | 31 |
|---|---|---|---|---|---|---|---|
| Preamble | | LSB  24-bit audio sample word  MSB | | V | U | C | P |

Fig 26A

| 0 | | 23 | 24 | | 26 |
|---|---|---|---|---|---|
| LSB | MSB | | U | C | M |

Fig 26B

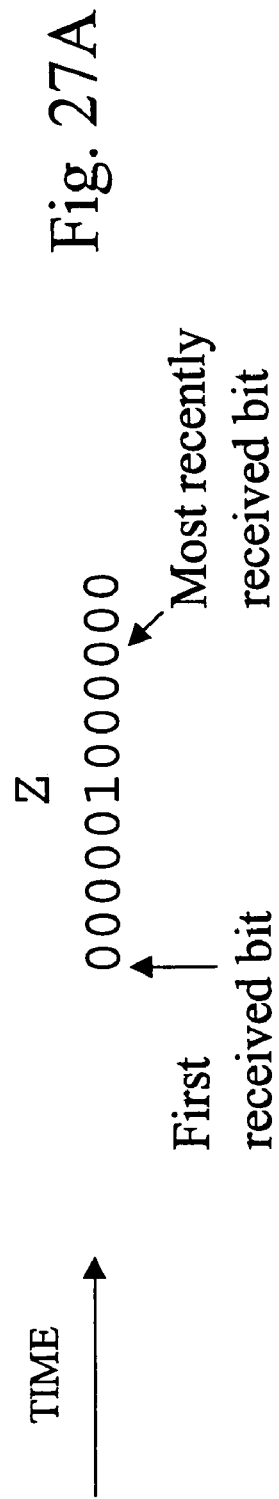

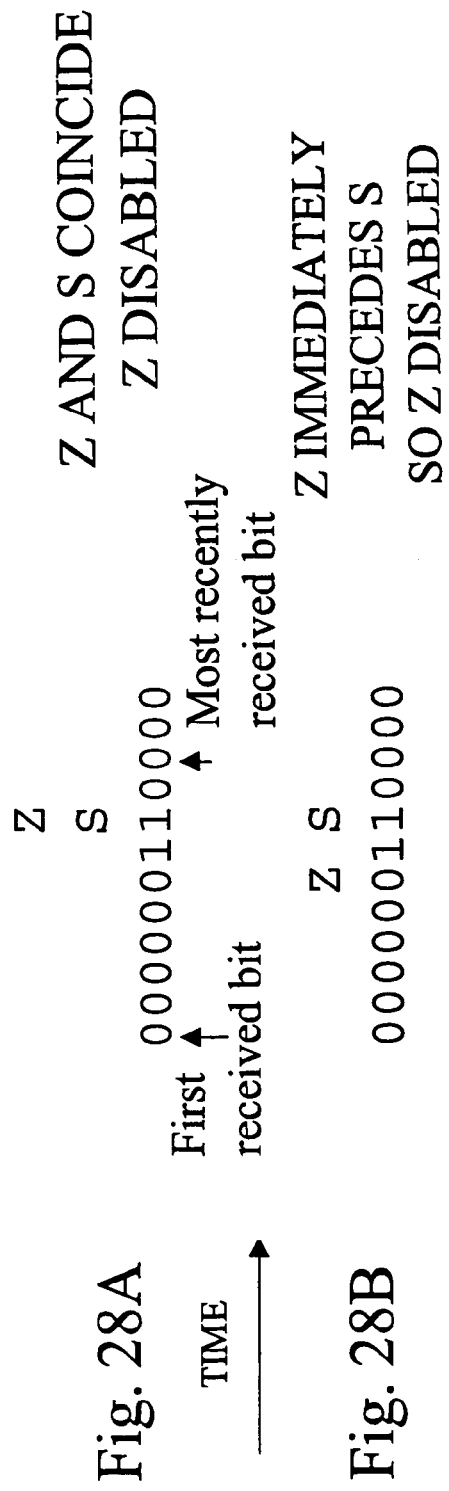

| Type value | Frame format |
|---|---|
| 0x0 | 64fs DSD (as Protocol Spec v1.1) |
| 0x1 | Reserved |
| 0x2 | Reserved |
| 0x3 | Reserved |
| 0x4 | PCM, 4 sample sub-frames |
| 0x5 | PCM, 5 sample sub-frames |
| 0x6 | PCM, 6 sample sub-frames |
| 0x7 | PCM, 7 sample sub-frames |
| 0x8 | PCM, 8 sample sub-frames |
| 0x9 | PCM, 9 sample sub-frames |
| 0xA | PCM, 10 sample sub-frames |
| 0xB | PCM, 11 sample sub-frames |
| 0xC | PCM, 12 sample sub-frames |
| 0xD | PCM, 13 sample sub-frames |
| 0xE | Reserved |
| 0xF | Reserved |

Fig 29

| Flag bit | Name | Description |
|---|---|---|
| 0 | 44.1kHz sync flag | 1: First DSD sample in frame was received at transmitter simultaneously with 44.1kHz sync clock positive edge<br><br>0: First DSD sample in frame was not received at transmitter simultaneously with 44.1kHz sync clock positive edge |
| 1 | fs/n sync flag | 1: First DSD sample in frame was received at transmitter simultaneously with fs/n sync clock positive edge<br><br>0: First DSD sample in frame was not received at transmitter simultaneously with fs/n sync clock positive edge |
| others | (not used) | Set to 0 by transmitter, ignored by receiver |

Fig 30

(Type field = 0x4 through 0xD, PCM)

| Flag bits | Name | Description |
|---|---|---|
| 1:0 | Clock base flag | 00: 44.1kHz (+/-100ppm) audio base clock<br>01: 48kHz (+/-100ppm) audio base clock<br>10: Varispeed (38.5875kHz to 54kHz) audio base clock<br>11: (reserved) |
| 3:2 | Base clock sample rate multiplier | 00: 1x base clock ($f_s$)<br>01: 2x base clock ($2f_s$)<br>10: 4x base clock ($4f_s$)<br>11: 8x base clock ($8f_s$) |

Fig 31

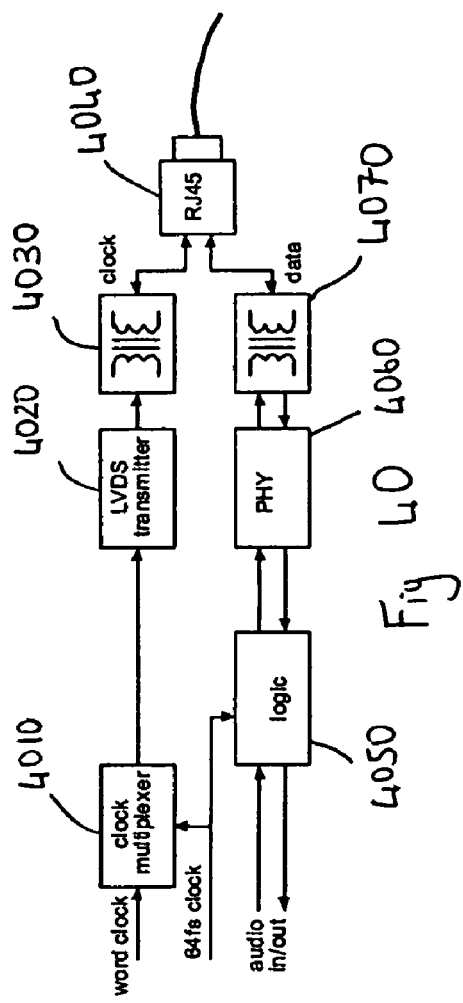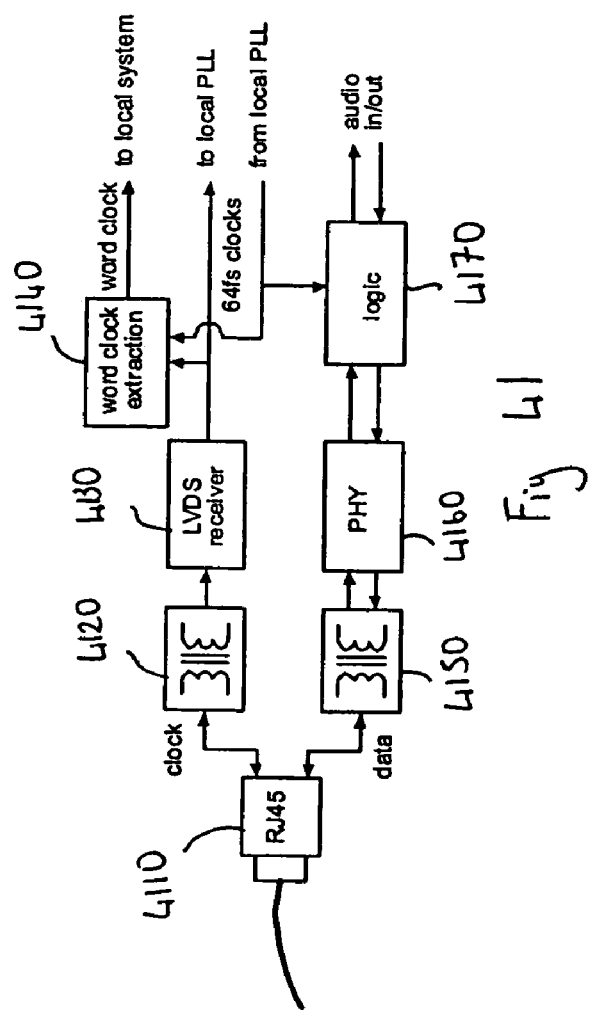

| Octet | Content |
|---|---|
| 0-7 | Preamble and start frame delimiter ($55_{16}$ $55_{16}$ $55_{16}$ $55_{16}$ $55_{16}$ $55_{16}$ $55_{16}$ $D_{16}$) |
| 8-13 | MAC destination address (default = $80_{16}$-$00_{16}$-$00_{16}$-$00_{16}$-$00_{16}$-$00_{16}$) |
| 14-19 | MAC source address (default = $00_{16}$-$00_{16}$-$00_{16}$-$00_{16}$-$00_{16}$-$00_{16}$) |
| 20-21 | Length/Type field ($05_{16}$-$8E_{16}$) |
| 22-24 | LLC header ($AA_{16}$-$AA_{16}$-$03_{16}$) |
| 25-29 | SNAP header (value to be determined) |
| 30-35 | Frame format identification header |
| 36-1443 | Payload |
| 1444-1447 | 32-bit frame CRC (ISO/IEC 8802.3) |

Fig 43

|  | Bits 0:3 | Bits 4:7 |
| --- | --- | --- |
| Octet 30 | Protocol minor version | Protocol major version |
| Octet 31 | Frame Type | Flags |
| Octet 32 | Audio Format | |
| Octet 33 | (reserved) | |
| Octet 34 | (reserved) | |
| Octet 35 | CRC-8 checksum | |

Fig 44A

| Value | Frame type |
|---|---|
| $0_{16}$ | Frame contains bitstream-mode audio |
| $1_{16}$ | Frame contains AES3-compatible mode audio |
| (other) | (reserved – frame shall be disregarded by receiver) |

Fig 44B

| Bit | Flag indication |
|---|---|
| 0 | 0: (no flag) |
| | 1: first sample in frame is associated with an Audio sample synchronisation marker (see section 9.3) |
| 3:1 | (reserved: transmitted as zero, disregarded by receiver) |

Fig 44C

| Bit | Flag indication |
|---|---|
| 0 | 0: (no flag) |
| | 1: first sample in frame is associated with an Audio sample synchronisation marker (see section 9.3) |
| 3:1 | (reserved: transmitted as zero, disregarded by receiver) |

Fig 44D

| Value | Flag indication |
|---|---|
| $61_{16}$ | Frame contains bit-stream audio: 1-bit samples, $64f_s$ sample rate |
| $71_{16}$ | Frame contains bit-stream audio: 1-bit samples, $128f_s$ sample rate |
| (other) | (reserved – frame shall be disregarded by receiver) |

Fig 44E

| Bits | Flag indication |
|---|---|
| 3:0 | Sample word length: (unsigned 4-bit integer, n)<br>sample word length = 4n |
| 5:4 | Sample frequency multiplier:<br>$00_2$: 1x base frequency<br>$01_2$: 2x base frequency<br>$10_2$: 4x base frequency<br>$11_2$: 8x base frequency |
| 6 | Base sample frequency:<br>0: 44,1 kHz<br>1: 48 kHz |
| 7 | Variable sample frequency indicator:<br>0: Maximum sample frequency deviation = 100 ppm<br>1: Maximum sample frequency deviation = 12,5 % |

DATA COMMUNICATION SYSTEM, METHOD AND APPARATUS FOR COMMUNICATING A DATA SIGNAL FORMED OF SUCCESSIVE DATA ELEMENTS

BACKGROUND OF THE INVENTION

1. Field of the Invention

This invention relates to data communication.

An example of a problem in data communication will be described in the context of communicating so-called Direct Stream Digital audio data. However, the present invention is applicable to other types of clocked data, such as multi-bit audio data or video data.

2. Description of the Prior Art

Direct Stream Digital (DSD) is a high-resolution single-bit audio coding system used for the so-called Super Audio CD consumer disc format. DSD was developed with a view to producing audio signals comparable to those reproduced from the best analogue formats. DSD signals can produce a frequency response from DC to 100 kHz and have a dynamic range of greater than 120 dB across the audio band.

DSD makes use of 1-bit digital audio. 1-bit oversampling converters exploit a law of information theory whereby sample width can be traded off against sampling rate to effect conversion at a given resolution. For example a 1-bit converter that oversamples at 16 times the stored sample rate can give results which are equivalent to those obtainable with a 16 bit converter with no oversampling. 1-bit oversampling converters (also known as Sigma-Delta, noise shaping or bit stream converters) measure the difference between successive audio samples rather than representing the actual value of the waveform amplitude. In DSD a significant improvement in reproduced sound quality is achieved by recording a high frequency ($64F_s$) 1-bit signal directly onto a super-audio CD rather than recording a 16-bit signal at frequency $F_s$ onto a CD using pulse code modulation.

DSD systems require a high frequency audio sample clock at 64 Fs=2.8224 MHz whereas the sample clock of standard PCM systems (Fs) is 44.1 kHz. This high frequency sample clock is transmitted along with the data to facilitate accurate signal reconstruction at the receiving end. Furthermore each channel of 64 Fs DSD audio requires a transmission bandwidth of 2.8224 Mbit/s. It is a problem to provide interconnections between large-scale multi-track production equipment for DSD audio such as multi-channel ADC/DACs, DSD mixers and multi-channel DSD recorders both because of the high audio bandwidth required for the audio data interconnection and because of the difficulty of transmitting the high frequency (64 Fs) audio sample clock between devices without compromising the integrity of the signal e.g. due to electromagnetic interference from the audio data signal.

Several known audio networking systems make use of Ethernet to transmit high bandwidth audio-data between a network of audio processing devices. For example the "Magic" system proprietary to Gibson makes use of the Ethernet Media Access Control MAC layer (i.e. physical layer and data link layer) to transmit audio data at a fixed audio sampling frequency of 48 kHz using one Ethernet frame per sample period. The CobraNet audio networking system proprietary to Peak Audio also uses the Ethernet MAC layer to transmit uncompressed digital audio data between networked devices. The CobraNet system uses a 48 kHz sampling rate and allows for transmission of 20-bit and 24-bit audio data. However, none of these known systems provides an interconnection suitable for linking DSD audio devices. This is because Ethernet frame timing is completely unsuitable for transmitting a 2.8224 MHz DSD sample clock.

SUMMARY OF THE INVENTION

This invention provides a data communications system for communicating a data signal formed of successive data elements, the system comprising a transmission node; a reception node; and a link providing a data connection from the transmission node to the reception node;

said transmission node comprising:
(i) a clocking signal transmitter for transmitting a synchronisation clocking signal to said reception node via said link, said synchronisation clocking signal having synchronising features occurring at a frequency lower than a data element rate; and
(ii) an assembler for assembling elements of said data signal into data frames, each data frame having a plurality of successive data elements of said data signal, for transmission to said reception node via said link, said assembler being responsive to said synchronisation clocking signal so as to set a synchronisation flag associated with a data element having a first predetermined temporal relationship with a synchronising feature of said synchronisation clocking signal;

and said reception node comprising:
(i) a detector for detecting a synchronising feature of said synchronisation clocking signal received from said transmission node;
(ii) a disassembler for disassembling received data frames to regenerate said data signal, said disassembling means being operable to detect a data element associated with a set synchronisation flag;
(iii) an output unit for outputting a data element associated with a set synchronisation flag at a second predetermined temporal relationship with respect to said synchronising feature of said received synchronisation clocking signal;

said first and second predetermined temporal relationships being arranged so that a predetermined system latency exists between input of a data element to said transmission node and subsequent output of that data element by said reception node.

The present invention use the physical layer of a link (e.g. an Ethernet link) to provide a data communication system for transmission of clocked digital data such as DSD data. Note that the present invention is also applicable to bit stream audio data other than DSD data such as one-bit, delta-sigma modulated audio data at a variety of sample rates or floating point data formats. The advantages of using the physical layer of Ethernet for such data transmission are that it offers a large bandwidth, has proven electromagnetic compatibility and has error detection functionality (cyclic redundancy checks) already in place. Use of the physical layer makes the logic easy to design and implement. There is no need to be concerned with hardware addressing and implementation of windowing protocols as would likely be required if the audio data were encoded using higher layer (e.g. MAC layer) technology. Furthermore at the physical layer level, Ethernet data transmission is robust and spectrum controlled so that electromagnetic emissions are low. The invention provides an elegantly simple and convenient way of synchronising the two ends of such a link which is applicable to the transmission of one-bit or multi-bit data.

The invention also provides a transmission node for use in a data communications system for communicating a data signal formed of successive data elements having a reception node; and a link providing a data connection from said transmission node to said reception node;

said transmission node comprising:
(i) a clocking signal transmitter for transmitting a synchronisation clocking signal to said reception node via said link, said synchronisation clocking signal having synchronising features occurring at a frequency lower than a data element rate; and
(ii) an assembler for assembling elements of said data signal into data frames, each data frame having a plurality of successive data elements of said data signal, for transmission to said reception node via said link, said assembler being responsive to said synchronisation clocking signal so as to set a synchronisation flag associated with a data element having a first predetermined temporal relationship with a synchronising feature of said synchronisation clocking signal.

The invention also provides a reception node for use in a data communications system for communicating a data signal formed of successive data elements having a transmission node and a link providing a data connection from said transmission node to said reception node;

said reception node comprising:
(i) a detector for detecting a synchronising feature of said synchronisation clocking signal received from said transmission node, said synchronisation clocking signal having synchronising features occurring at a frequency lower than a data element rate;
(ii) a disassembler means for disassembling received data frames to regenerate said data signal, said disassembling means being operable to detect a data element associated with a set synchronisation flag;
(iii) an output unit for outputting a data element associated with a set synchronisation flag at a second predetermined temporal relationship with respect to said synchronising feature of said received synchronisation clocking signal.

The invention also provides a data communications method for communicating a data signal formed of successive data elements, the system comprising a transmission node; a reception node; and a link providing a data connection from the transmission node to the reception node; the method comprising the steps of:

the transmission node:
i. transmitting a synchronisation clocking signal to said reception node via said link, said synchronisation clocking signal having synchronising features occurring at a frequency lower than a data element rate;
ii. assembling elements of said data signal into data frames, each data frame having a plurality of successive data elements of said data signal, for transmission to said reception node via said link, said assembling step being responsive to said synchronisation clocking signal so as to set a synchronisation flag associated with a data element having a first predetermined temporal relationship with a synchronising feature of said synchronisation clocking signal;

and said reception node:
i. detecting a synchronising feature of said synchronisation clocking signal received from said transmission node;
ii. disassembling received data frames to regenerate said data signal, said disassembling step being operable to detect a data element associated with a set synchronisation flag; and
iii. outputting a data element associated with a set synchronisation flag at a second predetermined temporal relationship with respect to said synchronising feature of said received synchronisation clocking signal;

said first and second predetermined temporal relationships being arranged so that a predetermined system latency exists between input of a data element to said transmission node and subsequent output of that data element by said reception node.

The invention also provides a method of operation of a transmission node for use in a data communications system for communicating a data signal formed of successive data elements having a reception node; and a link providing a data connection from said transmission node to said reception node;

said method comprising the steps of:
(i) transmitting a synchronisation clocking signal to said reception node via said link, said synchronisation clocking signal having synchronising features occurring at a frequency lower than a data element rate; and
(ii) assembling elements of said data signal into data frames, each data frame having a plurality of successive data elements of said data signal, for transmission to said reception node via said link, said assembling step being responsive to said synchronisation clocking signal so as to set a synchronisation flag associated with a data element having a first predetermined temporal relationship with a synchronising feature of said synchronisation clocking signal.

The invention also provides a method of operation of a reception node for use in a data communications system for communicating a data signal formed of successive data elements having a transmission node and a link providing a data connection from said transmission node to said reception node;

said method comprising the steps of:
(i) detecting a synchronising feature of said synchronisation clocking signal received from said transmission node, said synchronisation clocking signal having synchronising features occurring at a frequency lower than a data element rate;
(ii) disassembling received data frames to regenerate said data signal, said disassembling step being operable to detect a data element associated with a set synchronisation flag; and
(iii) outputting a data element associated with a set synchronisation flag at a second predetermined temporal relationship with respect to said synchronising feature of said received synchronisation clocking signal.

Various other respective aspects and features of the invention are defined in the appended claims. Features from the dependent claims may be combined with features of the independent claims as appropriate and not merely as explicitly set out in the claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 17 shows the structure of an audio data frame according to an embodiment of the present invention;

FIG. 18A shows the audio data frame format arranged as 384*4-byte data words;

FIG. 18B schematically illustrates a 24 DSD channel frame format in which each frame comprises 368 data words including 352 DSD samples for 24 channels plus 88 bytes of auxiliary data;

FIG. 19 shows the control data format arranged as 26*4-byte data words;

FIG. 20 schematically illustrates the structure of each of the three 16-bit frame format field sections corresponding to the frame format of FIG. 18B;

FIG. 22 schematically illustrates the format of the 32-bit data block corresponding to the 24 DSD channel frame format of FIG. 18B;

FIG. 23A schematically illustrates how six parity bits P0 to P5 are generated from 24 audio data bits and the two auxiliary data bits;

FIG. 23B schematically illustrates how a syndrome is calculated by performing XNOR operations on the received data elements;

FIG. 24 is a table showing a the composition of a stream of nibbles from the interleaver for the 24 DSD channel frame format of FIG. 18B;

FIG. 26A schematically illustrates the AES3 sub-frame format;

FIG. 26B schematically illustrates the sub-frame format for PCM transmission according to the present technique;

FIGS. 27A to D schematically illustrate how three different indications S, Z and V are multiplexed using the M-bit of FIG. 26B;

FIGS. 28A to E schematically illustrates circumstances in which the S-bit takes precedence over the Z-bit in the M-bit of the sub-frame format according to FIG. 26B;

FIG. 29 is a table 10 defining a frame type value index for a each of a number of different frame formats including frame types having different numbers of PCM samples per frame;

FIG. 30 is a table specifying the information derivable from the flag bits of the frame format of FIG. 18B;

FIG. 31 specifies how values for the two flag bits associated with the base clock are interpreted;

FIG. 40 schematically illustrates an arrangement for audio clock transmission according to a development of the present technique;

FIG. 41 schematically illustrates an arrangement for audio clock reception according to a development of the present technique;

FIG. 43 schematically illustrates an audio data frame format according to the further development of the present technique;

FIGS. 44A to F schematically illustrate frame format identifier contents of the audio frame format of FIG. 43;

FIGS. 46A and B schematically illustrate two different sync sequences of audio stream synchronisation markers;

DESCRIPTION OF THE PREFERRED EMBODIMENTS

As described above, some known audio networking systems use the data link layer of Ethernet for transmission of uncompressed digital audio data at standard sampling frequencies of around 48 kHz. By way of contrast, embodiments of the present invention use the physical layer of Fast Ethernet to provide a point to point connection for transmission of high frequency (2.8224 MHz) digital audio data. The advantages of using the physical layer of Fast Ethernet for audio data transmission are that it offers a large bandwidth, has proven electromagnetic compatibility and has error detection functionality (cyclic redundancy checks) already in place. Use of the physical layer makes the logic easy to design and implement. There is no need to be concerned with hardware addressing and implementation of windowing protocols as would likely be required if the audio data were encoded using higher layer (e.g. MAC layer) technology. Furthermore at the physical layer level, Ethernet data transmission is robust and spectrum controlled so that electromagnetic emissions are low.

In order to explain the principles by which the present embodiments operate, the layered structure of network protocol architectures and the lower layers of the Ethernet architecture will be described in detail below.

Figure 1:
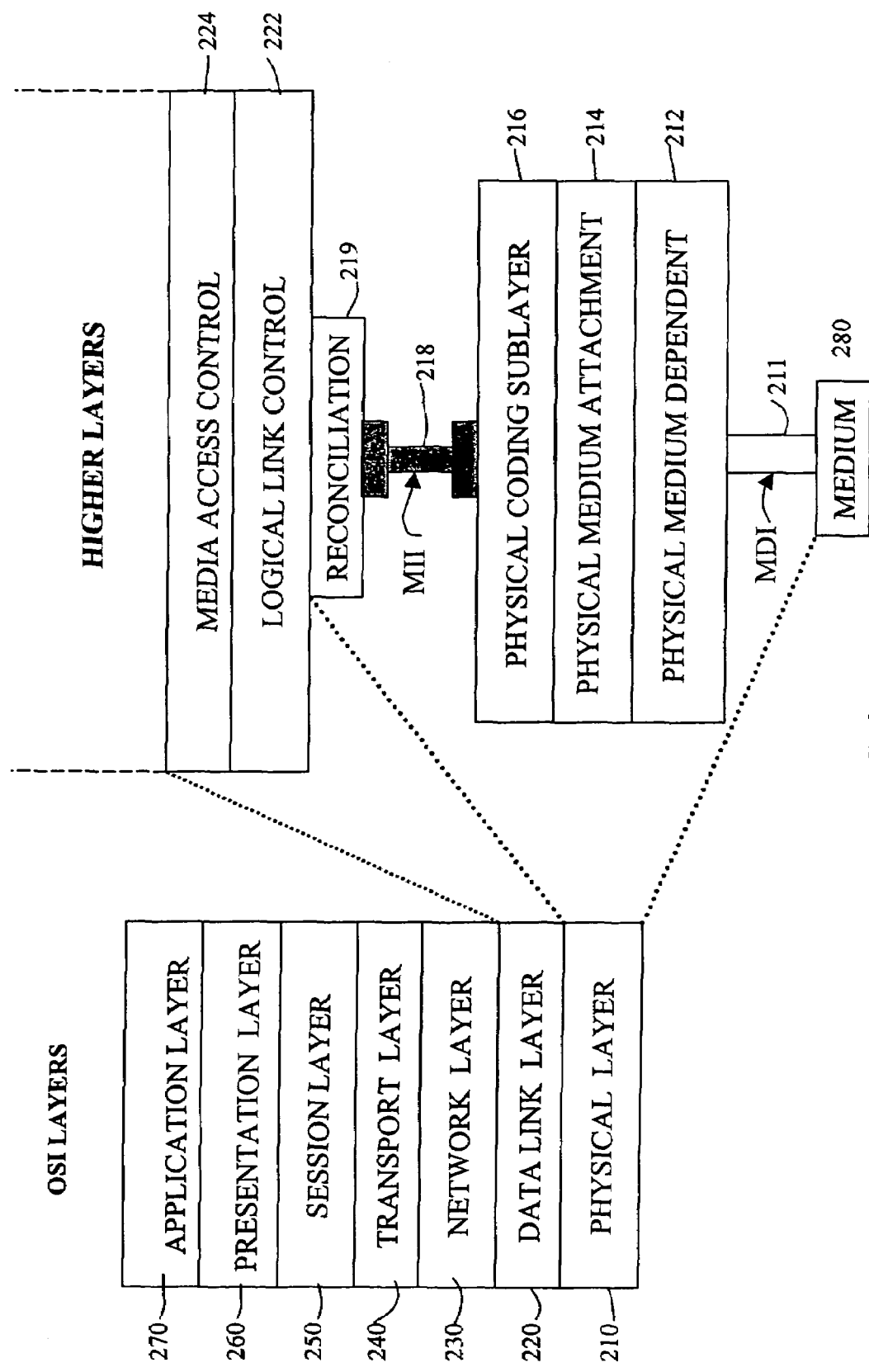
FIG. 1 shows the standard seven-layer Open Systems Interconnection (OSI) model for network protocol architectures and sub-layers of the Ethernet physical layer.

FIG. 1 shows the standard seven-layer Open Systems Interconnection (OSI) model for network protocol architectures. The model comprises an application layer 270, a presentation layer 260, a session layer 250, a transport layer 240, a network layer 230, a data link layer 220, and a physical layer 210.

The application layer 270 provides a user interface, usually in the form of an application program, to a range of distributed information services on the network. The services provided by this layer include file transfer, access and management, as well as general document and message interchange services such as electronic mail.

The presentation layer 260 is concerned with the representation of data during transfer between two communicating application processes. It selects an appropriate transfer syntax to be used during a transaction, so that the structure of the messages being exchanged between two application entities is maintained. The presentation layer 260 also manages data encryption and data compression.

The session layer 250 establishes sessions between communicating applications on communicating network nodes. It may optionally provide interaction management during two-way alternate i.e. half-duplex (rather than two-way simultaneous i.e. full-duplex) data exchange. Further optional features provided by this layer are synchronisation for lengthy network transactions and exception reporting.

The transport layer 240 acts as an interface between the higher application-oriented layers (session 250, presentation 260 and application 270 layers) and the underlying network-dependent protocol layers 210, 220, 230. The transport layer provides the session layer with a defined set of message transfer facilities. It offers a number of classes of services appropriate to different types of network, ranging from class 0 which provides basic connection establishment to class 4 which provides full error control and flow control.

The lowest three layers (network 230, data link 220 and physical layers 210) of the OSI model are all network dependent. The network layer 230 is responsible for establishing and clearing a connection between two transport layer protocol entities and it supports network routing and addressing. The data link layer 220 provides the network layer with a reliable information transfer facility and is responsible for such functions as error detection and message retransmission. Typically both a connectionless and a connection-oriented service is provided. The connectionless service simply discards received frames in which an error is detected whereas a connection-oriented service aims to provide an error-free information transfer facility. Finally, the physical layer 210 provides the data link layer 220 with a means of transmitting a serial bit stream between two pieces of equipment. It converts the data into the stream of electric or analogue pulses that will actually cross the transmission medium and it oversees the transmission of data.

Ethernet is a local area network (LAN) technology, which uses a simple or branching bus-like connection line. The transmission medium in an Ethernet network is formed from one or more continuous lines of cable linked by hubs. Network devices are connected to the cable and they compete for network access using a Carrier Sensing Multiple Access with Collision Detection (CSMA/CD) protocol. According to the CSMA/CD protocol, all client devices monitor the transmission medium and wait until the transmission line is available before transmitting any messages. If two network nodes try to transmit messages at the same time, a collision occurs. The client devices then stop, wait for a random time interval and attempt to transmit again.

Standard Ethernet systems known as 10BASE-T systems provide transmission speeds up to 10 Mega bits per second (Mbps) whereas so-called "Fast Ethernet" (or 100BASE-T) systems provide transmission speeds of up to 100 Mbps. Further higher performance systems are available such as so-called "Gigabit Ethernet". Fast Ethernet uses the same wiring systems, Media Access Control (MAC) method and frame methods as 10BASE-T Ethernet. The embodiments may use any of these systems.

Ethernet systems may use twisted pair cabling or an optical fibre connection. Twisted pair is standard copper wire that is typically used to connect computers to a telephone link. To reduce cross-talk or electromagnetic induction between pairs of wires, two or more insulated wires are twisted around each other. The twisting reduces the effective radiating area of the cable because electromagnetic effects of alternate twists tend to cancel at distances greater than the twist pitch. Each connection on twisted pair requires two wires. If the twisted pair is enclosed by a shield that functions as a ground it is known as shielded twisted pair (STP). Standard twisted pair cabling is known as unshielded twisted pair (UTP).

In Fast Ethernet systems the segment length for twisted pair cable segments is set to a maximum of 100 m to ensure that signal round-trip timing specifications are met. The problem with Fast Ethernet is how to achieve a data transfer rate of 100 Mbit/s over unshielded twisted-pair cable (UTP). In practice there are two standards that can be used to achieve this, one of which (100BASE-4T) uses voice-grade category 3 cable and another (100BASE-X) which uses either high-quality category 5 UTP cable, shielded twisted-pair cable (100BASE-TX) or optical fibre (100BASE-FX). In the 100BASE-X system each type of transmission medium requires a different Physical Medium Dependent (PMD) sublayer. Category 5 UTP comprises 4 signal pairs, two pairs of which are typically utilised for Ethernet i.e. one signal pair for clock transmit and receive and one signal pair for data transmit and receive. This leaves two unused signal pairs.

The sub-layers of the Ethernet physical layer and data link layer are shown alongside the seven layer OSI model.

The data link layer 220 comprises the Media Access Control (MAC) layer 224 and the Logical Link Control (LLC) layer 222. The physical layer comprises a reconciliation sub-layer 219, a Media Independent Interface (MII) 218, a physical coding sub-layer 216, a physical medium attachment sub-layer 214, a physical medium dependent sub-layer 212 and a Medium Dependent Interface (MDI) 211.

The MAC sub-layer 224 performs the two main functions of data encapsulation and media access management. The data encapsulation functionality includes data framing, handling of source and destination addresses and detection of physical medium transmission errors. The medium access management functionality includes medium allocation (collision avoidance) and contention resolution (collision handling).

The MAC sub-layer 224 can operate either in half-duplex mode or in full duplex mode. In half-duplex mode, network nodes contend for use of the physical medium using multiple access (CSMA/CD) algorithms. The full duplex mode allows for simultaneous transmission and reception without interference. For the full duplex mode to be used three conditions must first be satisfied. Firstly, the physical medium must be capable of supporting simultaneous transmission and reception without interference. Secondly there must be exactly two nodes on the local area network so that the physical medium is treated as a full duplex point-to-point link between the nodes. The use of CSMA/CD algorithms is unnecessary in this full duplex case because there is no contention for use of a shared medium. The third condition is that both network nodes must be configured to use full duplex operation.

The Logical Link Control (LLC) layer 222 performs error-checking functions on data frames and manages links between communicating network nodes.

The Reconciliation 219 sublayer maps the signal set provided at the Media Independent Interface 218 to the Physical Coding Sublayer 216.

The Physical Coding Sub-layer (PCS) 216 provides a uniform interface to the Reconciliation sub-layer for all 100BASE-TX physical layer entity (PHY) implementations. The PCS 216 provides all services required by the MII including: encoding of MII 4-bit "data nibbles" to 5-bit code groups (and also decoding from 5-bit to data nibbles); generation of carrier sense and collision detect indications; serialisation of code-groups for transmission on the underlying PMA sub-layer 214 (and de-serialisation of code groups on reception from the PMA 214); and mapping of transmit, receive, carrier sense and collision detection between the MII 218 and the underlying PMA 214.

The Physical Medium Attachment (PMA) sub-layer 214 provides a medium-independent means for the PCS to support the use of a range of physical media. The 100BASE-TX PMA performs the functions of: mapping of transmit and receive code-bits between the underlying Physical Medium Dependent (PMD) sub-layer 212 and the PCS 216; and generating a control signal indicating the availability of the PMD 212 to a PCS 216. The PMA sub-layer 214 may optionally: generate indications of carrier errors from the underlying PMD sub-layer 212; sense receive channel failures; and transmit far-end fault indications.

The PMD sub-layer 212 is effectively a set of signaling standards that define 125 Mbit/s full duplex signaling systems, which accommodate multi-mode optical fibre (F), shielded twisted pair (STP) and unshielded twisted pair (UTP) wiring.

The purpose of the Media Independent Interface (MII) 218 is to provide a simple interconnection between the MAC sub-layers 222, 224 and the physical layer entities (PHYs) for data transfer at 10 Mbit/s and 100 Mbit/s. The functionality is identical at both data rates, as are the signal timing relationships. The only difference between 10 Mbit/s and 100 Mbit/s operation is the nominal clock frequency. The MII 218 is used to provide media independence for various forms of unshielded twisted-pair wiring, shielded twisted-pair wiring, fibre optic cabling and potentially other media, so that identical MACs may be used with any of these media. The MII 218 maximises media independence by cleanly separating the Data Link Layer 220 and the Physical Layer 210 of the OSI seven-layer reference model. The data and delimiters of the MII 218 are synchronous to clock references and the MII uses Low Voltage Transistor-Transistor Logic (LVTTL) signal levels compatible with common integrated circuit processes. The MII 218 provides independent 4-bit wide data-transmit and data-receive paths and full duplex operation. Each direction of data transfer is serviced with 7 signals: a 4-bit data bundle, a 1-bit delimiter signal, a 1-bit error signal and a 1-bit clock signal.

Figure 2:
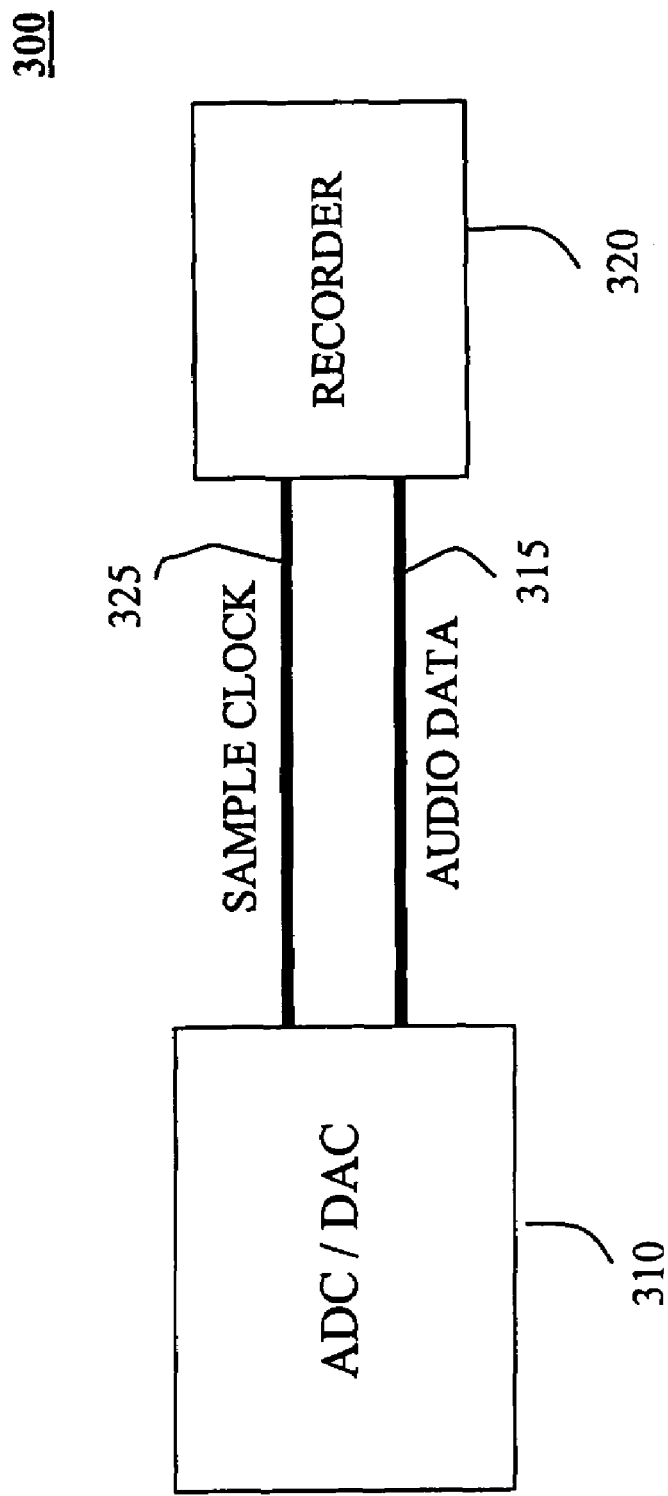
FIG. 2 illustrates a known system for signal transfer in DSD systems.
Figure 3:
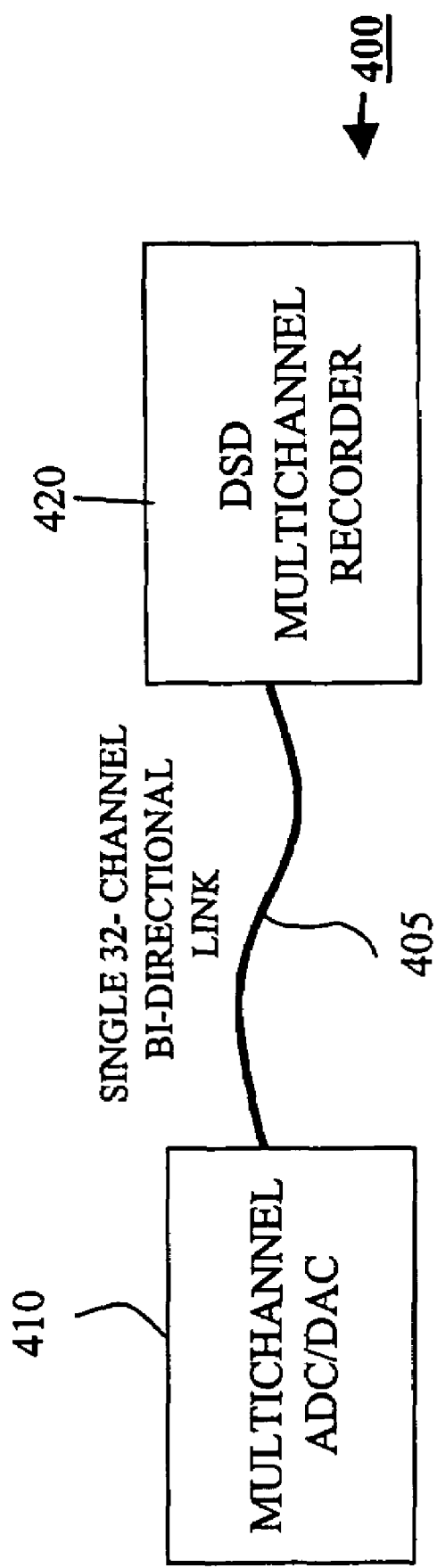
FIG. 3 schematically illustrates a DSD interconnection according to an embodiment of the present invention.

FIG. 2 illustrates a known system for signal transfer in Direct Stream Digital systems. The apparatus 300 comprises an analogue-to-digital/digital-to-analogue (ADC/DAC) converter 310 connected to a DSD multi-channel recorder 320. The connection comprises two separate cables: a first cable 315 is an optical fibre carrying 8 channels (about 22.6 Mbit/s) of DSD audio data and a second cable 325 carries the high frequency sample clock. It is standard studio practice to use separate cables for the audio data and the sample clock FIG. 3 schematically illustrates a DSD interconnection according to an embodiment of the present invention. In this arrangement 400, a single cable 405 is used to connect a multi-channel ACD/DAC 410 to a DSD multi-channel recorder 420. The cable 405 is a category 5 unshielded twisted pair cable. This cable has four signal pairs, two pairs of which are used to transmit and receive audio data, encoded using Ethernet physical layer technology and the remaining two pairs of which are used to convey a DSD sample clock in both directions across the link (see Table 1 below). The clock signal and the audio data signal are conditioned to decrease the likelihood of interference between the two signals degrading the quality of the clock signal. The clock signal is used to synchronise a phase locked loop (PLL) in the receiving device, which in turn may be used as a sample clock for ADCs and DACs. Any jitter on the sample clock is undesirable since it will manifest itself as distortion on the reproduced analogue audio output. The audio signal is intrinsically digital and consequently more robust to degradation than the clock signal. A packet data transmission system such as Ethernet is capable of carrying the DSD audio data. In this particular embodiment, the physical layer of Fast Ethernet (100BASE-TX) is used to provide a channel bit-rate of 100 Mbit/s which accommodates audio data from 32 DSD channels on a single link. In an alternative embodiment the 100 Mbit/s link is used to support 24 DSD channels on a single link.

Ethernet is an asynchronous data link and is thus inherently unsuitable for transmission of the high-integrity, 64 $F_s$ audio clock signal. For this reason the audio sample clock is transmitted on separate signal pairs of the category 5 UTP cable.

The single cable connection in FIG. 3 is fundamentally a point to point link directly connecting the two audio devices. It uses a special "crossover" category 5 cable that is wired to reverse the input/output connections. In this case a custom made crossover cable is required because conventional crossover cables such as those used for office networking do not reverse the two spare signal pair connections used in this embodiment for transmission of the audio sample clock.

Figure 4:
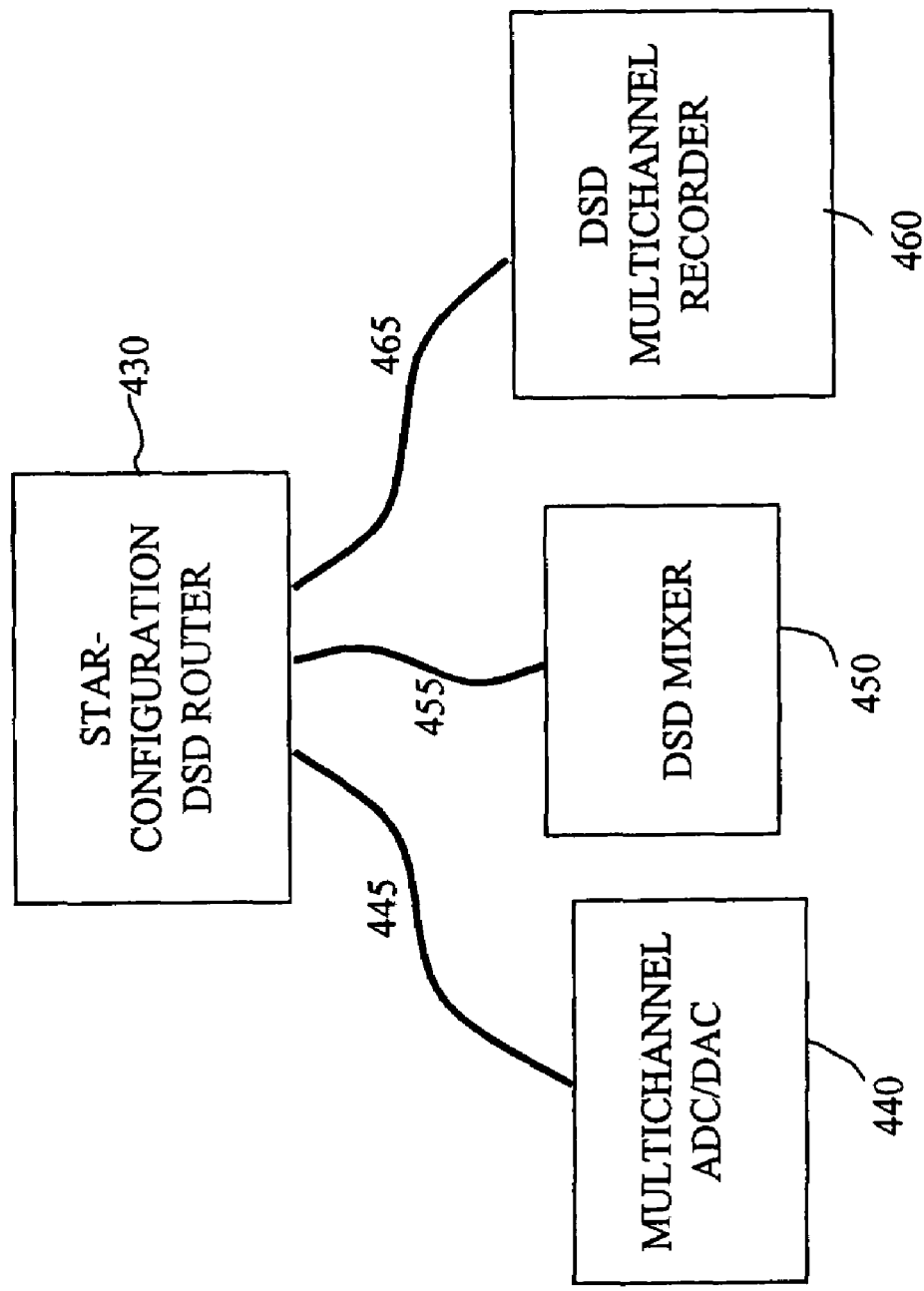
FIG. 4 illustrates a star-configuration interconnection that can be formed between several individual items of DSD equipment.

In alternative embodiments of the invention, such as that illustrated in FIG. 4, more complex interconnections can be formed between several individual items of DSD equipment. The apparatus illustrated in FIG. 4 comprises a star-configuration DSD router 430, a multi-channel ADC/DAC 440, a DSD mixer 450 and a DSD multi-channel recorder 460. Three point-to-point links 445, 455 and 465 are connected together via the central DSD router 430. Unlike the connection of FIG. 3, standard category 5 cable can be used for each of the three connections in this star configuration. This is because the port connections on the router are internally reversed such that signal outputs of one device connect to signal inputs of another device.

The router 430 comprises a number of signal transceivers, each transceiver comprising a data clock transmitter (described below with reference to FIG. 6) and a data and clock receiver (described below with reference to FIG. 7). Switching and routing functions are carried out by a crosspoint switch (not shown) acting on the recovered clock and streamed audio data. In other words, signals are not transferred across the router in packetised form.

The cable 405 linking the transmitter device to the receiver device in FIG. 3 is terminated with 8-terminal RJ45 plugs and both transmitter and receiver devices are fitted with RJ45 sockets. The table below specifies the setting of the RJ45 socket terminal connections for the audio devices of FIG. 3 and for the star-configuration router devices of FIG. 4.

TABLE 1

| Pin number | Function (audio device) | Function (star-configuration router) |
| --- | --- | --- |
| 1 | Data transmit + | Data receive + |
| 2 | Data transmit − | Data receive − |
| 3 | Data receive − | Data transmit − |
| 4 | Clock transmit + | Clock receive + |
| 5 | Clock transmit − | Clock receive − |
| 6 | Data receive + | Data transmit + |
| 7 | Clock receive − | Clock transmit − |
| 8 | Clock receive + | Clock transmit + |

Figure 5:
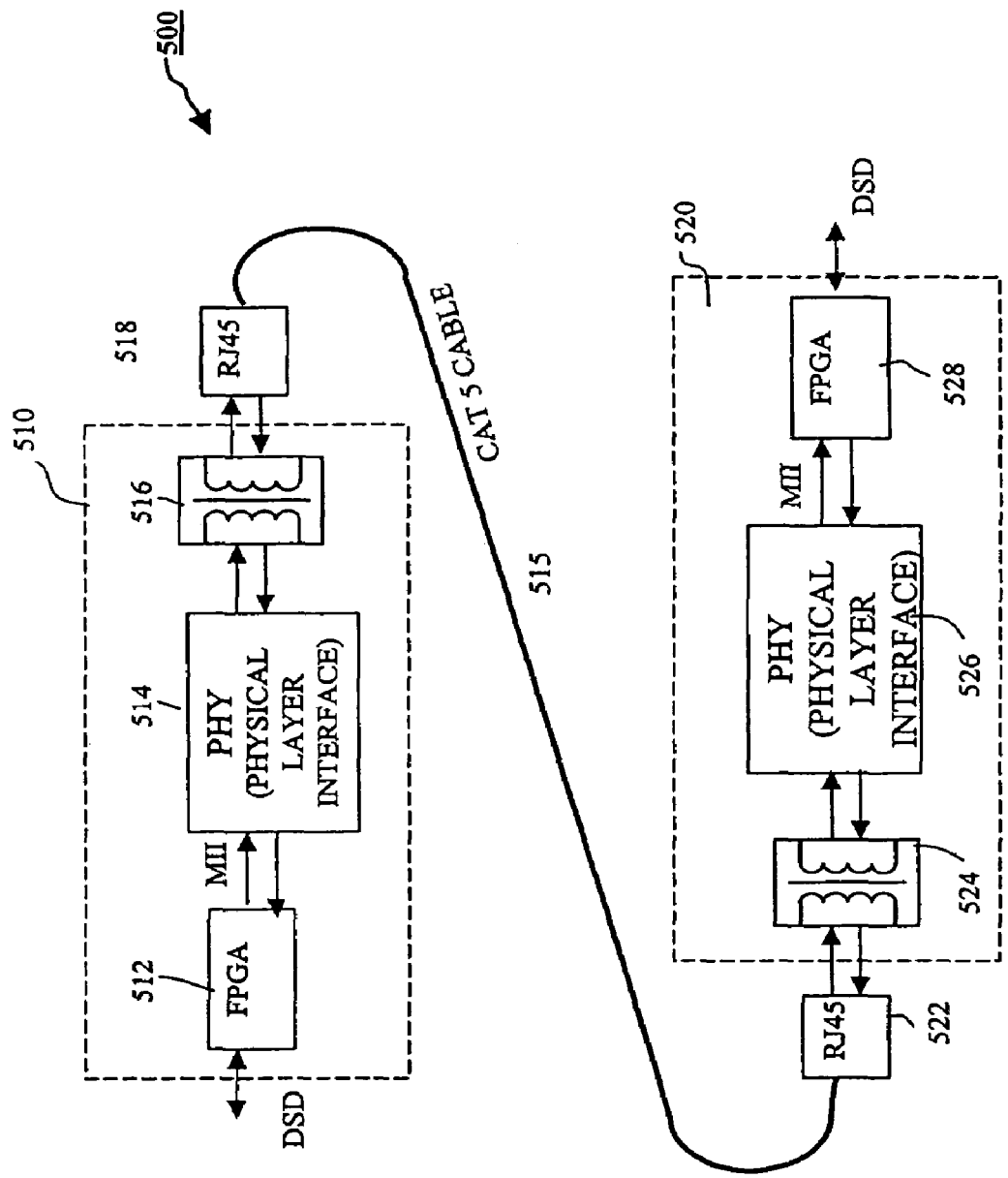
FIG. 5 schematically illustrates an audio data transmission system according to an embodiment of the present invention.

FIG. 5 schematically illustrates an audio data transmission system according to an embodiment of the present invention. The apparatus 500 comprises a first audio processing device 510 and a second audio processing device 520 linked by a category 5 unshielded twisted pair cable 515. Each audio processing device comprises a Field Programmable Gate Array (FPGA) 512, a physical layer interface (PHY) 514, a transformer 516 and an RJ45 8-pin connector 518. The FPGA 512 provides a Multichannel Audio Connection for DSD (MAC-DSD).

1-bit 64 Fs direct stream digital data is supplied from the audio device to the FPGA 512. During a transmission operation the FPGA 512 performs audio data buffering and framing operations whereas during data reception the FPGA extracts data from the framed structure and converts it back to a DSD stream. The FPGA performs transmission and reception concurrently, implementing a full-duplex audio connection. The format of the data frames will be described in detail below with reference to FIGS. 15 and 16. The PHY device 514 performs physical layer coding of the framed audio data, implements spectrum control processing and has line drivers that amplify the current and hence the power of the signal to increase its robustness during transmission. The PHY device 514 effectively implements the Physical Coding Sublayer (PCS), Physical Medium Attachment (PMA) and Physical Medium Dependent (PMD) sub-layers of the physical layer 210. In this embodiment the PHY device 514 is an Intel™ LXT972a component and it operates in full duplex mode with no auto-negotiation and with data scrambling on. The transformer 516 outputs the data for transmission on the category 5 cable 515. On reception the transformer 516 receives the signal prior to physical layer processing. The interface between the FPGA 512 and the PHY device 514 is a Media Independent Interface (MII). Thus the FPGA replaces the network address handling Media Access Controller (MAC) of the conventional Ethernet system. Multiple sample rates are supported and the system is able to accommodate potential developments towards higher DSD sample rates. Any change to the audio sample rate affects the way audio data streams are packed into data frames and this functionality is determined by circuitry in the FGPA 512. Provided that the physical layer link has sufficient bandwidth changes in the audio sample rate have no effect on the PHY device 514.

Figure 6:
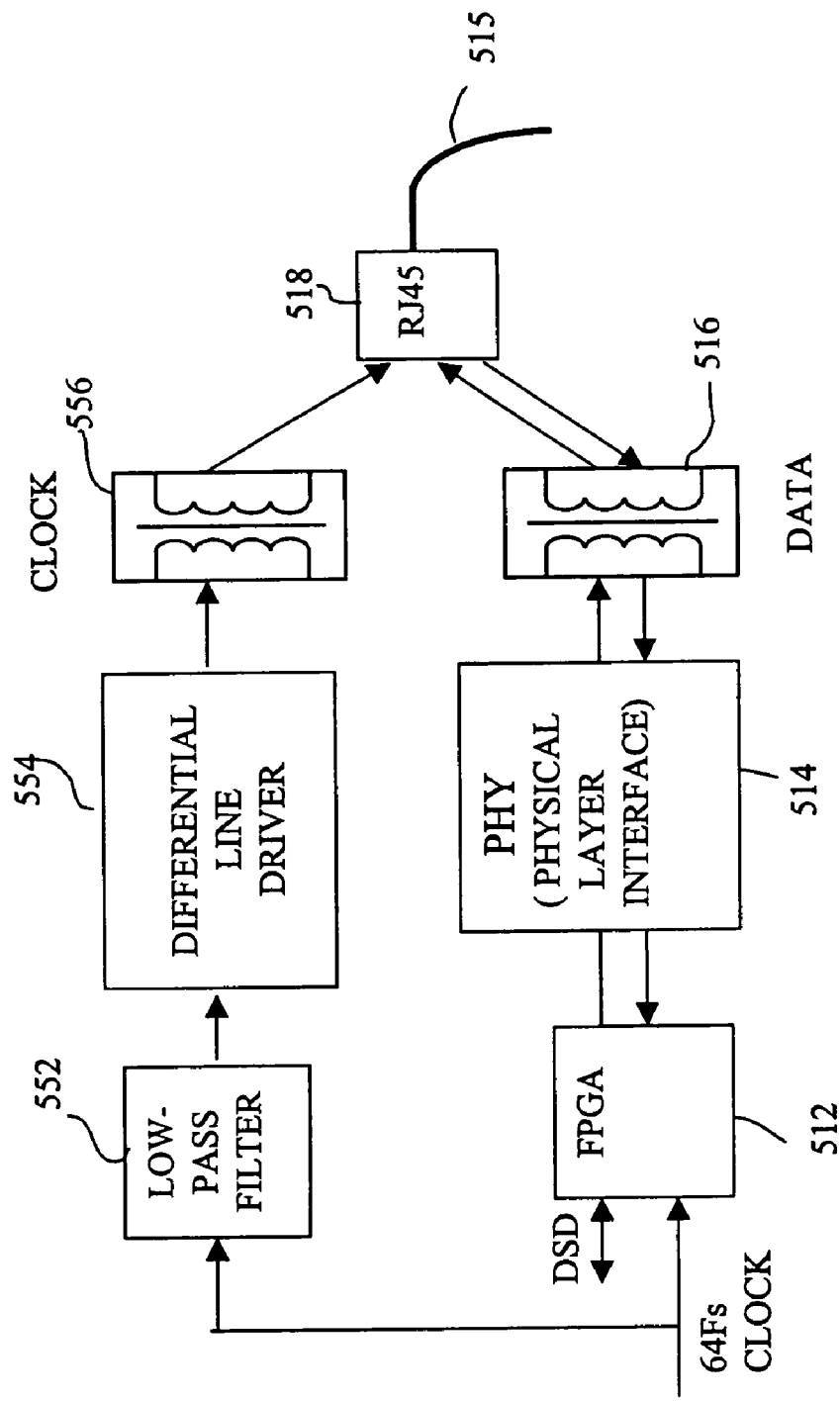
FIG. 6 schematically illustrates how the 64 $F_s$ audio sample clock signal is transmitted in parallel with the DSD audio data along different signal pairs of the category 5 cable.

FIG. 6 schematically illustrates how the 64 $F_s$ audio sample clock signal is transmitted in parallel with the DSD audio data along different signal pairs of the category 5 cable. As in FIG. 5, the FPGA 512, the PHY device 514 and the transformer 516 perform the audio data signal processing prior to its transmission on two signal pairs of the Category 5 UTP cable 515. The 64 $F_s$ audio sample clock is supplied as input both to the FPGA, which performs framing and buffering, and to a low pass filter 552. The low-pass filter serves to reduce electro-magnetic emissions during transmission of the clock signal. The output of the low-pass filter 552 is supplied as input to a differential line driver 554 and is subsequently fed through a 10BASE-T type Ethernet transformer 556. The clock signal is fed via the RJ45 connector 518 onto a signal pair on the category 5 UTP cable 515 where it is transmitted in parallel with the audio data. Transmission of the audio sample clock signal is important since it enables the FPGA of the receiving device to resynchronise the received audio data and thus to reconstitute the DSD bitstreams. The category 5 UTP cable used in this embodiment of the invention has a characteristic impedance of 100 Ohms. Alternative embodiments may use screened twisted pair cable which gives enhanced electromagnetic compatibility (EMC) performance. Further alternative cable types that may be used include category 5e cable (for data rates of up to 250 Mbit/s), category 6 cable (suitable for Gigabit Ethernet or category 7 cable which allows even higher data transmission rates.

The FPGA is only one solution to achieve the functionality required at the transmitter and receiver. Software-controlled general purpose microprocessors may of course be used, in which case the software could be provided by a storage medium (e.g. a read-only memory, flash memory, magnetic disk or optical disk) or a transmission medium (e.g. a network or the internet)

Figure 7:
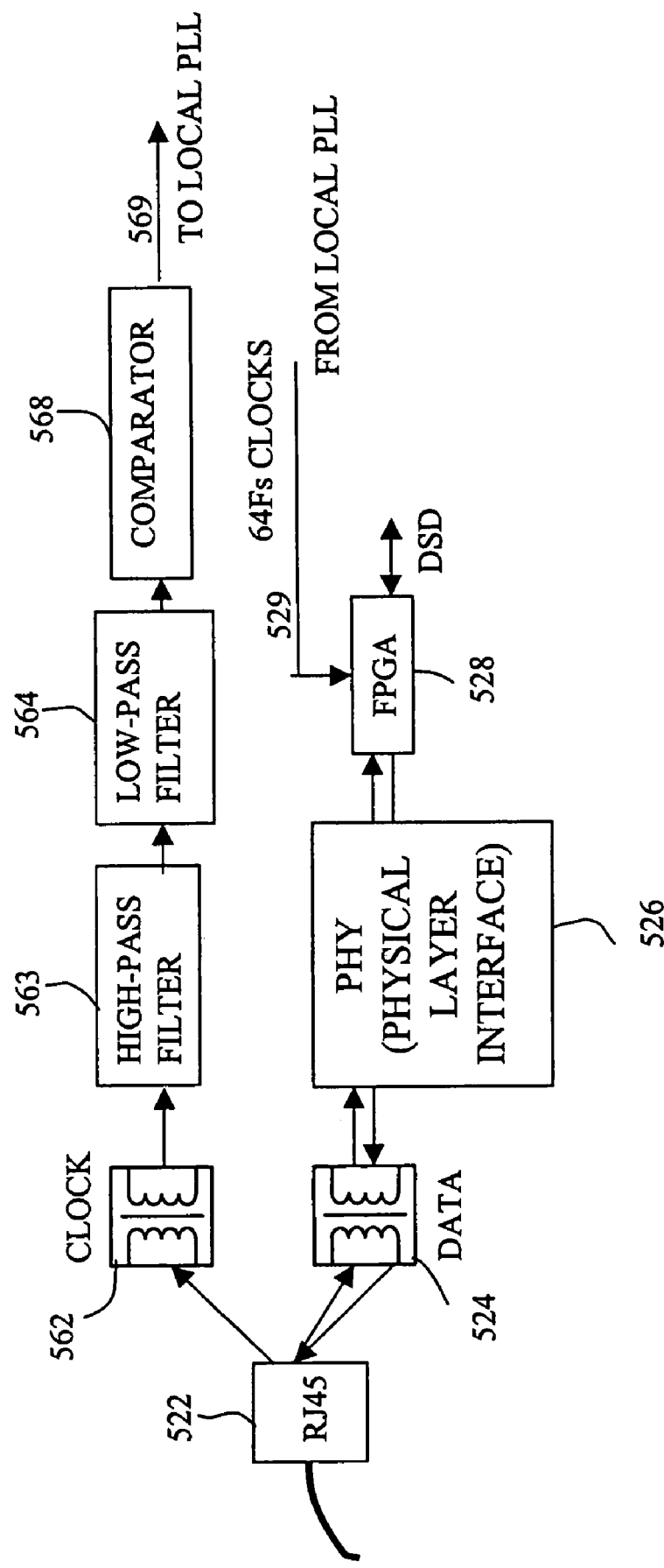
FIG. 7 schematically illustrates reception of the high frequency audio sample clock in parallel with reception of the DSD audio data signal.

FIG. 7 schematically illustrates reception of the high frequency audio sample clock in parallel with reception of the DSD audio data signal. The parallel signals are received from the cable 515 at the RJ45 connector 522 of the receiving device. The DSD audio signal is received by a transformer 524 and is then supplied to a physical layer interface 526 followed by an FPGA 528 which unframes the data and produces a DSD bit stream. The DSD audio stream is output from the FGPA according to a 64 Fs clock signal 529 derived from the local phase locked loop of the receiving device.

The received audio clock signal is supplied to a transformer 562 on arrival at the receiving device. The output of the transformer is supplied to a high pass filter 563 and then to a low pass filter 564, which is of the same type as the low pass filter 552 in the transmitting device. The low pass filter 564 in the receiver serves to remove any high frequency interference in the received signal, derived either from the audio data signal, which it travelled adjacent to along the cable 515, or from external sources. The output from the low-pass filter is supplied to a comparator 568 where it is converted to a logic signal. The logic signal from the comparator is used to drive a local phase locked loop (PLL) circuit. A phase locked loop (PLL) is an electronic circuit that controls an oscillator so that it maintains a constant phase angle relative to a reference signal. In this case the received high frequency clock signal is the reference signal. The PLL circuit generates a local audio reference clock which is used for reproduction of the DSD audio data.

Figure 8:
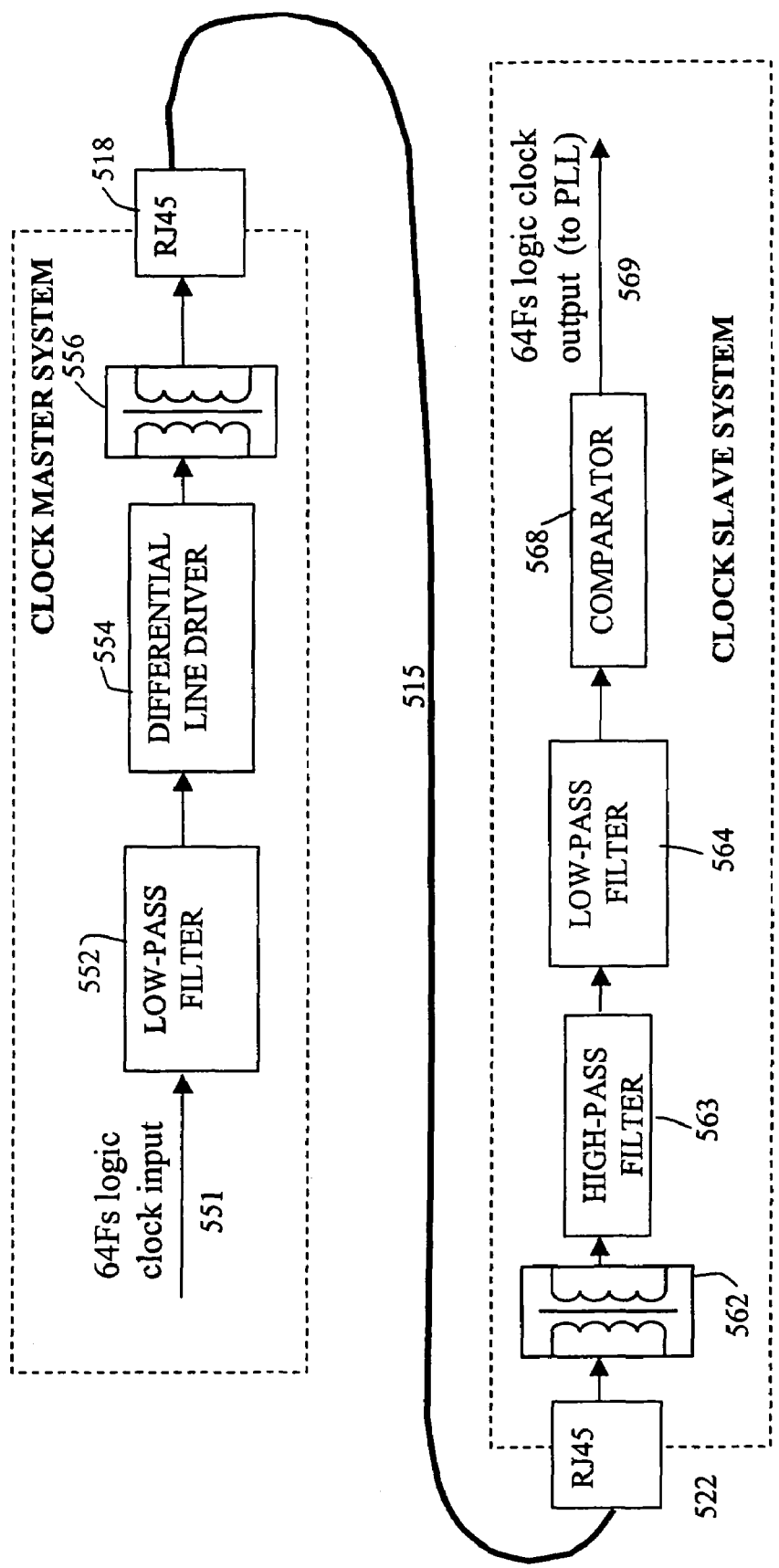
FIG. 8 schematically illustrates the signal path of the 64 Fs DSD sample clock signal.

FIG. 8 schematically illustrates the signal path of the 64 Fs DSD sample clock signal. As explained above, the DSD sample clock is transmitted in both directions via dedicated differential signal pairs in the category 5 UTP interconnection cable 515. The sequence of processing operations performed on the high frequency (64 $F_s$) clock signal will now be described with reference to FIG. 8. Special analogue conditioning of the sample clock signal is performed to facilitate its transmission on a signal pair of the UTP cable adjacent to the asynchronous data signal. The analogue conditioning reduces the severity of electromagnetic interference effects from the asynchronous data signal (or from external sources) which compromise the integrity of the high frequency sample clock signal. As schematically illustrated in FIG. 8, the sample clock processing that occurs in the clock master system involves the low pass filter 552, the differential line driver 554 and the transformer 556. The sample clock processing chain in the clock slave system involves the transformer 562, a high pass filter 563 and the comparator 568.

The input to the low pass filter 552 of the clock master is a 2.8224 MHz (64 Fs) logic signal 551. The frequency tolerance of this signal is in accordance with the Grade 2 specification defined by the standards document AES11-1997. Accordingly the sample clock has a long-term frequency stability of +/−10 parts per million (ppm), with an external synchronisation range of +/−50 ppm. The duty cycle of the sample clock in the range 40-60%. and a Low Voltage Transistor-Transistor Logic (LVTTL) logic signal is used.

The 64 Fs logic clock signal 569 output by the comparator 568 of the clock slave system is also a logic signal of frequency 2.8224 MHz (64 Fs). This clock output signal 569 is not used to synchronise any digital audio components directly because the link 515 characteristics may well have introduced substantial jitter and asymmetry to the clock signal. Rather, the clock output signal is used exclusively to synchronise an edge-triggered phase locked loop (PLL) in the receiver system. The clock output signal 569 is carefully routed within the receiver to ensure that any noise and jitter on the signal does not couple into other high-quality clock signals. The PLL circuit (not shown) of the clock slave system is used to generate high quality audio clock signals for distribution throughout the receiving system.

The low pass filters 552, 564 in both the transmitting (clock master) system and receiving (clock slave) system are second-order low-pass Butterworth filters, each having a cut-off frequency fc=2.9 MHz.

The transmitter low-pass filter 552 attenuates high-frequency components of the clock signal that may otherwise cause interference with the adjacent audio data signals in the cable or cause excessive RF emissions from the cable. The receiver low-pass filter 564 on the other hand, removes high-frequency interference from the clock signal induced by either the adjacent high-frequency data signals or by external sources.

The differential line driver 554 located in the transmitter generates a symmetrical output signal of differential peak-peak voltage 1.5V-2.5V into 100 Ohms (the impedance of the category 5 UTP link).

The transformers 556, 562 in both transmitter and receiver are 10Base-T Ethernet transformers having a 1:1 turns ratio and line-side common mode chokes.

The high-pass filter 563 in the receiver is a first-order high pass filter having a cut-off frequency fc=500 Hz. This filter removes low-frequency interference from mains supply sources, and blocks DC offset. This filter is implemented with a simple resistance-capacitance (R-C) combination.

The comparator 568 in the receiver converts the filtered analogue clock signal from the low pass filter 564 into a logic signal. In order to avoid or reduce noise-induced multiple edges a 2% hysteresis is used.

Figure 9:
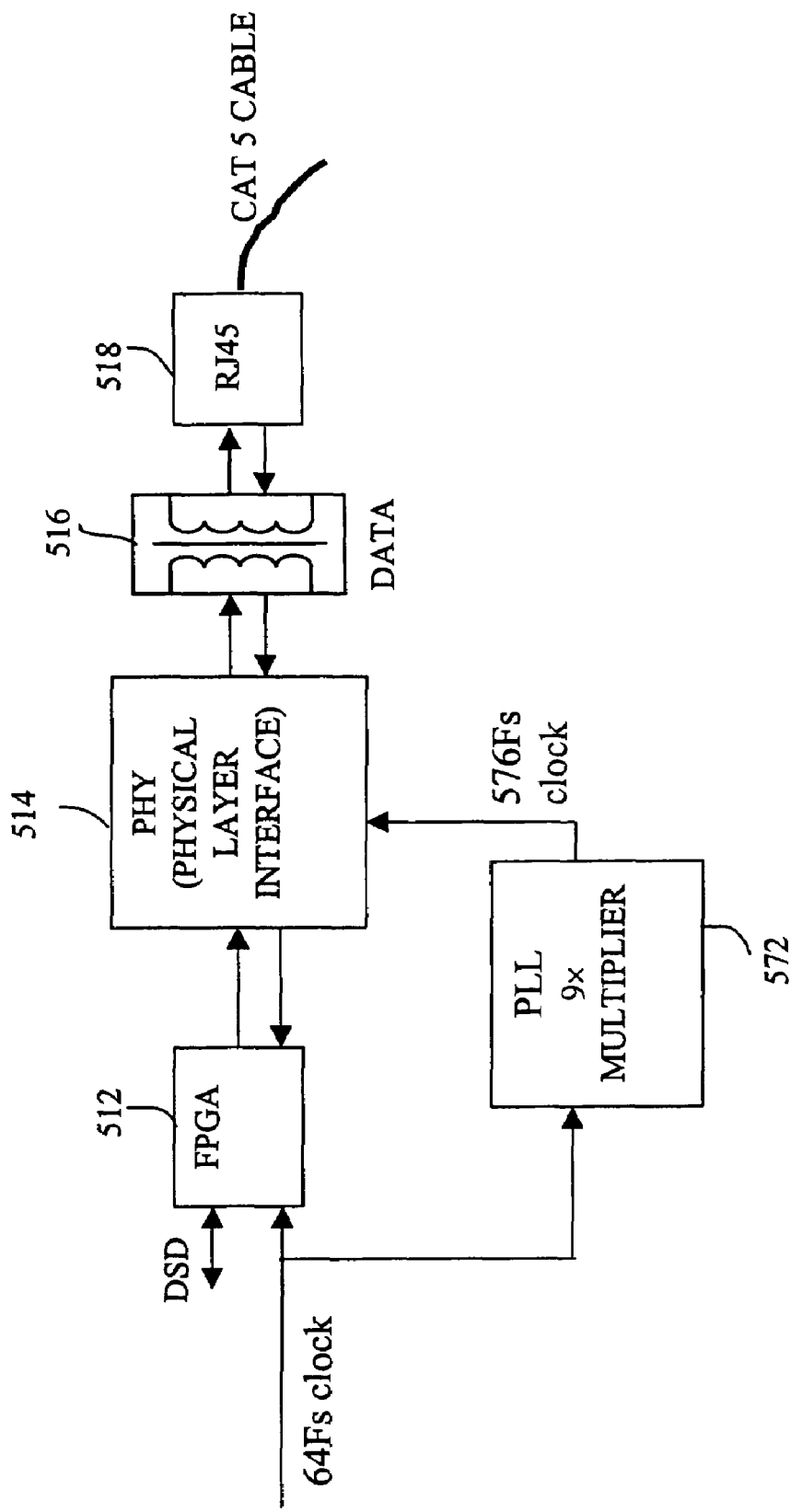
FIG. 9 depicts an embodiment of the invention in which the synchronisation of the physical layer device is adjusted such that it is an exact multiple of the audio sample clock frequency.

FIG. 9 shows an embodiment of the invention in which the synchronisation of the physical layer device is adjusted so it is an exact multiple (9*64 $F_s$) of the audio sample clock frequency 64 $F_s$. The Ethernet standard specifies a 25 MHz symbol rate for data transmission.

It is conceivable that transmission of the 2.8224 MHz sample clock along the same category 5 UTP as a asynchronous 25 Mhz audio data signal could result in undesirable degradation of the audio clock. Synchronising the audio data transmission with the sample clock may help to reduce the degradation of the high-quality audio clock signal. The apparatus shown in FIG. 9 comprises a multiplier 572 which takes a 64 $F_s$ clock signal as input and up-converts it in frequency by a factor of 9 using a phase locked loop. The output from the ×9 multiplier 572 is input to the PHY device of the transmitter so that a 576 $F_s$ (25.4016 MHz) audio data signal is generated. Accordingly, this embodiment uses a 25.4016 MHz symbol rate for audio data transmission rather than the standard 25 MHz Ethernet symbol rate. As a consequence of the increased symbol rate the channel bit rate increases from 100 Mbit/s to 101.6064 Mbit/s.

Therefore, this embodiment of the invention can potentially reduce degradation of the audio clock signal but this is at the expense of removing compatibility with the 25 MHz symbol rate of standard Ethernet systems.

Figure 10:
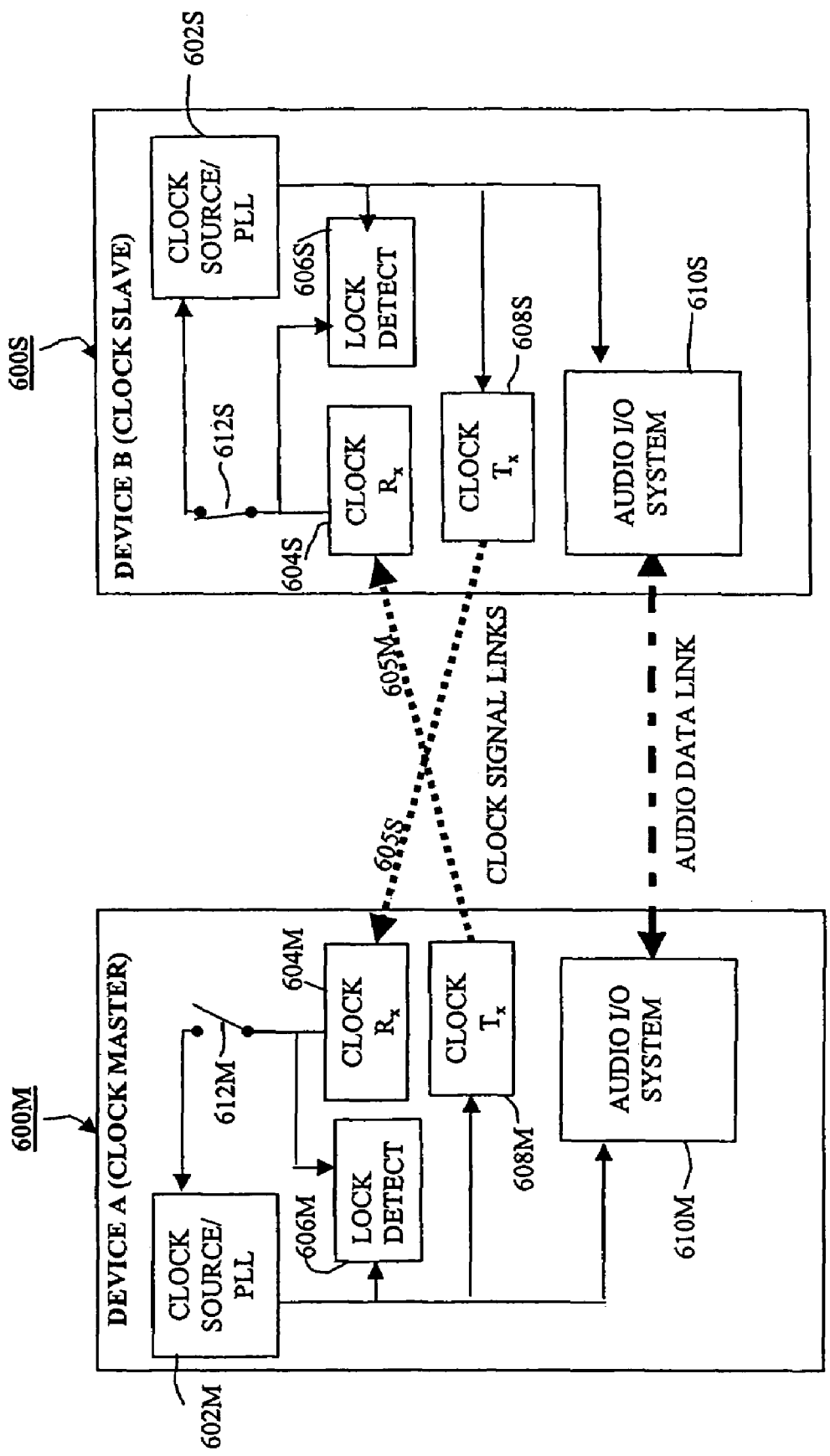
FIG. 10 schematically illustrates a point-to-point audio device link in which one device acts as a clock master whilst the other device acts as a clock slave.

FIG. 10 schematically illustrates a point-to-point audio link in which one device acts as a clock master 600M whilst the other device acts as a clock slave 600S. Each of the audio processing devices comprises a clock source PLL 602M/602S, a clock receiver (Rx) 604M/604S, a lock detect module 606M/606S, a clock transmitter (Tx) 608M/608S, an audio input/output (I/O) system 610M/610S and a switch 612M/612S. The suffix M denotes a component associated with the master device 600M whereas the suffix S indicates a component associated with the slave device 600S. DSD audio data passes along a UTP cable (not shown) which links the audio I/O system 610M of the master with that of the slave 610S.

The category 5 UTP cable provides independent connections such that under normal operating conditions clock signals are transferred in both directions between two audio devices. However in an active link one of the devices must be designated clock master 600M and the other device is thus designated the clock slave 600S. The clock master transmitter 608M sends an audio clock signal 605M to the clock receiver 604S of the clock slave. The master clock signal 605M is used by the phase locked loop 602S of the slave to produce a synchronisation signal that is supplied to the slave audio I/O system 610S. The audio clock signal 605S that is sent from the slave transmitter 608S to the clock receiver of the master 604M is not supplied to the phase locked loop 602M of the master because the switch 612M of the master is left in an open state. However the slave clock signal 605S is compared with the local master clock by the lock detect module 606M of the master device to detect synchronisation of the remote slave system.

Figure 11:
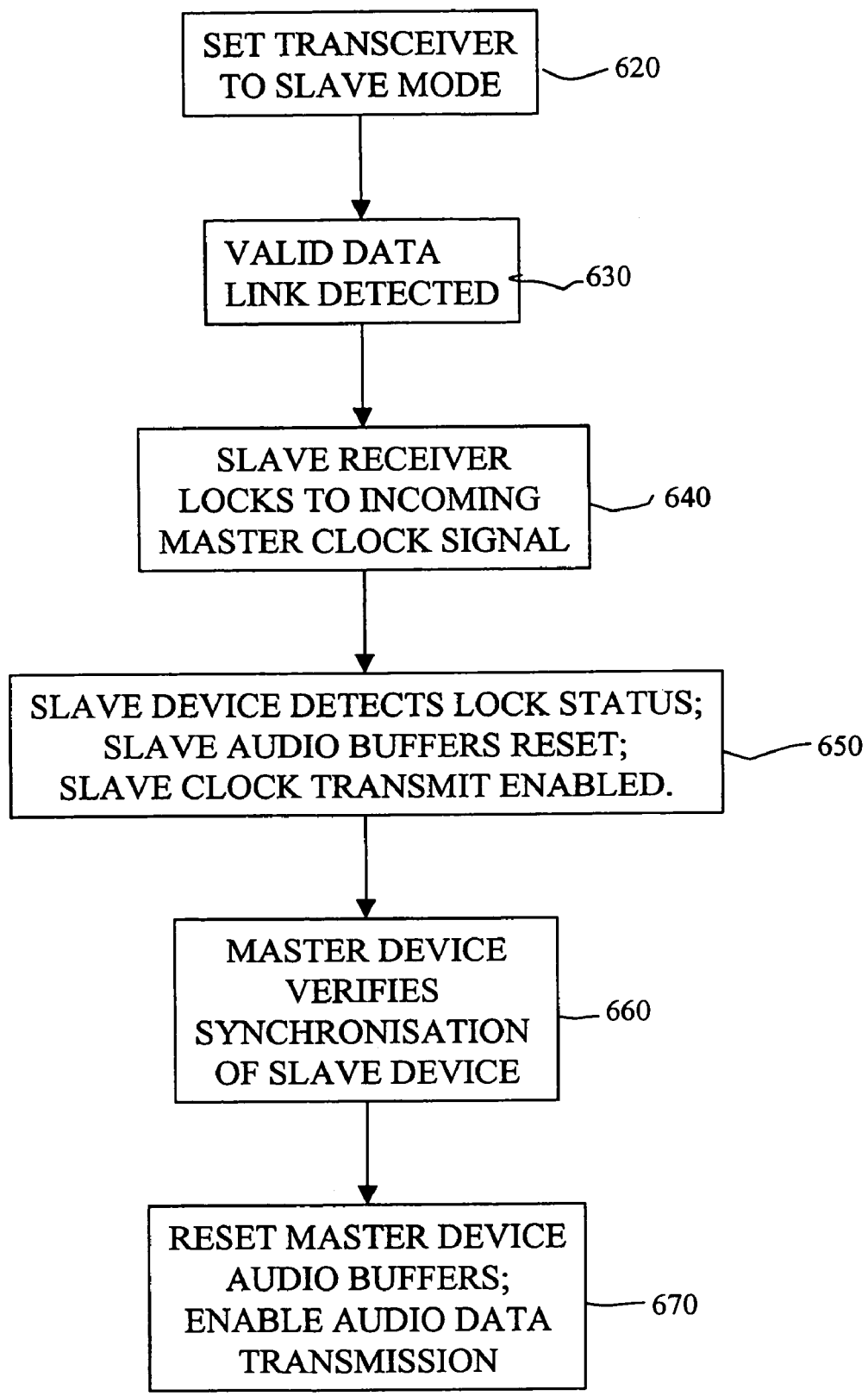
FIG. 11 is a flow chart which illustrates the sequence of events followed to establish a synchronised link between the master device and the slave device of FIG. 8.

FIG. 11 is a flow chart which illustrates the sequence of events followed to establish a synchronised link between the master device and the slave device of FIG. 10.

At stage 620 the transceiver of device B 600S is set to slave mode and the clock transmitter 608S is temporarily disabled (until the link is established and a lock state has been achieved). This acts as a safeguard against two slave devices attempting to synchronise each other with unpredictable consequences.

At stage 630 the UTP cable is used to physically connect the master device 600M to the slave device 600S thereby establishing the link. On connection of the cable both the master device 600M and the slave device 600S detect that the link is currently valid. The master device begins transmitting the clock signal 605M but the slave device's clock transmitter 608 is temporarily disabled.

At stage 640 the slave device's clock receiver 604S detects the incoming master clock signal 605M and feeds this to the local slave phase locked loop circuit 602S which locks to the incoming master clock signal.

At stage 650 the slave device 600S detects the lock condition by comparing its local system clock with the incoming master clock signal 605M via the lock detect module 606S. Closing the switch 612S completes the circuit between the slave PLL 602S the slave clock receiver 604S and the slave lock detect module 606S and thus enables lock detection. Once the slave lock detect module 606S signals that lock with the master clock has been established, the slave clock transmitter 608S is switched from the disabled state to an enabled state and the slave device 600S audio buffers (located in the audio I/O system 610S) are reset.

At stage 660 the master device clock receiver 604M receives the echoed clock signal from the recently enabled slave clock transmitter 608S and checks the phase of this echoed signal to verify that the slave device has synchronised correctly with the master clock signal 605M. If synchronisation has not been correctly established then audio transmission is not enabled.

At stage 670, having established that the slave device is correctly synchronised the master device resets its audio buffers (located in the audio I/O system 610M) and enables audio data transmission, whereupon framed DSD audio data is sent along the UTP cable linking master and slave devices.

The flow chart of FIG. 11 describes the standard process of establishing synchronisation between the master device and the slave device. However, it may be the case that an attempt is made to establish a link between two audio devices, both of which have been set to slave mode. In this event, the clock transmitters of both devices are disabled at the point where the devices detect a valid data link and an indication is made to the operator that the link is not synchronised. The link conditions are indicated to the user via LED status indicators (not shown) located adjacent to the RJ45 cable connection ports. Table 2 below gives an LED status for each of a number of possible link conditions. In particular a red or yellow LED "on" status corresponds to a clock synchronisation failure of the type that would be encountered during an attempt to link two slave mode audio devices.

TABLE 2

| LED status | Condition |
| --- | --- |
| No LED on | No Ethernet PHY connection detected |
| Red (or yellow) LED on | Ethernet PHY connection detected, but clock synchronisation failed/not present/not locked. Audio transfer inhibited |
| Green LED on | Ethernet PHY connection detected, slave device has locked to master device clock, and link is active |
| Both LEDs on | (illegal indication) |

Figure 12:
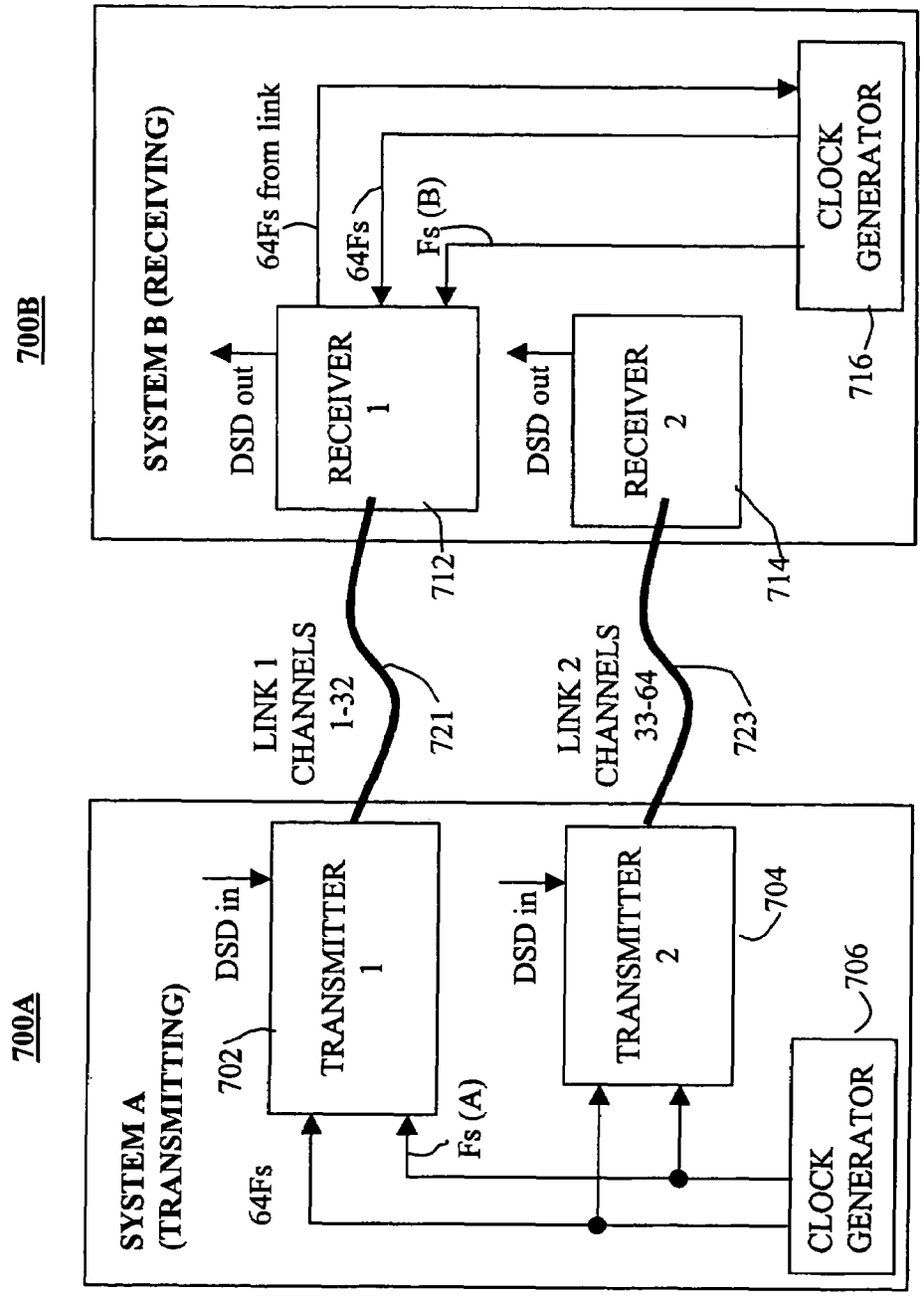
FIG. 12 schematically illustrates an apparatus in which multiple parallel links are used between two pieces of audio equipment in order to achieve a higher channel count than that achievable via a single point-to-point link.

FIG. 12 schematically illustrates an apparatus in which multiple parallel links are used between two pieces of audio equipment. Use of multiple links means a higher channel count is achieved than that achievable via a single point-to-point link. In this case two links are used to provide a total of 64 channels. A transmitter device 700A comprises a first transmitter 702, a second transmitter 704 and a clock generator 706. A receiver device 700B comprises a first receiver 712, a second receiver 714 and a clock generator 716. A first category 5 UTP cable 721 carries audio data channels 1 to 32 (or 1 to 24) and links the first transmitter 702 to the first receiver 712. A second category 5 UTP cable 723 carries audio data channels 33 to 64 (or 25 to 48) and links the second transmitter 704 to the second receiver 714.

When operating the apparatus of FIG. 12, it is necessary to ensure that the DSD audio data streams output by the first receiver 712 are sample-synchronised with the DSD audio data streams output by the second receiver 714 i.e. the samples from channels 1 to 32 (or 1 to 24) are synchronised with the samples from channels 33 to 64 (or 25 to 48). The transmit and receive latencies of the PHY devices in the transmitters 702, 704 and in the receivers 712, 714 mean that it is possible that the output of receivers 712, 714 could slip out of synchronisation by more than one DSD audio sample period ($3.543 \times 10^{-7}$ seconds). Manufacturer specifications for commonly used PHY devices indicate that combined transmit and receive latencies of the PHY devices could vary by up to $6 \times 10^{-8}$ seconds so that slippage of one DSD sample between receivers is conceivable. Any differences in the lengths of cables 721 and 723 will also affect synchronisation.

As shown in FIG. 12, the first and second transmitters 702, 704 of the transmitting audio system 700A use a common synchronisation reference clock signal Fs(A) running at $F_s$=44.1 kHz. Similarly the first and second receivers 712, 714 of the receiving audio system 700B use a common synchronisation reference clock $F_s$(B) running at $F_s$=44.1 kHz. These two 44.1 kHz synchronisation clock signals $F_s$(A) and $F_s$(B) have identical frequencies both having been derived from a 64 Fs master clock signal, but their phases, being arbitrary, are unlikely to match. The arbitrary phases are due to $F_s$(A) and $F_s$(B) having been derived from the common 64 Fs clock via independent clock dividers. The flow chart of FIG. 13 illustrates how the signals $F_s$(A) and $F_s$(B) are employed to ensure that the outputs of receivers 712 and 714 (which have derived their audio data from separate link cables 721 and 723 respectively) are kept synchronous.

Figure 13:
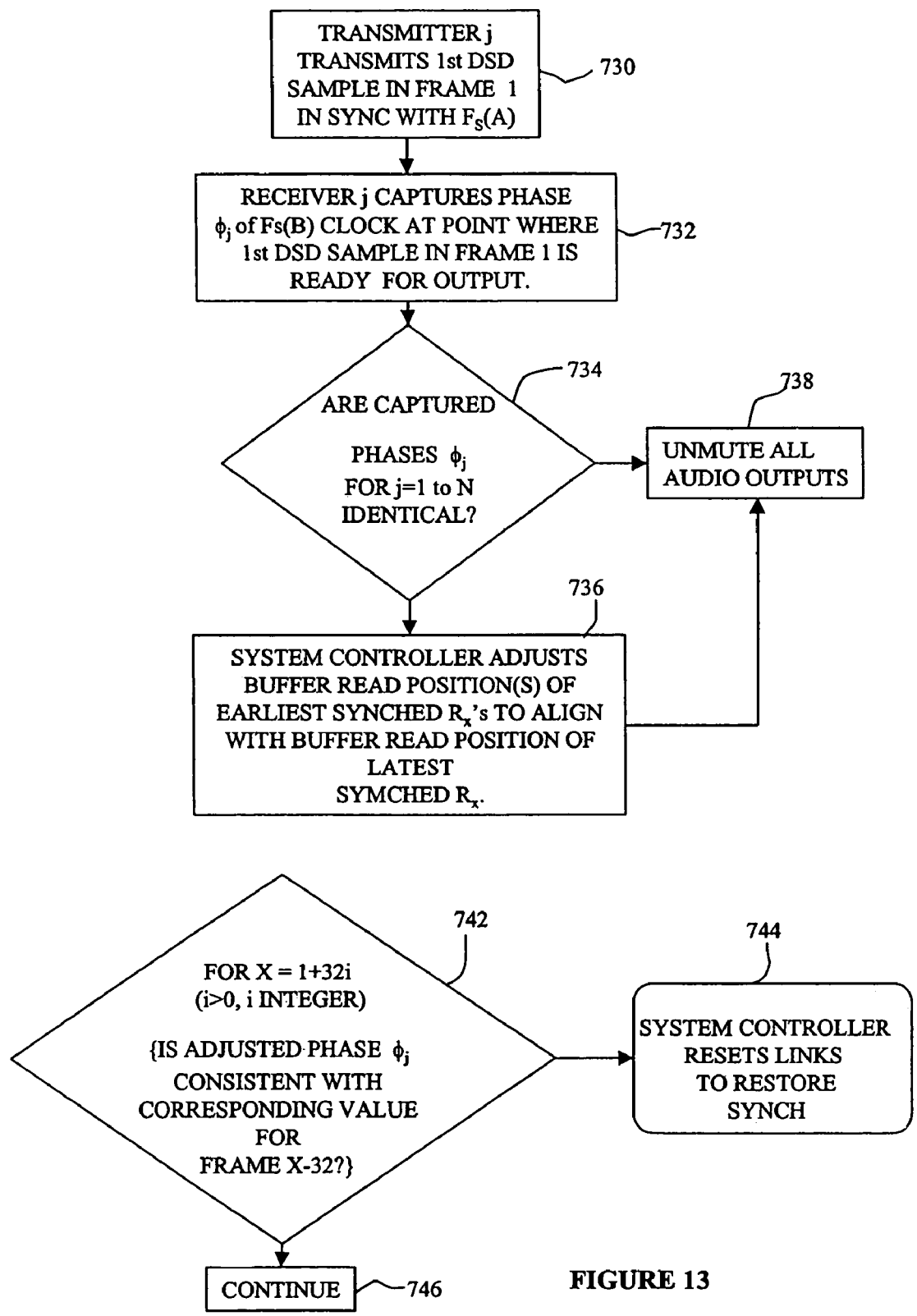
FIG. 13 is a flow chart illustrating how the local clock signals $F_s(A)$ and $F_s(B)$ are employed to ensure that the outputs of two receivers are kept synchronous.

At stage 730 of the flow chart of FIG. 13, a communication link between the transmitting system 700A and the receiving system 700B is established. Each of the two transmitters 702, 704 awaits receipt of a clock edge from the local 44.1 kHz clock signal $F_s$(A) and then transmits the first audio frame. The data frame is packed such that the first DSD sample is input synchronously with the clock edge. The flow chart of FIG. 13 relates to an embodiment in which there are 32 channels of DSD audio. As shall be described in detail below with reference to FIG. 18A, for the 32-channel system each frame comprises 384 data words and words 13 to 382 each contain a 1-bit DSD sample value for each of 32 channels (370 sample values per channel are contained in each frame). The first transmitter transmits the first audio frame corresponding to channels 1 to 32 whilst the second transmitter transmits the first audio frame corresponding to channels 33 to 64. Since in this embodiment each frame contains 370 samples and there are 64 samples per Fs period, a coincident frame start ($1^{st}$ DSD sample value output) and Fs-period start (Fs(A) clock edge) will occur every 370×64 samples. However, 370 and 64 have a common factor of 2 so a frame-start and $F_s$ period-start occur together every (370*64)/2 samples i.e. every 32 frames. Accordingly, the $1^{st}$ DSD sample value of the frame will be output synchronously with the local $F_s$(A) clock edge for frames 1, 33, 65, 97 . . . and so on. These particular frames have a specific bit flag in a "frame type" field (see FIG. 16) of the data frame set to one.

At stage 732 of the flow chart both the first receiver 712 and the second receiver 714 capture a phase count value $\Phi_j$ (j=1 or 2 corresponding to first and second receivers respectively) marking the point in time at which the first DSD sample value in the first received frame is ready for output. Note that at system start-up the receiver audio outputs are muted and transmitter audio outputs are only enabled once synchronisation of the 64 Fs sample clocks has been verified by the master device. The time at which the receiver is ready to output the first DSD sample value will depend on the time taken for the slave device to achieve phase lock with the 64 $F_s$ clock signal of the master device. It will also depend on the setting of the threshold level of a FIFO buffer of the particular transmitter. Each receiver derives the phase count value $\Phi_j$ from a counter in the receiver which is clocked by the 64 $F_s$ local clock signal and reset by the 44.1 kHz signal $F_s$(B).

At stage 734, a system controller (not shown) compares the phase count values, $\Phi_1$ and $\Phi_2$, for each of the receivers and determines if they are identical. If $\Phi_1=\Phi_2$ then the receivers are synchronised to within the same DSD sample period which is the desired condition. In this event the process proceeds to stage 738 where the audio outputs are unmuted. If however, $\Phi_1\approx\Phi_2$ at stage 734 then the process proceeds to stage 736 where the system controller adjusts the buffer read positions of the receivers in an attempt to achieve synchronisation. The receiver that synchronised with the 64 Fs master clock earliest (and hence received DSD audio data first) has its buffer read position adjusted to match the buffer read position of the latest synchronised receiver (which started to receive DSD data later). This buffer read position adjustment is equivalent to modification of the phase count values $\Phi_j$ such that they are both equal to the higher of the two compared phase counts. Only when synchronisation has been achieved i.e. when the phase count values of the receivers are identical will the audio outputs be enabled.

The phase count values of the receivers are cross-checked for every flagged frame (first frame and every following $32^{nd}$ frame) to ensure that synchronisation of the receivers is maintained. Frames are transmitted every 131.25 µs so that flagged frames occur approximately every 4.2 ms (32×131.25 µs). Any receiver synchronisation problem should be detectable and correctable within this 4.2 ms period. Stages 742, 744, 746, of FIG. 13 show the check that is performed by the system controller for every flagged frame. At stage 742 the controller checks the modified phase count value for the current flagged frame and compares it with the final (possibly modified) recorded phase count value for the previous flagged data frame i.e. frame X-32. If the phase count values match then the system continues with audio data transmission at stage 746. If however the phase count values for the two flagged frames do not match, this indicates that the two receivers are not outputting the same audio sample value simultaneously and the process proceeds to stage 744 where the system controller initiates resetting of the data links in an attempt to restore proper synchronisation. When the data links are reset the receiver logic is put in a reset condition so that the process of stages 732 to 738 of FIG. 11 is carried out. In alternative embodiments the data links are reset by adjustment of the buffer read positions, but in this case a buffer overrun/underrun would trigger a total reset of the link. Sample synchronisation slippage could occur, for example, due to a cable glitch.

For the alternative 24 DSD channel embodiment, as shall be described in detail below with reference to FIG. 18B, each frame comprises 368 data words and words 15 to 366 contain 352 DSD samples for 24 channels plus 88 bytes of auxiliary data. Each 32-bit sample comprises 1-bit from each of the 24 DSD channels, 2 bits of auxiliary data and 6 check-bits. Bit 0 of each sample corresponds to the first logical audio channel whereas bit 23 corresponds to the $24^{th}$ logical audio channel. In this case the first transmitter transmits the first audio frame corresponding to channels 1 to 24 whilst the second transmitter transmits the first audio frame corresponding to channels 25 to 48. Since in this embodiment each frame contains 352 samples and there are 64 samples per Fs period, a coincident frame start ($1^{st}$ DSD sample value output) and Fs-period start (Fs(A) clock edge) will occur every 352×64 samples. However, 352 and 64 have a common factor of 32 so a frame-start and $F_s$ period-start occur together every (352*64)/32 samples i.e. every alternate frame. Accordingly, in the 24 DSD channel embodiment the $1^{st}$ DSD sample value of the frame will be output synchronously with the local $F_s$(A) clock edge for frames 1, 3, 5, 7, 9 . . . and so on. It follows that every alternate frame will be a flagged frame and the phase count values of the receivers will be cross-checked every alternate frame.

Figure 14:
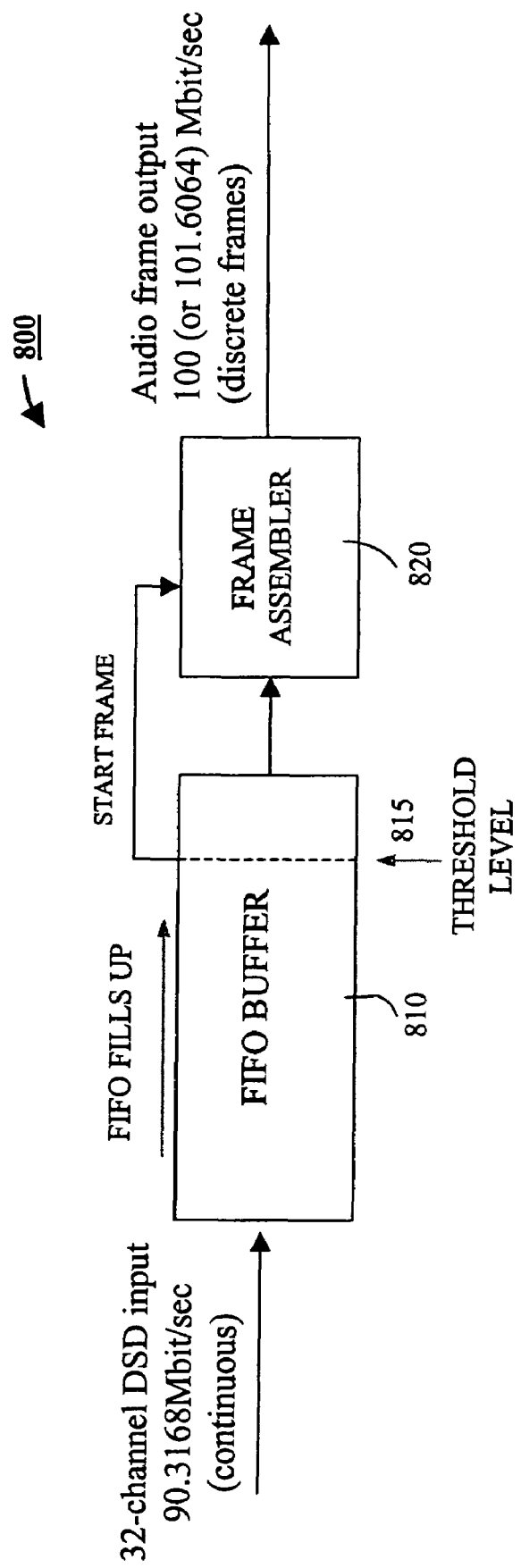
FIG. 14 schematically illustrates how audio data buffering is performed in the transmitter.

FIG. 14 schematically illustrates how audio data buffering is performed in the transmitter. The buffering apparatus 800 comprises a First In First Out (FIFO) buffer 810 in series connection with a frame assembler 820. In operation, 32 channels of Direct Stream Digital 1-bit sample data are continuously fed into the FIFO buffer at a rate of 64 Fs which corresponds to 90.3168 Mbit/s. When the occupation level of the FIFO buffer reaches a predetermined threshold level 815 a signal is generated by the system controller to initiate transmission of a new audio data frame. In response to this signal, the frame assembler assembles the frame preamble and headers, during which time incoming DSD samples continue to be buffered. As soon as the audio data payload assembly begins, the frame assembler starts to extract data from the FIFO. The rate at which data is extracted from the FIFO corresponds to the Ethernet transmission rate of 100 Mbit/s (or 101.6064 Mbit/s for embodiments in which the symbol rate is locked to 9*64 $F_s$). Since the FIFO is filling at a rate of 90.3168 Mbit/s and emptying at a rate of 100 Mbit/s the net buffer occupation level will steadily decrease during this period. The predetermined threshold level 815 is set in dependence upon the data input rate, the data output rate and the frame size (370 1-bit samples for 32 channels) so that the buffer occupation level will be almost, but not quite, zero at the end of each frame transmission i.e. data from the next frame for transmission is present in the buffer. The fact that the transmitter buffer 810 is not completely empty by the time the frame transmission ends breaks the rules of the MAC. Once the frame transmission is complete the FIFO occupation level will increase rapidly until the threshold level is reached whereupon the frame transmission cycle will repeat.

For a transmission system with an input data rate of 90.3168 Mbit/s, an output rate of 101.6064 Mbit/s and a (370 1-bit sample) (32 channel) frame capacity it can be shown that the minimum buffer size is 42 DSD samples and the corresponding minimum threshold level is 30 DSD samples. The audio latency introduce by this minimum size buffer is 14.9 μs (=42/64 Fs).

Figure 15:
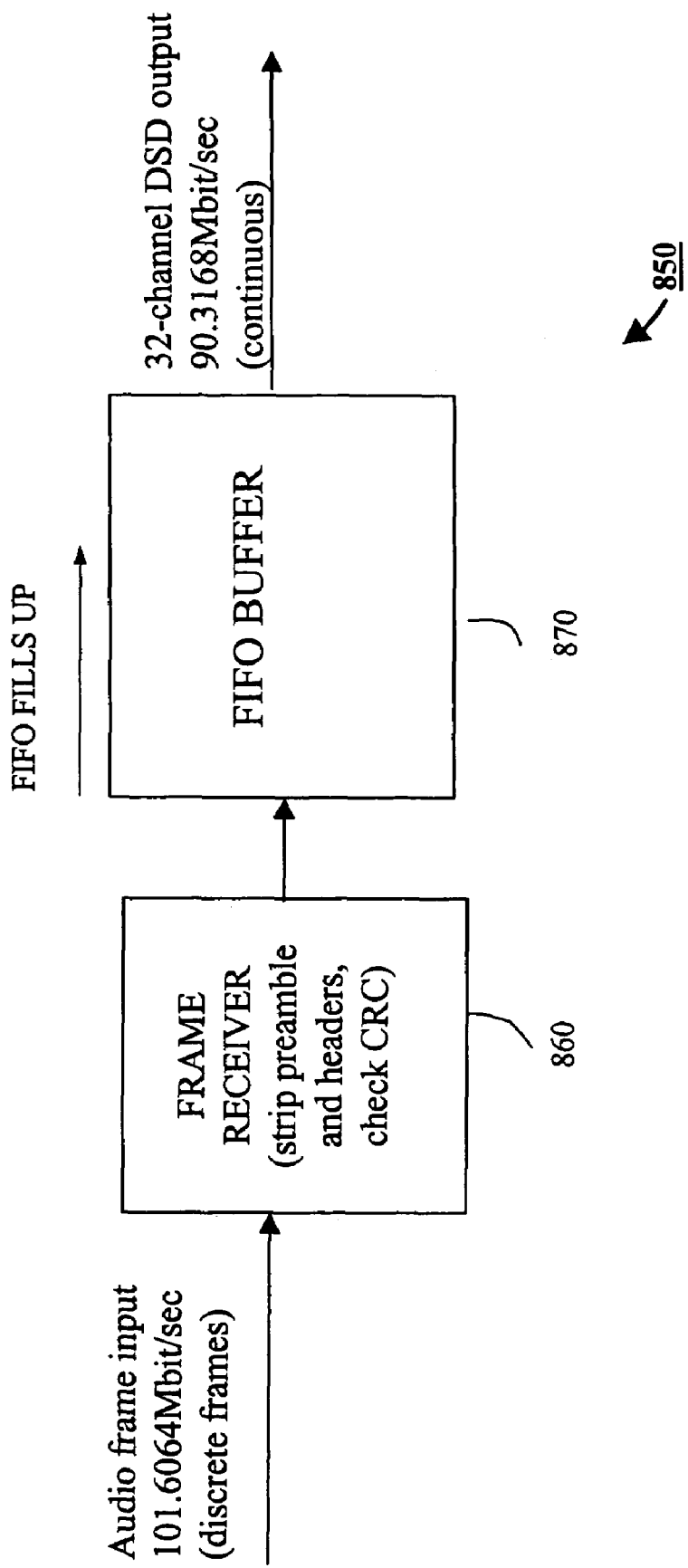
FIG. 15 schematically illustrates how audio data buffering is performed at the receiver.

FIG. 15 schematically illustrates how audio data buffering is performed at the receiver. The receiver buffering apparatus comprises a frame receiver 860 in series connection with a FIFO buffer 870. Audio data arrives (via the category 5 UTP cable) in framed format at the frame receiver 860 at a rate of 100 Mbit/s (or 101.6064 Mbit/s for the 9*64 $F_s$ symbol rate). The frame receiver strips off the preamble and headers of each data frame and optionally performs a cyclic redundancy check (CRC) to verify the integrity of the received data. Unframed audio data is passed directly from the frame receiver 860 to the FIFO buffer 870. Audio data extraction from the FIFO starts immediately since there is no threshold level set in the buffer at the receiver. This ensures that near-zero receiver latency is achieved. The audio data frames contain a cyclic redundancy check word (CRC). The CRC algorithm, check word location and scope are as defined in IEEE802.3-2000 section 3.2.8. This 32-bit check word will generally detect any error within the frame. In known Ethernet systems a CRC is performed on each frame both at the transmitter and at the receiver. At the receiver complete frames are output only once the result of the CRC on that frame is determined. This results in substantial latency before the data is output at the receiver in known systems. According to the present technique, although the CRC check is still performed at the receiver, data is output from the buffer before the result of the CRC check is obtained. Error control is performed by decoding parity bits at a stage subsequent to data output at the receiver FIFO. In particular, error control is performed when data is extracted from the 32-bit data blocks prior to output as a 32 DSD channel audio stream. Unlike standard Ethernet systems, the MAC-DSD protocol according to the present technique does not support frame re-transmissions in case of an error, as this would require buffering of at least two 125 microsecond audio frames, increasing system latency to an unacceptable degree. Although the primary purpose of the IEEE802.3 CRC is to detect frame errors and thereby generate a retransmission request, the CRC is included for sake of compatibility. It will be appreciated that support for CRC-initiated MAC-DSD frame retransmission may be provided for applications requiring greater robustness at the expense of latency. Audio data is extracted from the FIFO at a continuous rate of 90.3168 Mbit/s and because the data output rate is less than the data input rate, the FIFO gradually fills up as the frame is received. Once a complete frame has been received there will be an inter-frame latency time before reception of audio data from the next frame and the FIFO buffer will continue to empty (although not completely) during this idle period.

In the event that the receiver buffer fills completely or empties completely an error signal will be sent to the system controller. In this event the system controller will mute the audio outputs because a completely full or empty buffer indicates that one of the following situations has arisen: data link has failed; transmitter has failed; or DSD master clocks have not been properly synchronised between transmitter and receiver.

Figure 16:
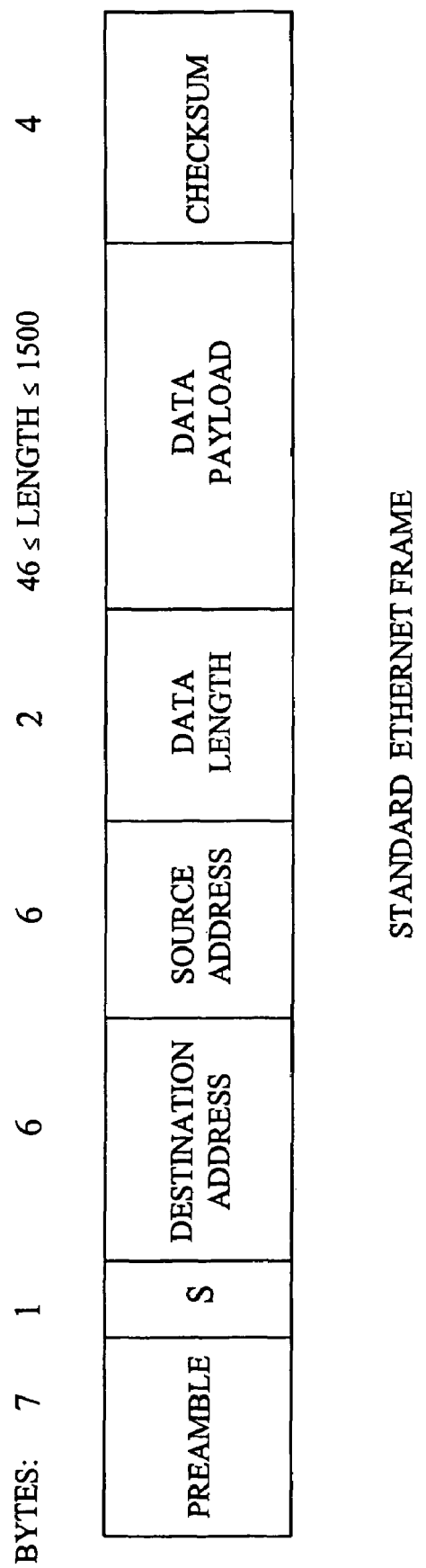
FIG. 16 schematically illustrates the data structure corresponding to a standard Ethernet frame.

FIG. 16 schematically illustrates the data structure of a standard Ethernet frame. The frame structure is defined in the IEEE 802.3 standard. As shown in FIG. 16 the Ethernet frame comprises a preamble, a start frame delimiter, a destination address field, a source address field, a data length field, a data payload and a checksum.

The preamble is 7 bytes long, each byte containing the bit pattern 10101010 and this is followed by a single-byte start frame delimiter S containing the bit pattern 10101011. The preamble and start frame delimiter are used for hardware timing purposes. The destination address field is 6 bytes long and specifies the physical address of the network adapter that is to receive the frame. The source address field is 6 bytes long and contains the physical address of the network adapter that is sending the frame. The data length field is 2 bytes long and specifies the size of the data payload. The data payload is a variable length field which is a minimum of 46 bytes and a maximum of 1500 bytes long. The checksum field is 4 bytes long and contains a checksum value for the frame that is used to perform a cyclic redundancy check (CRC). The CRC is a common means of verifying data transmissions. The sending network node calculates a CRC value for the frame according to a predetermined algorithm and encodes it in the frame. The receiving network node then recalculates the CRC and checks the CRC field to see if the values calculated by the transmitter and the receiver match. If the values do not match this indicates that data has been lost or corrupted during transmission. This Ethernet frame will be passed to the Physical layer components where it will be converted to a bit stream and sent across the transmission medium. Note that slight variations of this Ethernet frame format exist.

FIG. 17 shows the structure of an audio data frame according to an embodiment of the present invention. The audio data frame has a total size of 1536 bytes comprising: an 8 byte preamble (following which the physical layer will accept up to 1528 bytes of arbitrary data); a 6-byte field reserved for the destination MAC address (default value 0xffffff); a 6 byte field reserved for the source MAC address (default value 0x000000); a 2-byte data length field which specifies the number of bytes (always 1510 bytes) following this field but excluding the CRC; a 28-byte field reserved for networking headers; a 12-bit reserved field (as yet unallocated); a 4-bit frame type field which is used for example for synchronisation purposes; an audio data payload of 1480 bytes which holds 370 samples of 32 channel DSD audio; and a 4-byte CRC field containing a checksum. The CRC checksum procedure used in embodiments of the invention will be described below. The audio data frame structure illustrated in FIG. 17 is of a form that allows for compatibility with Internet Protocol (IP) networks. Accordingly the audio data frame may be treated as a User Datagram Protocol (UDP)/IP datagram for transmission over wider IP networks. UDP is a connectionless (best try) transport layer protocol. In this particular embodiment only the physical layer is used. The MAC layer is not used so the MAC address fields are not actually required by the system. These fields are simply reserved and filled with default values to allow (potential later) compatibility with Local Area Networks (LAN) or UDP/IP.

The audio frame CRC validity check will now be described in more detail. All frames use a 4-byte CRC check word, to verify the validity of the frame. The CRC algorithm, check word location and scope are similar to those defined in the standards document IEEE802.3-2000 section 3.2.8.

According to the IEEE802.3 standard, the payload of a frame should not be passed on from the data link layer until the frame validity has been verified with the CRC. However, in the context of embodiments of the invention, this implies that the receiver would have to buffer an entire frame before starting to output the DSD audio bitstreams. Direct implementation of this standard would be undesirable, as it would increase the audio latency by 115 μs, from around 25 μs to 140 μs.

The CRC is primarily used to check the validity of a data link between audio devices at system start-up. Link failures after start-up, such as a cable disconnection are indicated by a receiver error assertion from the PHY device, following which the audio output is muted. Since the link is a simple point-to-point connection, with deterministic, synchronised frame transmission and no collisions, other modes of failure are unlikely.

Accordingly, a relatively simple CRC check is implemented in embodiments of the invention. The receiver audio outputs are muted on start-up, until the first received frame has been received in full and verified by its CRC. If the CRC check fails, the audio outputs remain muted, and an error condition indicated to the local system controller. Following the verification of the first frame, the CRC is only be checked retrospectively. This allows audio data to be streamed out with near-zero receiver latency. The CRC is used only to alert a host processor that a CRC error has occurred.

If an invalid audio data frame is encountered, it is theoretically possible for up to 131 μs of invalid audio data to pass, before the output is muted in response to the retrospective CRC test. However, in practice, a random external perturbation that corrupts PHY line symbols will cause invalid symbols, resulting in rapid assertion of a receiver error condition, which may be detected to mute the audio outputs.

If use of a CRC check on every frame is considered necessary then each frame is buffered and verified using the CRC before outputting the DSD audio data. This is not a preferred option because it adds approximately 115 μs extra latency and substantially increases the receiver buffer hardware size.

The 1536-byte audio data frames illustrated in FIG. 17 each have a transmit duration of 120.9 μs (at a symbol rate of 101.6064 Mbit/s). According to a particular embodiment of the invention, frames are transmitted at intervals of 131.1 μs. A minimum inter-frame time of 96 bit periods is provided which leaves 8.25 μs of "link-time" between transmission of audio frames. This link-time is used to convey auxiliary frames containing control data. The maximum total size of a control data frame in this embodiment is 104 bytes.

The structure of a control data frame is identical to that of the audio data frame shown in FIG. 15, with the exception of the length of the data payload which is 1480 bytes for the audio data frame but only 48 bytes for the control data frame. A control data frame is transmitted every 131 μs which provides a control data bandwidth of 2.9 Mbit/s. The control data itself may comprise channel usage information, router control data and clock source control data. The control data will be transmitted from storage in a FIFO buffer at the transmitter and gathered in a FIFO buffer at the receiver before being routed to a system controller of the receiver.

FIG. 18A shows the audio data frame format for the 32 DSD channel embodiment which is arranged as 384*4-byte data words. Similarly, FIG. 19 shows the control data format for the 32 channel DSD embodiment arranged as 26*4-byte data words. In both FIG. 18A and FIG. 19, bit zero (B0) is transmitted first and bit 31 (B31) is transmitted last. These audio data frames and control data frames are passed to and received from the Media Independent Interface (MII) connection 218 that provides a link to the Ethernet physical layer devices. The MII comprises a 4-bit wide transmit data bus and a 4-bit wide receive data bus each of which is clocked from the PHY at the link rate of 25 MHz (or 25.4016 MHz). The MII also has a transmit-enable signal input to initiate data transmission and a receive data valid signal output as well as other error and signal status indicators.

Referring now to the audio data frame structure illustrated in FIG. 18A it can be seen that the payload of the audio data frame contains 370 samples of 32-channel 64 Fs DSD audio. These channels are multiplexed per-bit. Each 32-bit word represents one 64 Fs DSD sample for 32 audio channels. Word 13 is the first DSD sample in the frame, and word 382 is the last. Bit 0 of an audio data word is always the single-bit sample data for channel 1 (the first channel in the system) whereas Bit 31 of an audio data word is always the single-bit sample data for channel 32 (the last channel in the system). Table 3 below indicates how successive samples for each channel are stored in the data words of the audio frame. For example: bit 0 of word 13 is the channel 1 sample data, for the first DSD sample in the frame; bit 6 of word 14 is the channel 7 sample data, for the second DSD sample in the frame; and bit 31 of word 382 is the channel 32 sample data, for the last DSD sample in the frame.

TABLE 3

| Word | Bit 31 | Bit 30 | ... | Bit 1 | Bit 0 |
|---|---|---|---|---|---|
| 13 | Ch. 32, sample 1 | Ch. 31, sample 1 | ... | Ch. 2, sample 1 | Ch. 1, sample 1 |
| 14 | Ch. 32, sample 2 | Ch. 31, sample 2 | ... | Ch. 2, sample 2 | Ch. 1, sample 2 |
| ... | ... | ... | ... | ... | ... |
| 382 | Ch. 32, sample 370 | Ch. 31, sample 370 | ... | Ch. 2, sample 370 | Ch. 1, sample 370 |

Although Table 3 above represents the frame format in 32-bits words, these are supplied to and from MII four bits (a nibble) at a time rather than a word (4-bytes) at a time. The sequence of nibbles supplied to the MII for the single 24 DSD channel frame of FIG. 18B is as shown in Table 4 below. The start of the 14$^{th}$ data 4-byte word (word 13) corresponds to the start of the 105$^{th}$ 4-bit nibble (nibble 104). The column headings TXD and RXD in the table below refer to the MII transmit and receive data buses respectively, which transfer nibbles of data synchronously with a 25 MHz (or 25.4016 MHz) clock.

Nibble 0 is the first nibble in the frame, and contains part of the preamble pattern (0×5). Nibble 104 is the first nibble of the audio data field (first nibble of word 13), and nibble 3063 is the last nibble of the audio data field (last nibble of word 382).

TABLE 4A

| nibble | TXD(3)/RXD(3) | TXD(2)/RXD(2) | TXD(1)/RXD(1) | TXD(0)/RXD(0) |
|---|---|---|---|---|
| 0 | 0 | 1 | 0 | 1 |
| 1 | 0 | 1 | 0 | 1 |
| ... | ... | ... | ... | ... |
| 104 | channel 4 sample 1 | channel 3 sample 1 | Channel 2 sample 1 | channel 1 sample 1 |
| 105 | channel 8 sample 1 | channel 7 sample 1 | Channel 6 sample 1 | channel 5 sample 1 |
| 106 | channel 12 sample 1 | channel 11 sample 1 | Channel 10 sample 1 | channel 9 sample 1 |
| ... | ... | ... | ... | ... |
| 111 | channel 32 sample 1 | channel 31 sample 1 | Channel 30 sample 1 | channel 29 sample 1 |
| 112 | channel 4 sample 2 | channel 3 sample 2 | Channel 2 sample 2 | channel 1 sample 2 |
| ... | ... | ... | ... | ... |
| 3062 | channel 28 sample 370 | channel 27 sample 370 | Channel 26 sample 370 | channel 25 sample 370 |
| 3063 | channel 32 sample 370 | channel 31 sample 370 | Channel 30 sample 370 | channel 29 sample 370 |

FIG. 18B schematically illustrates the audio data frame format for the 24 DSD channel embodiment. In this case the frame comprises 368*4-byte data words. The payload of the audio data frame comprises 352 DSD samples, each sample comprising 1-bit from each of the 24 channels. Data words 15 to 366 contain the audio data payload. Words 2 to 4 are reserved for source and destination MAC addresses. Bits 0 to 15 of word 5 specifies the total number of bytes in the frame from the beginning of the length field onwards but excluding the CRC field, which in this case is 1446 bytes. Bits 16 to 31 of word 5, words 6 to 12 and bits 0 to 15 of word 13 are data fields reserved for UDP and IP parameters. These data fields facilitate optional use of UDP/IP. When UDP/IP operation is not required the transmitter fills these fields with zeros. The receiver may ignore all these UDP/IP header fields, with the exception of the first four bits (bits 16 to 19 of word 5 in this case) which indicate the IP Version. The data entry in the IP version field is checked and an action is taken in correspondence with the determined value as specified in Table 5 below:

TABLE 5

| IP Header Value | Consequent Action |
|---|---|
| 0x0 | Process frame as normal (i.e. transmitter did not fill IP fields) |
| 0x4 | Process frame as normal (i.e. transmitter filled frame header fields according to IP version 4) |
| any other | Discard the frame |

The IP Version check is performed to ensure backwards compatibility of the current IP version 4 from future IP versions (i.e. IP version 6). Future IP versions may have different header lengths, and consequently the Frame Format ID fields may be located at a different position in the frame. The safeguard of checking the IP version field means that such a frame would be discarded by the receiver (due to having a value other than 0x0 or 0x4) which avoids the possibility of the frame being incorrectly interpreted due to the Frame Format ID fields not being in the expected location at words 13 and 14.

Bits 16 to 31 of word 13 and bits 0 to 31 word 14 in FIG. 18B are fields for specifying the MAC-DSD frame format. This 48-bit frame format field is logically divided into three distinct 16-bit (4-nibble) sections, each of which contains an identical set of frame format data on transmission. The same set of frame format data is repeated three times within a given frame to ensure that the frame format identifier is robust to transmission errors i.e. multiple copies of the data are sent to serve as an error protection mechanism. This data-repeat error protection mechanism has the advantage that it gives the required error correction capability given that 48 bits are available to convey 16 bits of information yet it is simple to implement. An alternative embodiment might use an error correction code such as a convolutional code to transmit the frame format ID payload.

Each of the three 16-bit frame format field sections are structured as illustrated in FIG. 20. The first nibble (bits 0-3) of each 16-bit section specifies the Protocol Minor Version (OxO-Oxf). The protocol minor Version field is used to indicate minor updates to the protocol specification. A more recent Minor Version should be fully backwards-compatible with a previous Minor Version associated with the same Major Version so that for example a Version 1.7 protocol must incorporate all the functionality of Version 1.6 protocol, and a Version 1.7 transceiver must be able to communicate fully with a Version 1.6 transceiver. The second nibble (bits 4-7) of each 16-bit section specifies the Protocol Major Version (OxO-Oxf). This field is used to indicate major updates to the protocol specification. Backwards-compatibility with previous Major Versions of the protocol is desirable but not mandatory. The third nibble (bits 8-11) of each 16-bit section specifies the Frame Type (OxO-Oxi). This field can be used to indicate different frame types used by a given version of the protocol. Within a given Major Version level, the definitions of frame types should be consistent. The basic type of audio frame is always Type 0. The table below specifies the information derivable from the Frame type number specified by bits 8 to 11 according to the described embodiment.

TABLE 6

| Frame Type Number | Name | Description |
|---|---|---|
| 0x0 | DSD audio frame | 352 DSD (2.8224 MHz) samples, 24-channel, plus 88 bytes aux data, (32, 26) Hamming linear block code error correction, 256-nibble interleaving |
| other | (invalid) | Invalid - reject frame |

The fourth nibble (bits 12-15) of each 16-bit section contains one or more flags used for example to flag frames for synchronisation purposes as described above with reference to the flow chart of FIG. 13. The definition of the flag bits is dependent upon the Major Version protocol level. The table below specifies the information derivable from the frame flag bits 12-15 according to the described embodiment. In particular bit 0 of the flags field is the 44.1 kHzsync flag. If flag 0 has a value 1 this indicates that the first DSD sample in frame was received at transmitter simultaneously with 44.1 kHz sync clock positive edge whereas if bit 0 of the flags field has value 0, this indicates that the first DSD sample in frame was not received at transmitter simultaneously with 44.1 kHz sync clock positive edge.

TABLE 7

| Flag bit | Name | Description |
|---|---|---|
| 0 | 44.1 kHz sync flag | 1: First DSD sample in frame was received at transmitter simultaneously with 44.1 kHz sync clock positive edge<br>0: First DSD sample in frame was not received at transmitter simultaneously with 44.1 kHz sync clock positive edge |
| others | (not used) | Set to 0 by transmitter, ignored by receiver |

Figure 21:
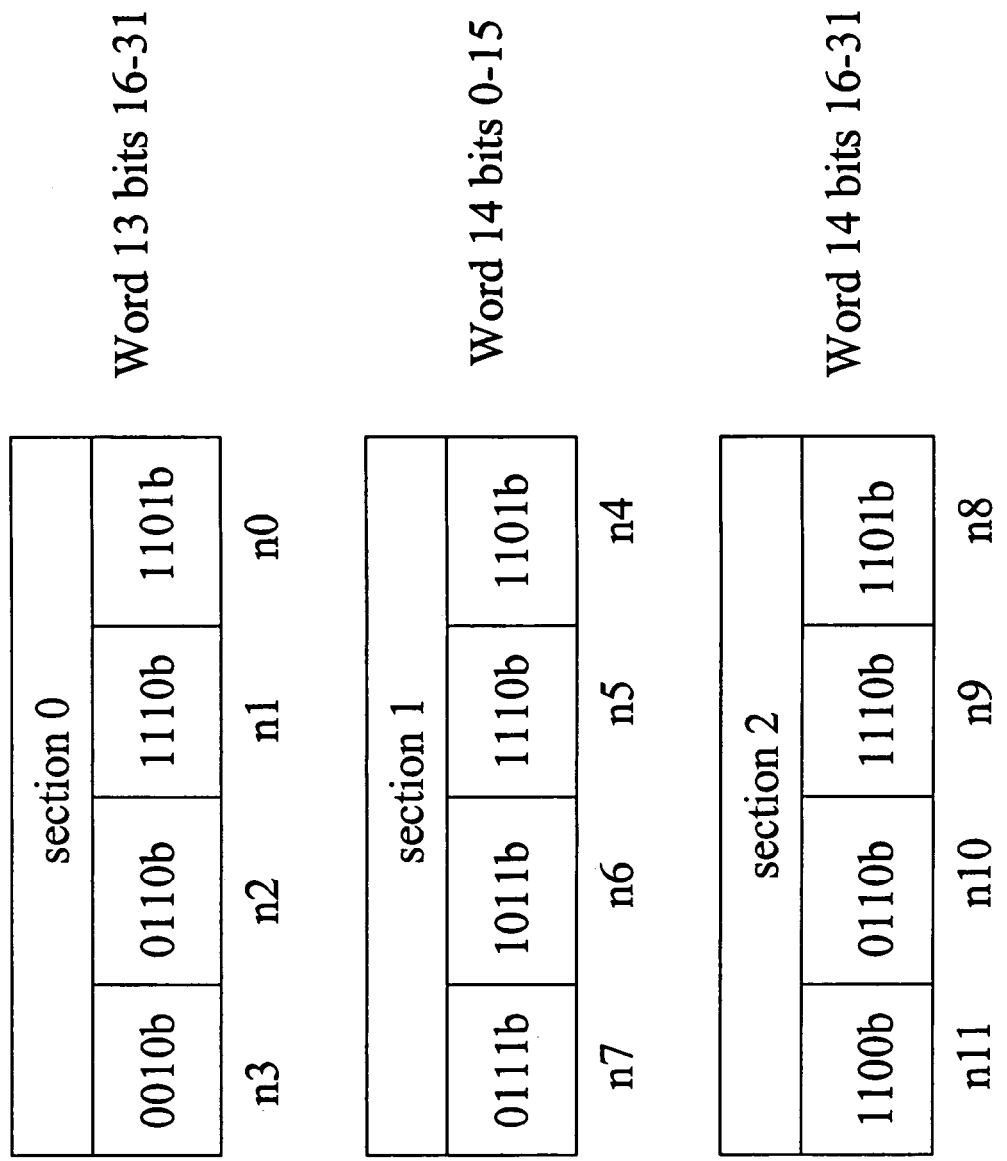
FIG. 21 schematically illustrates the three 4-nibble sections of the frame format ID containing a set of data entries to be processed at the receiver.

FIG. 21 schematically illustrates the three 4-nibble sections of the frame format ID containing a set of data entries to be processed at the receiver. Section 0 comprises nibble 0 (n0) to nibble 3 (n4), section 1 comprises nibble 4 (n4) to nibble 7 (n7) and section 2 comprises nibble 8 (n8) to nibble 11 (n11). The manner in which the repetition of data sections is used at the receiver to reject data transmission errors will now be explained in the context of FIG. 21. According to the present technique it is known that on transmission, each of the three sections should contain an identical data set such that data entries in corresponding nibble positions of each of the three sections match. On particular it is expected that: n0=n4=n8; n1=n5=n9; n2=n6=n10; and n3=n7=n11. At the receiver triplets of corresponding nibbles are compared for equality, and a majority decision is taken as to the correct data value. Consider the example incoming receiver data set shown in FIG. 21. For the first triplet of nibbles it can be seen that n0=1101b, n4=1101b, n8=1101b i.e. the corresponding nibble values are identical so the value is assumed to be correct and the first nibble of the Frame Format, which specifies the protocol minor version, is set to the value 1101b. Similarly, for the second triplet of nibbles n1=n5=n9=1110b so the value is assumed to be correct and the second nibble of the Frame Format, which specifies the protocol major version, is set to 1110b. However, for the third triplet of nibbles there is a discrepancy between the data values since n2=n10=0110b but n6=1011b. In this case n6 is rejected as being erroneous on the basis of a majority decision so that the receiver and outputs the third nibble of the Frame Format, which corresponds to the frame type, as 0110b. For the fourth and final triplet of nibbles it can be seen from FIG. 21 that none of the corresponding nibbles match n3=0010b, n7=0111b, n11=1100b. In this case a majority decision is impossible so the frame format cannot be determined and consequently the frame is rejected.

An alternative embodiment uses a modified Frame Format error detection/correction strategy. This alternative strategy also involves using the data repetition and majority decision approach but the strategy is augmented by using the 100Base-TX PHY 'MII receive error' (rx_er) signal to flag nibbles that are known to be in error. For example consider receiving the following values for the fourth triplet of nibbles with associated error flags as indicated: n3=1000b (rx_er=true), n7=0100b (rx_er=false), n11=1000b (rx_er=true). In this case, although the majority decision determines that 1000b is the correct value, the rx_er signal indicates that n3 and n11 are definitely incorrect. Thus according to this alternative strategy the data vale n7 is selected in preference to n7 and n11 to give a Frame Format Flags value of 0100b.

Returning now to the frame data fields of FIG. 18B, the last word (word 367) of the 24 DSD channel data frame is a field containing cyclic redundancy check (CRC) data.

Table 4B below identifies the sequence of nibbles supplied to the MII for the single 24 DSD channel frame of FIG. 18B. This sequence is transmitted via the nibble-wide MII interface 218, starting with the least significant nibble. Nibbles 0 to 8 (32 bits) correspond to word 0 of FIG. 18B, nibbles 8 to 15 correspond to word 1 of FIG. 18B, nibbles 16 to 23 correspond to word 2 of FIG. 18B and so on until the last nibble which corresponds to bits 28 to 31 of word 366. There are a total of 2936 nibbles (367 words) corresponding to the 1446 byte frame of FIG. 18B since the last word is not transmitted as a nibbles. As mentioned above with reference to FIG. 1 the MII 218 interface provides independent 4-bit wide data-transmit and data-receive paths and full duplex operation. More particularly, the MII 218 comprises: a four-bit wide transmit data bus, clocked from the physical layer interface (PHY) 514, 526 at the link rate (25 MHz or 25.4016 MHz); a transmit enable signal input; four-bit (nibble) wide receive data bus, clocked from the PHY at the link rate (25 MHz or 25.4016 MHz); a receive data valid signal output; and error and signal status indicators. A full description of the MII interface, can be found in IEEE802.3-2000 Section 22, but note that the clock rate according to the present technique may be 25.4016 MHz rather than the IEEE standardised 25.0000 MHz.

TABLE 4B

| Nibble | Word (from FIG. 18B) | MII TXD(3) | MII TXD(2) | MII TXD(1) | MII TXD(0) |
|---|---|---|---|---|---|
| 0 | 0 | Bit 3 | Bit 2 | Bit 1 | Bit 0 |
| 1 | 0 | Bit 7 | Bit 6 | Bit 5 | Bit 4 |
| ... | ... | ... | ... | ... | ... |
| 7 | 0 | Bit 31 | Bit 30 | Bit 29 | Bit 28 |
| 8 | 1 | Bit 3 | Bit 2 | Bit 1 | Bit 0 |
| ... | ... | ... | ... | ... | ... |
| 2934 | 366 | Bit 27 | Bit 26 | Bit 25 | Bit 24 |
| 2935 | 366 | Bit 31 | Bit 30 | Bit 29 | Bit 28 |

The nibble is the fundamental unit of data carried on the physical layer. Each 4-bit nibble is mapped to a 5-bit symbol by the PHY 514, 526, for transmission on the signal line 515. All frames for transmission must begin with an eight-byte preamble pattern, following which the physical layer will accept up to 1528 bytes of arbitrary data, supplied 4 bits at a time. Received frames are supplied 4 bits at a time by the receive bus, including the preamble.

The 24 DSD channel frame format of FIG. 18B includes a frame payload of 352 DSD samples, each of which consists of a 32-bit data block. FIG. 22 schematically illustrates the format of the 32-bit data block. Each data block corresponds to a single DSD sample period of approximately 354 ns. The data block comprises a 24-bit audio data vector each bit of which belongs to a respective one of the 24 audio channels, 2 bits of auxiliary data and 6 check (or parity) bits. As shown in FIG. 22 bit numbers 0 to 14 contain bits 1 to 15 of the audio data vector, bit numbers 15, 23, 27, 29, 30 and 31 contain the six parity bits, bit numbers 26 and 28 contain the two bits of auxiliary data and the remaining nine bits of the audio vector are contained sequentially in bit numbers 16 to 22, 24 and 25 of the data block.

The six parity bits of the 32-bit data block provide error control capability. The 24-bits of audio data plus the two auxiliary bits (totalling 26 bits) are encoded using a type of linear block code known as a Hamming code. In this case a (31, 26) Hamming code is used, which means that 5(=31-26) parity bits are generated by the code for each group of 26 data bits. The final bit of the 32-bit block is a global parity bit so there are a total of 6 parity bits and 26 data bits. The (31, 26)

Hamming code is capable to detecting 2 errors per data block but is only capable of correcting one error per data block.

FIG. 23A schematically illustrates how the six parity bits P0 to P5 are generated from the 24 audio data bits (numbered 1-24) and the two auxiliary data bits A0, A1. Parity bits P0 to P5 are generated by performing a logical XNOR operation on a predetermined sequence of 15 data elements. For example P0 is generated by performing an XNOR operation on audio vector bits 1 through 15 whereas P1 is generated by performing an XNOR operation on audio vector bits 1 to 8 and 16 to 22. Global parity bit P5 is obtained by performing the XNOR operation on all 26 data elements. The error detection process at the receiver involves determining whether the parity checks are satisfied in the received data sequence. This is done using a value known as the syndrome. FIG. 23B indicates how the syndrome s is generated by XNOR operations on various combinations of the received data block elements. The syndrome is obtained by comparing the received parity bits and the parity bits recalculated from the received information. Table 8 below indicates how the value of the syndrome is used to detect and correct errors in the received data block. Essentially, if all 6 bits of the syndrome have value 1(s=111111) then the received data sequence is assumed to be correct. If the sixth bit of the syndrome is zero then there is assumed to be a single error in the received data block, which is correctable by inverting the appropriate bit. The appropriate bit is identified from the value of the syndrome itself e.g. if s=011011 in binary notation, which corresponds to the decimal number 27 then it is determined that bit number 27 (of bits 0 to 31) should be inverted to correct the data block. If the sixth bit of the syndrome is 1 but the other five bits are not all 1 e.g. s=111011 then this indicates that there are two or more errors in the block and the multiple errors are uncorrectable.

TABLE 8

| $s_5$ | $s_4 s_3 s_2 s_1 s_0$ | Block status |
|---|---|---|
| 1 | 11111 | No errors in block |
| 0 | other | One error in block, identified by $s_4 s_3 s_2 s_1 s_0$ - correct error by inverting bit |
| 1 | other | More than one error in block - not correctable |

The 32-bit data blocks (see FIG. 22) are interleaved in groups of 32, to facilitate correction of groups of errors. The interleaving process involves permuting the data in a predetermined way. This is required because the (31, 26) Hamming code used for each 32-bit data block is only capable of correcting a single bit error in a given block. Since the fundamental unit of data on the physical layer the four-bit data nibble, a single instantaneous corruption on the physical layer will cause a symbol error (recall that a symbol is a 5-bit quantity), resulting in four consecutive bit errors. To facilitate correction of such 4-bit burst errors the erroneous bits must be distributed amongst four different 32-bit data blocks.

Consider a stream of 352 32-bit data blocks B0, B1, B2, . . . B351 emerging from the parity generator for transmission. Recall that the 24 DSD channel frame of FIG. 18B comprises an audio data payload of 352 32-bit data blocks. The resulting stream of nibbles from the interleaver is comprised as shown in FIG. 24. In this Figure the bits of the audio payload are labelled such that B2[0] refers to bit 0 of block 2, for example. Thus it can be seen that nibble zero comprises bit 0 of blocks 0, 1, 2 and 3 respectively; nibble 1 comprises bit 0 of blocks 4, 5, 6 and 7 respectively and so on. Accordingly, nibbles 0 to 7 collectively comprise bit 0 of each of the thirty-two 32-bit data blocks, nibbles 8 to 15 collectively comprise bit 1 of each of the thirty-two 32-bit data blocks and nibbles 2802 to 2815 comprise bit 31 of each of the thirty-two 32-bit data blocks. The 32-block interleaving system used by MAC-DSD facilitates the correction of up to eight symbol errors (i.e. 32 bits can be corrected overall) in a group of 32 interleaved data blocks (256 nibbles or symbols).

In summary, the version of the MAC-DSD protocol used for transmission of 24 DSD channels as described above with reference to FIGS. 18B and 20 to 23 has key features including: 24-channel, full-duplex transfer of 2.8224 MHz DSD audio; 100Base-TX physical layer; audio latency of less than 50 microseconds; Hamming linear block code error correction, with 256-nibble interleaving, to correct up to 8 nibble errors per 256-nibble block group; 64 fs DSD clock transfer in both directions; and frame flag indication for transfer of the 44.1 kHz sync signal.

Figure 25:
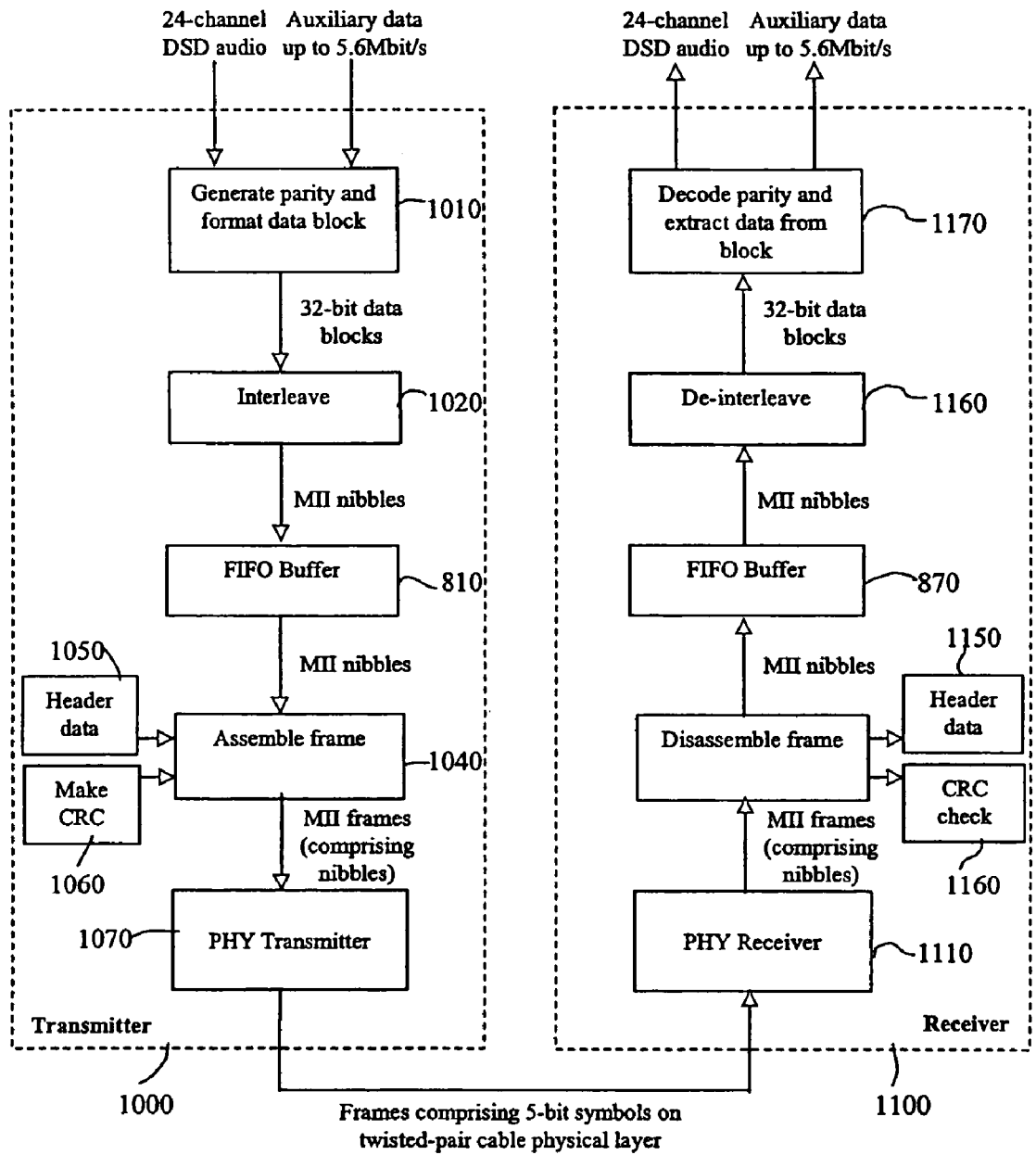
FIG. 25 schematically illustrates the protocol layers of the MAC-DSD protocol for the particular example embodiment using the 24 DSD channel frame format.

FIG. 25 schematically illustrates the protocol layers of the MAC-DSD protocol for the particular example embodiment using the 24 DSD channel frame format. On the transmitter side 1000 the protocol layers comprise a parity generating and formatting layer 1010 that receives the incoming 24 channel DSD audio stream and an auxiliary data stream of up to 5.6 Mbit/s. This layer 1010 generates six parity bits for each 24 audio bit and 2 auxiliary bit sample and formats the resulting 32-bit data block. The 32-bit data blocks output by the parity generating and formatting layer 1010 are supplied to an interleaving layer 1020 that interleaves the data blocks in groups of 32 and outputs the interleaved data across the MII 218 in 4-bit nibbles as specified in FIG. 24. The nibbles of data from the interleaver are supplied to the FIFO buffer 810 of the transmitter at a continuous data rate of 90.3168 Mbit/s. The nibbles continue to fill the FIFO buffer 810 until the predetermined threshold buffer occupation level is reached (as described with reference to FIG. 14) whereupon assembly of a data frame begins. During data frame assembly data nibbles are read out of the FIFO buffer 810 and passed to a frame assembly layer 1040. The frame assembly process involves use of a header data generation module 1050 that generates frame header information and a CRC generation module 1060 that generates data for the CRC field, which is word 367 of the frame format of FIG. 18B. The frames are assembled such that they contain a 1408 byte payload of 352 DSD samples contained in 352 32-bit data blocks. Data from the frame assembly layer 1040 is output as MII frames (which comprise nibbles) at a rate of 101.6064 Mbit/sec and supplied to the transmitter physical layer 1070 which prepares the data for transmission across the physical medium. The transmitter physical layer 1070 forms a 5-bit symbol from each 4-bit nibble and the symbols are transmitted to the receiver across a twisted-pair cable. On the receiver side 1100 a receiver physical layer 1110 receives the 5-bit symbols and processes them to form MII frames comprising 4-bit nibbles. The MII frames are supplied to a frame disassembling layer 1120 at a rate of 101.6064 Mbit/sec, which performs the CRC checks and strips off the header data for subsequent processing. The frame payload is output by the frame disassembling layer 1120 as MII nibbles which are fed to the FIFO buffer 870 (as described above with reference to FIG. 15) which has a low latency with regard to data output. Data is output from the FIFO buffer 870 in the form of MII nibbles and passed to a deinterleaving layer 1160. The de-interleaver de-interleaves the data in groups of 32 data blocks to reconstruct individual 32-bit data blocks of the format illustrated in FIG. 22. The 32-bit data blocks are then passed to a parity decoding and data extraction layer 1170 whereupon the parity data is used to perform error control and the recovered payload data is extracted. The output of this layer is a 24 channel DSD audio stream and an auxiliary data stream of up to 5.6 Mbits. Note that in FIG. 25, although the FIFO buffers 810, 870 do not perform any data translation and therefore are not technically protocol layers, they are included in the schematic illustration of the protocol layer structure for completeness.

Note that in the case of the 352 sample payload of the 24 DSD channel frame format of FIG. 18B, the transmission buffer size and predetermined buffer occupancy threshold differs from the buffer size and occupancy threshold specified in the description of FIG. 14 above for the 370 sample payload of the 32 DSD channel Frame Format of FIG. 18A. In particular, for the 24 DSD channel frame format the minimum buffer size is 36 data blocks (rather than 42 data blocks) and the corresponding minimum occupancy threshold value is 30 data blocks (as before). The audio latency introduced by this buffering is equivalent to 36 DSD samples (rather than 42 samples) or 14.9 microseconds (rather than 12.2 microseconds).

The above described system in which the physical layer of a link such as an Ethernet link is used to provide a data communication system for transmission of DSD data may also be used to transmitted other types of clocked digital data. In particular the system may be adapted to accommodate transmission of Pulse Code Modulated (PCM) digital data. The physical layer connection according to the present technique offers high bandwidth for communication of PCM data.

PCM data is clocked at a much lower frequency (e.g. 44.1 kHz-96 kHz) than the 64 Fs clocking frequency of DSD data. Accordingly, in order to support PCM transmission as well as DSD transmission a further lower frequency clock signal, which shall be referred to as the word clock signal, is communicated between networked devices along the twisted pair cable. The word clock is used for reproduction of PCM data at the receiver. The frame format for 24 DSD channels as illustrated in FIG. 18B allows for transmission of 352 bits of data per frame for each of 24 audio channels. Essentially, 352 24 bit DSD samples (one bit per channel) are transmitted in a single frame. Data blocks are transferred over the link at an aggregate rate of 64 Fs, that is, 2.8224 MHz (=64*44.1 KHz) for 44.1 kHz based audio and 3.072 MHz for 48 kHz based audio. In order to transfer PCM data in the desired frequency range of (44.1 kHz-12.5%) to (96 kHz+12.5%) at the required data rates it is necessary to accommodate between 4 and 13 24-bit samples per frame. Accordingly, a number of alternative data formats are defined so that at the transmitter it is decided how many samples should be sent in the next frame and a look-up-table is consulted to select the appropriate one of the alternative data formats. Known PCM transmission formats such as I2S and AES3-1992 and package PCM sample data in serial sub-frames. AES3 is an Audio Engineering Society standard for the serial transmission format for linearly represented digital audio data over conventional shielded twisted-pair conductors, of up to at least 100 m in length, without equalisation. FIG. 26A schematically illustrates the AES3 sub-frame format. Each AES3 frame is uniquely composed of two sub-frames and typically the rate of frame transmission corresponds exactly to the source sampling frequency. The first sub-frame starts with the preamble X but the preamble changes to Z once every 192 frames. This defines the block structure used to organise the channel status information. The second sub-frame always starts with preamble Y. As illustrated in FIG. 26A each AES sub-frame is 32-bits long in which: bits 0 to 3 contain a preamble; bits 4 (least significant bit) to 27 (most significant bit) contain a 24-bit audio sample word; bit 28 is a "V" field which carries a validity bit associated with the audio sample word; bit 29 is a "U" field which contains one bit of a user data channel associated with the audio data channel transmitted in the same subframe; bit 30 is a "C" field or channel status field which carries one bit of channel status information associated with audio data transmitted in the same subframe; and bit 31 is a "P" field which carries a parity bit such that time slots 4 to 31 inclusive will carry and even number of ones and an even number of zeros i.e. even parity. The V bit is logic 0 if the audio sample word is suitable for conversion to an analogue audio signal and is logic 1 otherwise. The C bit is one-bit of channel status information specifying for example the length of audio sample words, number of audio channels, sampling frequency etc. Channel status information is organised in 192-bit blocks sub-divided into 24 bytes. The first bit of each block is carried in the frame having preamble Z.

FIG. 26B schematically illustrates the sub-frame format for PCM transmission according to the present technique. This 27-bit sub-frame structure includes the U bit and C bit fields of the known AES3 sub-frame format to facilitate transparent transfer of AES3 format data across the physical layer link. As illustrated in FIG. 26B, bits 0 to 23 contain data, bit 24 contains the U bit, bit 25 contains the C bit and bit 26 contains an M bit. The U and C bits are taken directly from incoming AES3 data streams or from the user data and channel status buffer memory in the transmitter. The M-bit is a multiplexed bit specific to the present technique and may be used to contain any of the three following indications at certain points in the bitstream: an S bit which is a flag that identifies an external Fs/n (n integer) synchronised data sample and is repeated across all data channels every n periods of Fs; the Z bit that signals the start of the AES3 U/C data block which repeats on each channel every 192 samples; and the V bit which is the sub-sampled AES3 V-bit status. The S and Z indications are each used to identify particular samples within the audio data stream. Since the S and Z indications are by their nature periodic it should in principle be sufficient to simply specify their phase with respect to the sample clock. However, in practice the S and Z indications should be repeated moderately frequently to enable the link to lock rapidly on start-up and to detect any link failures in a timely manner. The M-bit marks an S indication with two consecutive logical 1's in the bitstream as shown in FIG. 27B whereas a Z indication is marked by a single logical '1' as shown in FIG. 27A. In order to indicate the sync sample (S-bit) by two consecutive logical '1's in the M bit data stream a counter is provided at the transmitter to pre-empt the occurrence of the sync signal. The V-bit status is indicated for each channel in the bit immediately following the S indication. This implies that V is indicated less frequently than per-sample, but is indicated per-channel at intervals of the S sync (i.e. typically Fs/2048, or about 46 ms at 44.1 kHz), and also assumes that V-bit status does not change rapidly, which is a reasonable assumption for the vast majority of audio applications. FIG. 27C shows a V-bit indication which is a logical 1 (true), thereby signaling that channel samples are valid resulting in three consecutive logical 1's in the bit stream (two 1's for the S-bit and 1 for the V-bit). FIG. 27D shows a V-bit indication of 0 (false) immediately following the two logical 1's of the S-bit. This signals that the channel samples are invalid. Since the M-bit is used to indicate a number of alternative events it is likely that event indications will either coincide or be close enough in succession to interfere. For this reason priority is always given to S indications over Z indications. As a consequence of this Z indications will occasionally be missed so it is appropriate to maintain counts of the U/C block phases in the receiver in order to set the Z-bits in outgoing AES3 streams in these circumstances. FIGS. 28A to 28E give examples of relative occurrences of S indications and Z indications and indicate whether or not the relative positioning requires that the Z indication be disabled. In FIG. 28A the Z indication coincides with the second bit of the S indication so Z is disabled and only S is indicated. In FIG. 28B the Z indication immediately precedes the S indication in the received M-bit sequence, in which case Z is disabled because S is imminent. Otherwise the three consecutive logical 1's would be indistinguishable from the S and V indication of FIG. 27C. In FIG. 28C the Z indication precedes the S indication but is separated from it by a single bit period. Since Z and S are sufficiently separated so that they do not interfere so both the Z indication and the S indication are enabled here. In FIG. 28D the Z indication immediately follows the S indication and could lead to ambiguity so the Z indication is disabled. In FIG. 28D, the Z indication follows the S indication with a single bit-period separation. As for FIG. 28C, Z and S are sufficiently separated so that they do not interfere so both the Z indication and the S indication are enabled here.

For the purposes of transferring PCM data between devices on the physical layer the frame format is basically the same as the format described above in relation to FIG. 18B. In particular, each frame is 1472 bytes long and the data payload consists of 352 32-bit data blocks. Each 32-bit block comprises 24 audio data bits and two auxiliary data bits, which together form 26 independent bit-stream segments of 352 bits per frame. In PCM mode, each of the 24 audio bitstreams is divided into a number of sample subframes which are separated by padding. The number of subframes varies from 4 to 13 in dependence upon the particular PCM sample frequency. This enables support for samples rates from 44.1 kHz-12.5% to 96 kHz+12.5%. Each sample sub-frame contains data from a single PCM sample.

For each possible number of sample subframes per bitstream segment, a specific arrangement of sample subframes and padding bits is defined. All padding bits should have the value 0. This determinism enables the receiver to correctly extract the sample subframes from the bitstream segment. These arrangements are shown in Table 9A. Table 9B gives a specific example of the subframe arrangement for the case of 9 sample subframes per frame.

TABLE 9A

| Number of sample subframes | Padding bits after each subframes | Final padding bits at end of bitstream segment |
| --- | --- | --- |
| 9 | 12 | 1 |
| 10 | 8 | 2 |
| 11 | 5 | 0 |
| 12 | 2 | 4 |
| 13 | 0 | 1 |

TABLE 9B

| Element | Bits |
| --- | --- |
| sample subframe 1 of 9, bit 0 first | 27 |
| padding | 12 |
| sample subframe 2 of 9, bit 0 first | 27 |
| padding | 12 |
| sample subframe 3 of 9, bit 0 first | 27 |
| padding | 12 |
| sample subframe 4 of 9, bit 0 first | 27 |
| padding | 12 |
| sample subframe 5 of 9, bit 0 first | 27 |
| padding | 12 |
| sample subframe 6 of 9, bit 0 first | 27 |
| padding | 12 |

TABLE 9B-continued

| Element | Bits |
| --- | --- |
| sample subframe 7 of 9, bit 0 first | 27 |
| padding | 12 |
| sample subframe 8 of 9, bit 0 first | 27 |
| padding | 12 |
| sample subframe 9 of 9, bit 0 first | 27 |
| padding | 12 |
| final padding | 1 |
| Total | 352 |

Accordingly, the data block audio bit usage for the frame format of FIG. 18B in PCM mode differs from the audio bit usage in DSD mode. A further difference in the frame format in PCM mode relative to DSD mode relates to the Frame Format ID values contained in the three identical frame ID sections in words 13 and 14 of FIG. 18B. The frame format ID fields of each section were outlined above with reference to FIG. 20. In summary, each frame format ID section comprises a flags field, a frame type field, a protocol major version field and a protocol minor version field. To accommodate PCM mode, the frame type field values are extended relative to those defined in Table 6 above. As specified in the table of FIG. 29, 10 new frame type values have been defined corresponding to the 10 different possibilities (integers in the range 4 to 13) for the number of sample subframes per frame. Two separate formats for the frame flags field of the frame format ID (see words 13 and 14 of FIG. 18B and FIG. 20) have been defined: one format for DSD frames and another format for PCM frames. The table of FIG. 30 shows the flags field format for a DSD frame. In this case flag bit 0 indicates whether or not the first DSD sample in the frame was received simultaneously with the 44.1 kHz sync clock positive edge whereas flag bit 1 indicates whether or not the first DSD sample in the frame was received simultaneously with the Fs/n sync clock positive edge. The tables of FIG. 31 show the flags field format for a PCM frame. In this case flag bits 0:1 specify the frequency of the audio base clock whereas flag bits 3:2 specify the base clock sample rate multiplier. The sample rate can be specified to be 1, 2, 4 or 8 times the base clock frequency Fs.

The PMC frame format described above relate to an example embodiment in which 24 audio channels are accommodated. An alternative embodiment may involve accommodating 48 audio channels in 1 Fs PCM mode (sample rate 44.1 kHz or 48 kHz±12.5%). In this case two audio channels are multiplexed onto each bitstream. The multiplexing may be implemented per sub-frame or per bit.

Figure 32:
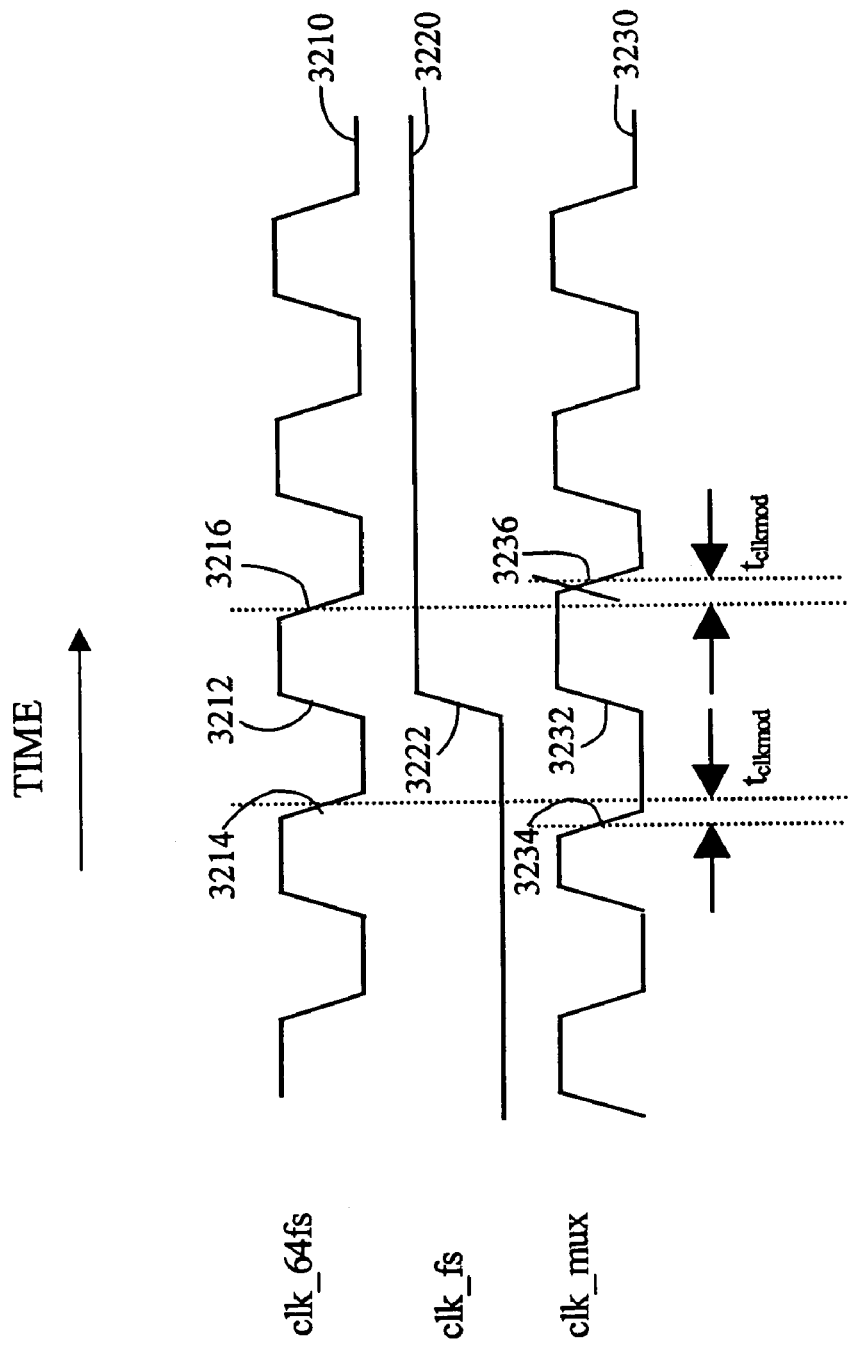
FIG. 32 schematically illustrates how a multiplexed clock signal is formed in dependence upon a 64 Fs signal and a word clock signal.

The clock and synchronisation functions of the PCM mode will now be considered in detail. As mentioned above, for transmission of PCM data across the network a word clock is required in addition to the 64 Fs MAC-DSD cable clock. Rather than sending two separate clock signals across the twisted pair cable, the 64 Fs clock and the word clock are multiplexed. The multiplexing process involves modulating the word clock signal onto the 64 Fs clock signal by shifting at least one edge of the 64 Fs clock pulse i.e. by generating a "clock pulse width deviation". The clock pulse width deviation acts as a phase indicator signal for the word clock, which is embedded in the 64 Fs clock. The clock pulse width deviation is formed by identifying certain transitions in the 64 Fs clock signal which are determined to be coincident with the word clock transitions at the transmitter. Since in this embodiment the positive-going transitions of the 64 Fs clock are used for timing synchronisation, the phase of the word clock is encoded by shifting the positions of negative-going 64 Fs clock transitions. In particular, where a word clock and 64 Fs clock transitions positive-going transition coincide, the preceding negative-going transition of the 64 Fs clock is shifted to produce a multiplexed clock signal. FIG. 32 schematically illustrates how the multiplexed clock signal is formed in dependence upon the 64 Fs signal and the word clock signal. In FIG. 32 the uppermost signal 3210 is the unmodified 64 fs clock signal used to synchronise the PLL in the receiver, the middle signal 3220 is the word clock signal used to synchronise PCM data framing in the receiver and the lowermost signal 3230 is the multiplexed clock signal in which the negative-going transitions have been shifted. The multiplexed clock signal 3230 is the clock signal that is transferred over the MAC-DSD link. In FIG. 32 time is increasing to the right along the horizontal axis. It can be seen that the positive going edge 3212 of the 64 Fs clock signal coincides with the positive-going edge 3222 of the word clock signal. Accordingly, the preceding negative-going edge 3214 of the 64 fs clock signal has been shifted back in time by time $t_{clkmod}$ thereby reducing the width of that clock pulse (see edge 3234 of in the multiplexed clock signal 3230) whilst the subsequent negative-going transition 3216 of the 64 fs clock edge has been shifted forwards in time by a corresponding time increment $t_{clkmod}$ (see edge 3236 of the multiplexed clock signal 3230) thereby increasing the width of the pulse. The negative transition 3236 after the word clock edge 3222 is delayed by the same amount that the preceding negative edge 3234 is advanced. The delay of the subsequent negative-going transition 3236 is performed by way of compensation to avoid DC content in the signal. DC content in the signal is likely to cause periodic "baseline shift" at the word clock frequency, when the signal is transmitted in an AC-coupled system. Performing this compensation on the clock cycle following the coincidence of the word clock and 64 Fs clock also reduces the Fs/n clock frequency content in the 64 fs signal. This is important, since it is desirable to reduce low-frequency jitter in the received 64 fs clock, which is typically used to feed a PLL circuit to generate an ADC/DAC audio sample clock. The edge offset time ($t_{clkmod}$) shown in FIG. 32 is exaggerated for ease of illustration. The true time shift will typically be very small, for example, one 2048 fs period (11.07 ns, at Fs=44.1 kHz). Note that the shift or "pulse width deviation" introduced to the clock mux signal shown in FIG. 32 does not occur every word clock cycle. Rather the clock pulse width deviation only occurs once every n clk_fs cycles, where n is an integer value controlled by a register. Effectively, introduction of the clock pulse width deviation every n word clock cycles amounts to multiplexing a clock signal of frequency Fs/n with the 64 fs clock. Since the frequency of the sample clock (word clock) is known, all that needs to be communicated by the transmitter is phase information which enables the receiver to reconstitute the word clock signal with a six-bit counter. The counter is reset by the Fs/n signal and incremented by the 64 fs clock. Note that the signal forms of FIG. 32 apply to both the transmitter (which generates the multiplexed clock) and receiver (which generates the Fs clock) ends of the connection.

Figure 34:
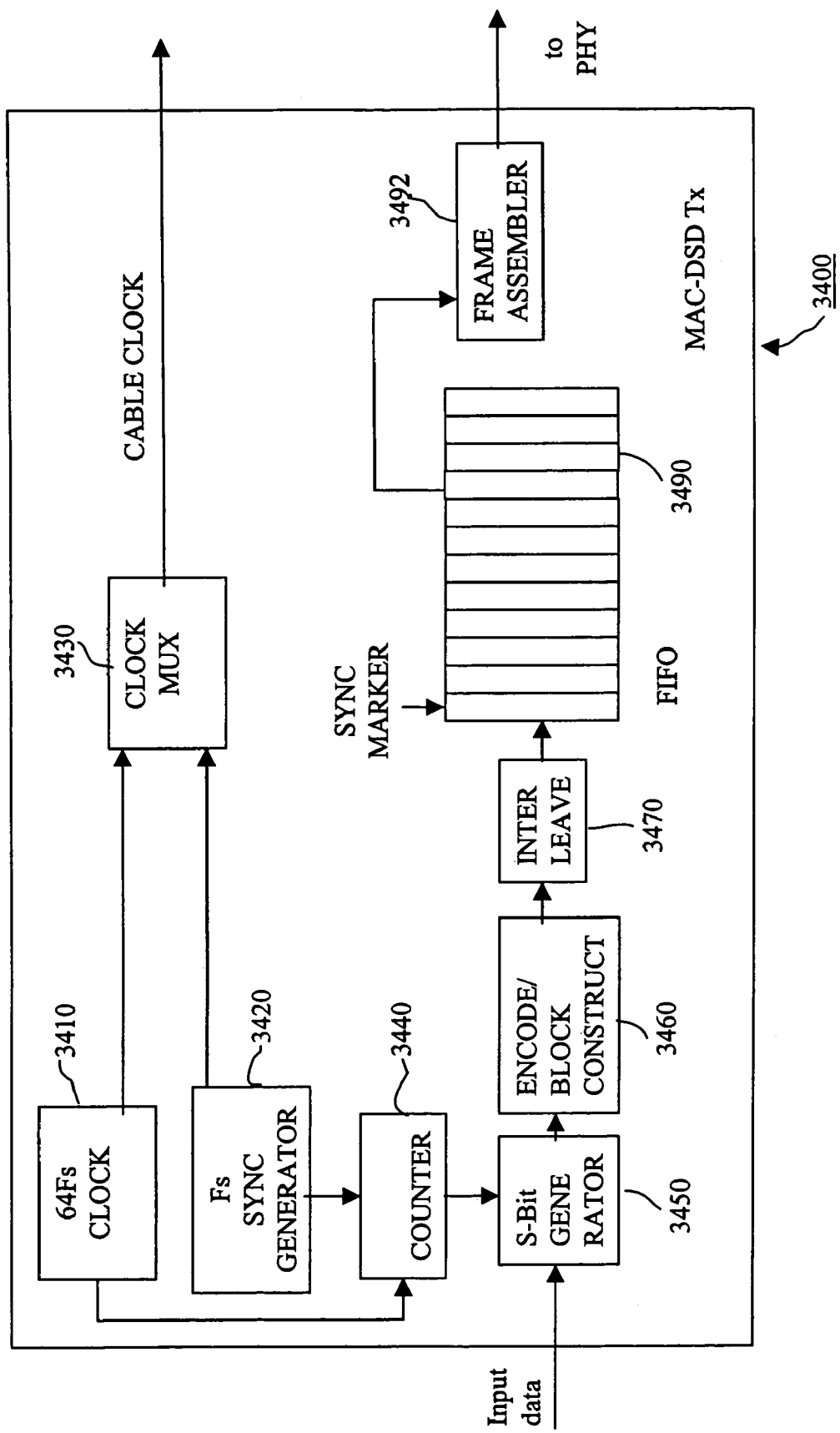
FIG. 34 schematically illustrates a MAC DSD transmitter adapted for transmission of both PCM and DSD data.

FIG. 34 schematically illustrates a MAC DSD transmitter 3400 (the counterpart of the FPGA 512 in FIG. 6) adapted for transmission of both PCM and DSD data. The MAC DSD transmitter module comprises: a 64 Fs clock generator 3410; an Fs sync generator (word clock generator) 3420; a clock multiplexer module 3430, a counter 3440; an S-bit generator 3450; an encoding and block construction module 3460; an interleaver 3470; a FIFO buffer 3490 and a frame assembler 3492.

Figure 33:
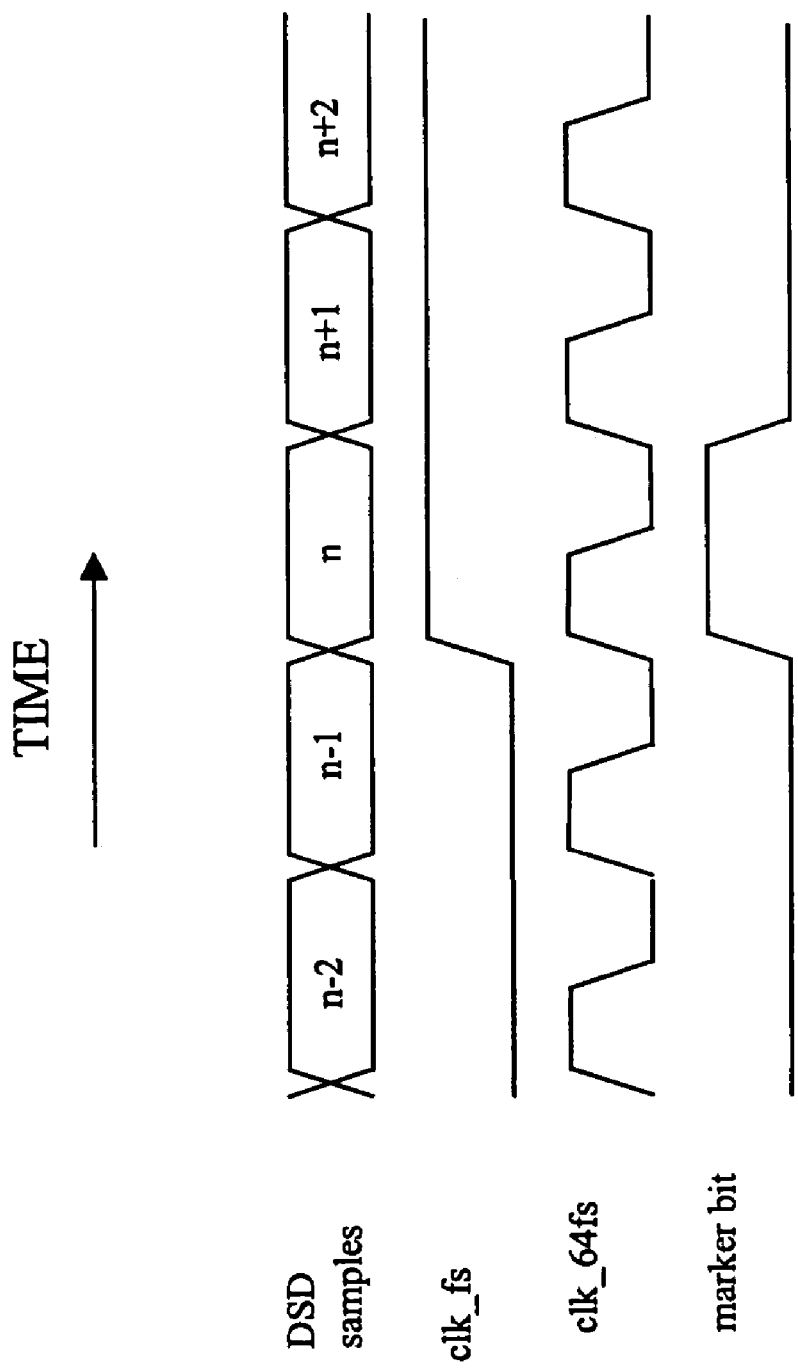
FIG. 33 schematically illustrates five consecutive DSD samples and their timing relationship with the local 64 Fs clock and the word clock.

The clock multiplexer 3430 generates the pulse width deviated clock signal (illustrated in FIG. 32) by shifting certain negative-going edges of the 64 Fs clock signal in dependence upon output from the word clock sync generator 3420. The pulse width deviated clock signal is transmitted across the twisted pair cable to the receiver. The counter 3440, keeps track of the 64 fs clock signal in order to pre-empt the occurrence of the Fs sync signal. It is necessary to pre-empt the Fs sync signal to facilitate generation of the S-bit in the audio data stream, which is performed by the S-bit generator module 3450. Note that the PCM samples are individually labelled with sync markers via the M-bit encoding (see 27-bit PCM audio sample structure of FIG. 27) whereas DSD mode frames rely on a frame flag bit being set in the transmitter and the marker bit of the first sample of the flagged frame being set on entry to the receiver FIFO. The output of the S-bit generation module 3450 is supplied to the encoding and block construction module where parity bits are generated and padding bits are inserted for PCM mode frames only to construct the 32-bit data blocks of the frame payload (see FIG. 18B). Data blocks from the encoding and block construction module 3460 are supplied to the interleaver 3470 which outputs 4-bit nibbles of interleaved data to the FIFO buffer 3490. The transmitter FIFO 3490 bridges the audio clock and link clock (PHY 514 in FIG. 6) domains of the transmitter. The transmitter FIFO buffer 3490 is 25 bits wide. Of the 25 bits, 24 bits are associated with 24 respective channels of concurrent DSD or PCM audio samples, the 25th bit being reserved as a synchronisation marker. The $25^{th}$ bit indicates whether the corresponding DSD or PCM audio sample occurred simultaneously with an Fs/n clock edge in the transmitter. This is illustrated in FIG. 33 which shows five consecutive DSD samples (n–2), (n–2), n, (n+1), (n+2) and their timing relationship with the local 64 Fs clock and the word clock. It can be seen that sample n corresponds in time to the coincidence of the positive going edge of the word clock and 64 Fs clock. Accordingly the positive-going edge of the marker bit coincides with the beginning of DSD sample n. Data is read out from the transmitter FIFO 3490 in dependence upon the occupancy threshold (as described above with reference to FIG. 14) and supplied to the frame assembler 3492. Data from the frame assembler 3492 is supplied to the PHY of the transmitter. The transmitter start-up procedure differs slightly for PCM mode and DSD mode operations. In PCM mode on start-up, the transmitter starts transmitting as soon as possible. Marked samples are explicitly indicated via the PCM sample subframe 'M-bit' encoding. However in DSD mode marked samples are not explicitly indicated but are derived from flag bit 1 of the frame flags as specified in the table of FIG. 30. Accordingly, on start-up in DSD mode, the transmitter holds-off transmitting the first frame until one of the marked samples (i.e. sample synchronous with Fs/n clock) is available in the FIFO. While the transmitter is in this hold-off state, samples are read-out of the PHY clock side of the FIFO and dropped. When a marked sample becomes available (as indicated by flag bit 1), the interleaving, encoding and frame formatting mechanisms are enabled, such that the first sample in the first frame is the marked sample. From this point, frame transmission is governed by the buffer status (to initiate frame assembly) and frame format rules.

Figure 35:
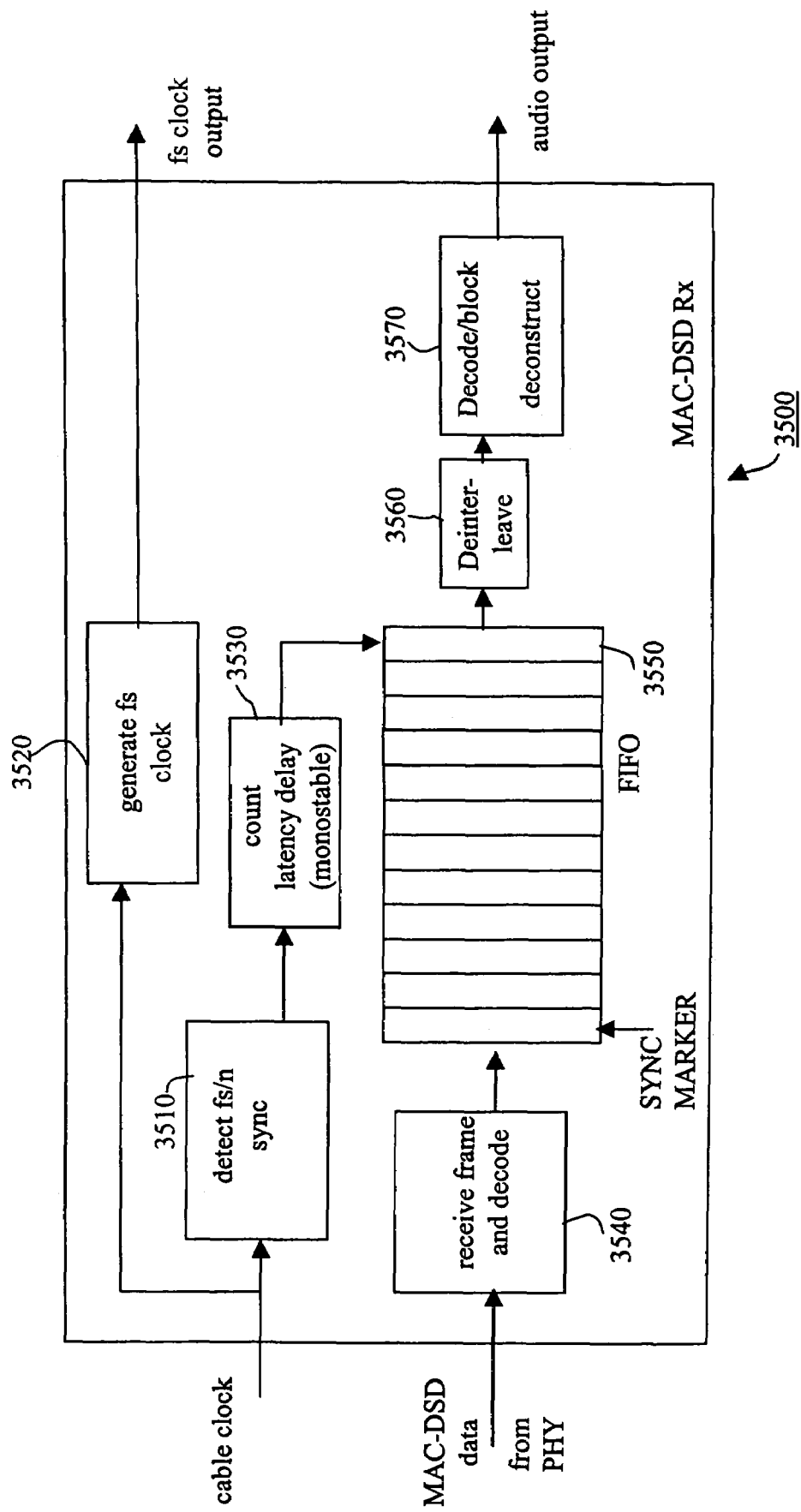
FIG. 35 schematically illustrates a MAC DSD receiver adapted for reception of both PCM and DSD data.

FIG. 35 schematically illustrates a MAC DSD receiver 3500 (the counterpart of the FPGA 526 in FIG. 7) adapted for reception of both PCM and DSD data. The MAC-DSD receiver 3500 comprises: an Fs/n sync detection module 3510; an Fs clock generation module 3520; a monostable counter 3530; a frame receiving and decoding module 3540; a FIFO buffer 3550; a deinterleaver 3560; and a decode/block deconstruction module 3570. The Fs/n sync detection module receives the pulse width deviated clock signal from the twisted pair cable and determines the relative phases of the 64 fs clock and the word clock on the basis of this signal. The Fs/n phase information is supplied as input to the word clock generation module 3520, which outputs the word clock (Fs) signal.

The incoming cable clock signal is passed directly to the local phase locked loop of the receiver system in order to synchronise the system. It is not possible to use the extracted Fs clock derived from the word clock generation module 3520 for this purpose. This is because the word clock generation module 3520 requires sequential logic that is clocked form the local PLL so that the extracted signal is always synchronous wit the local PLL. This means that the output of the word clock generation module 3520 is unsuitable as a synchronisation source for the PLL.

Note that the Fs clock signal in the receiver is of the same phase as the Fs clock signal in the transmitter as a result of the Fs/n sync. The Fs/n phase information is also supplied to the monostable counter. The monostable counter is triggered by reception of each Fs/n indication to count 64 fs clock periods. The FIFO output is disabled on detection of the first marked sample in the FIFO 3550, whereupon the FIFO begins to fill with data. After a number of 64 fs cycles equal to the predetermined link latency, the FIFO 3550 outputs are enabled. The predetermined link latency incorporates the delay incurred in the transmitter due to data encoding and frame assembly plus the delay incurred at the receiver due to the decoding process. The predetermined latency of the data link is programmed to be an exact multiple of 64 fs clock periods measured with respect to the Fs/n sync signal transmitted on the cable clock.

MII frames (comprising nibbles) from the PHY 526 of the receiver (see FIG. 7) are supplied as input to the frame reception and decoding module, where header data is removed, and error checks are performed. The decoded data is supplied as input to the FIFO 3550 in the form of MII nibbles. The FIFO outputs 4-bit data nibbles, which are supplied to the deinterleaver 3560 for deinterleaving. The deinterleaved data is then fed to the decode/block deconstruction module 3570 where the audio data payload data is extracted and output as an audio data stream.

Figure 36:
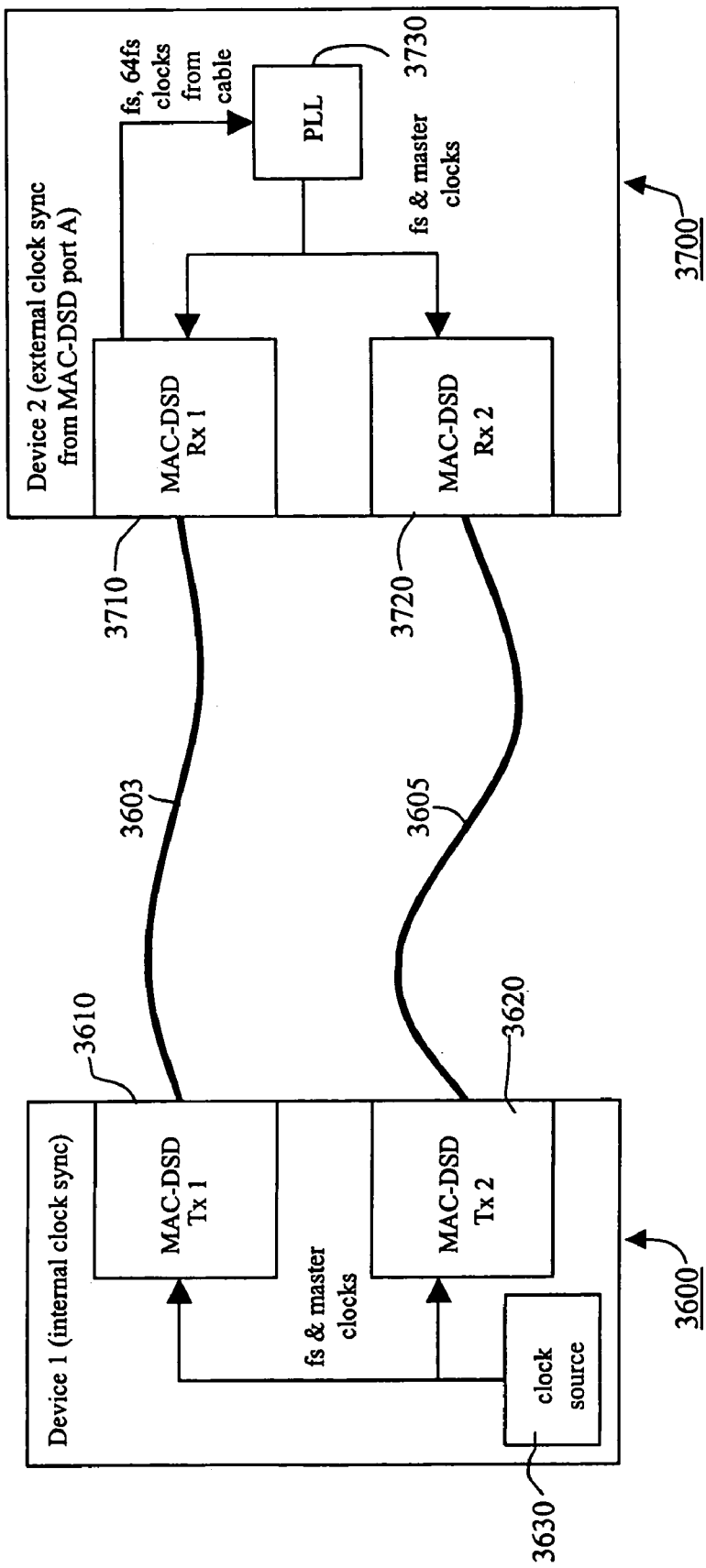
FIG. 36 schematically illustrates a system in which two sample-synchronous links are operated in parallel and in which the Fs/n sync is used to synchronise the parallel links.
Figure 37:
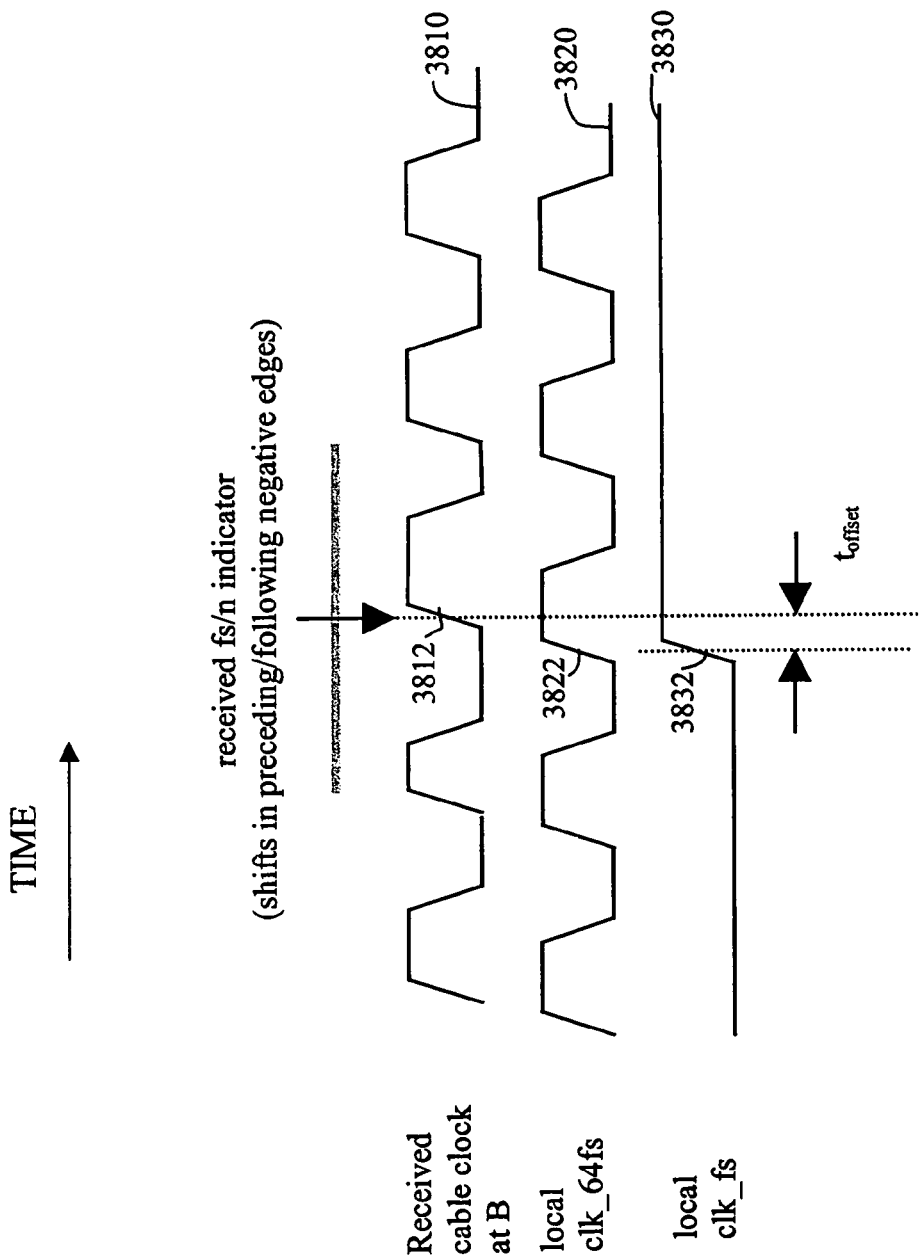
FIG. 37 schematically illustrates a measured difference in propagation delay between the two parallel links of FIG. 27.

FIG. 36 schematically illustrates a system in which two sample-synchronous links are operated in parallel and in which the Fs/n sync signal is used to synchronise the parallel links. The system comprises a transmitting device 3600 which is connected by a first cables 3603 and a second cable 3605 to a receiving device. The transmitting device 3600 has a first MAC-DSD transmitter 3610 which is connected to a first MAC-DSD receiver 3710 in the receiving device 3700 via the first cable 3603. The transmitting device 3600 also has a second MAC-DSD transmitter 3620 which is connected to a second MAC-DSD receiver 3720 in the receiving device 3700 via the second cable 3603. The two MAC-DSD transmitters 3620, 3620 are driven by an internal clock source 3630 that supplies them with both a 64 Fs clock and a word clock. In the receiving device 3700 only the first MAC-DSD receiver 3710 acts as a clock source thereby serving as a master clock. This receiver 3710 derives the word clock signal and the 64 Fs clock signal from the multiplexed clock signal received via the first cable 3603. Note that if a separate word clock source were used then neither of the MAC-DSD receivers 3710, 3720 would serve as a master clock source. The 64 Fs and word clocks extracted from the link cable 3603 are supplied to a PLL 3730 that outputs a word clock signal and a 64 Fs clock signal to both the first MAC-DSD receiver 3710 and the second MAC-DSD receiver 3720. The second MAC-DSD receiver 3720, which is not serving as the master clock source, should re-clock the multiplexed clock signal received via the second cable 3605 in order to detect the Fs/n indicator (i.e. the clock pulse width deviation). The propagation delay on the link via the first cable 3603, is likely to be different from the propagation delay on the link via the second cable 3605. The difference in propagation delay between the first link 3603 and the second link 3605 is determined by comparing the position of the received 64 fs clock edges with the locally-regenerated 64 fs clock (from PLL 3730), and by comparing the position of the received Fs/n indicator with the locally-regenerated Fs word clock, (also from PLL 3730). FIG. 37 schematically illustrates a measured difference in propagation delay between the two links. It can be seen from FIG. 37 that the positive-going clock edge 3812 immediately following the shifted negative-going clock edge (pulse width deviated pulse) in the clock multiplexed signal 3810 is shifted relative to the corresponding positive-going clock edge of the locally regenerated 64 Fs clock signal 3822 and relative to the positive edge 3832 of the locally regenerated word clock signal 3830 by an amount $t_{offset}$. In particular, the received cable clock Fs/n indicator occurs later in time than the local Fs clock edge. Given that the local Fs clock edge is derived to be synchronous with the received cable clock Fs/n indicator on the clock master MAC-DSD link, this indicates that the cable propagation delay for the second link 3605 is longer than the cable propagation delay for the clock master link 3603. The relative difference in propagation delay between the clock master link 3603 and the other link 3605 is $t_{offset}$. The time $t_{offset}$ is defined to be negative in the case that the non-master link 3605 is delayed relative to the clock master link 3603 as shown above, and positive in the case that the non-master link 3605 is advanced relative to the clock master link.

Once $t_{offset}$ is determined at the receiver, the following algorithm must be followed to adapt the latency monostable counter 3530 of the receiver to ensure synchronous operation with the clock master link. If $t_{offset}$ is positive (i.e. non-master link 3605 is advanced in time relative to clock master 3603 link) then when the Fs/n indicator is detected via link 3605 the latency monostable counter in MAC_DSD receiver 3720 is not started until the next word clock edge. However, if $t_{offset}$ is negative (i.e. non-master link 3605 is delayed relative to master link 3603 as in FIG. 37) $t_{offset}$ is rounded down to an integer number of 64 fs periods and one is subtracted from this value to derive a value for the timeout for the non-master latency monostable counter. The latency monostable counter in MAC-DSD 3720 (non-master) is started at the first 64 Fs clock edge following the timeout. This will result in the non-master latency monostable counter timing out synchronously with the monostable counter in the clock master receiver.

If the predetermined link latency period expires before a marked sample is detected in the FIFO 3550 this is an indication that either there is a fault in the system or that the predetermined link latency has been set at too small a value for the link conditions. Accordingly, if the latency period expires before the marked sample is detected an interrupt signal is raised and error indicator bits are set. Table 10 below specifies for each of seven audio data formats an example link latency in 64 Fs periods and in microseconds.

TABLE 10

| Audio format | Latency (64fs periods) | Latency (μs) |
|---|---|---|
| DSD | 127 | 44.9 |
| 44.1 kHz PCM | 192 (3 samples) | 68 |

TABLE 10-continued

| Audio format | Latency (64fs periods) | Latency (μs) |
|---|---|---|
| 48 kHz PCM | 192 (3 samples) | 62.5 |
| 88.2 kHz PCM | 160 (5 samples) | 56.6 |
| 96 kHz PCM | 160 (5 samples) | 52.1 |
| 176.4 kHz PCM | 144 (9 samples) | 51.0 |
| 192 kHz PCM | 144 (9 samples) | 46.9 |

A further development of the arrangements of FIGS. 2 to 37 will now be described. The substantive changes incorporated in this further development are as follows:

i. Auto-crossover support is implemented to enable automatic configuration of the devices having Media Dependent Interfaces when they are connected to the LAN.

ii. Synchronisation mechanisms have been unified so that the S-bit is not required for PCM mode—both DSD mode and PCM mode use the synchronisation mechanism according to which the first sample of the first frame is aligned with the fs/2048 synchronisation indicator.

iii. Frame format ID structure is modified from that described in relation to FIGS. 43 and 44A to F.

Table 1 above specifies the settings of socket terminal connections of the RJ45 connector plug. In the single cable arrangement of FIG. 3 a special "crossover" category 5 cable was required to reverse the input/output connections to facilitate an effective point to point link between the two audio devices. The crossover cable is required because of the fact that the assignment of different connector pins to the wires in the category 5 twisted pair cable at the RJ-45 is predetermined. Clearly, if the transmit pair of wires of one device is connected to the transmit connectors of the other audio device then the communication link will fail. As a result of the predetermined RJ-45 connector pin assignments, it may well be that the two audio devices use the same pin designations on their interfaces, in which case, a crossover cable is required. By way of contrast, standard category 5 cables could be used for the star configuration arrangement of FIG. 4. The arrangement according to the further development of the present technique makes use of auto-crossover technology for automatically ensuring viable connections between networked devices without the need for crossover cables.

The RJ45 connectors and category 5 cables are associated with the MDI 211 of FIG. 1. Table 11 below specifies the settings of the RJ45 socket connections for the arrangement that implements auto-crossover (compare with Table 1). There are two different pin allocation settings corresponding to two distinct modes: MDI signal allocation mode and MDI-X crossover signal allocation mode. According to this arrangement all RJ45 connectors feature the same contact assignments and switching between MDI and MDI-X modes is automatically negotiated so that crossover cables are not required. The crossover negotiation between MDI and MDI-X modes is independently performed for the data and for the synchronisation signal. The synchronisation signal electrical interface comprises two independent half-duplex (i.e. two-way alternate) signal paths, the two paths transmitting data in opposite directions (i.e. one output and one input). Automatic negotiation is used to control which of the signal paths is the transmitting path. Each signal path is a differential pair and differential signaling is used. Each physical layer transceiver device is capable of automatically switching between MDI and MDI-X modes.

TABLE 11

| Contact | MDI signal allocation | MDI-X (crossover) signal allocation |
|---|---|---|
| 1 | Audio data transmit + | Audio data receive + |
| 2 | Audio data transmit − | Audio data receive − |
| 3 | Audio data receive + | Audio data transmit + |
| 4 | Sync signal transmit + | Sync signal receive + |
| 5 | Sync signal transmit − | Sync signal receive − |
| 6 | Audio data receive − | Audio data receive − |
| 7 | Sync signal receive + | Sync signal transmit + |
| 8 | Sync signal receive − | Sync signal transmit − |

The transceiver device controls the input/output direction of the two independent half-duplex synchronisation signal paths. Accordingly two different networked nodes (audio devices) on a link can automatically negotiate which synchronisation signal transceivers switch to the crossover contact allocations of Table 11 above.

Figure 38:
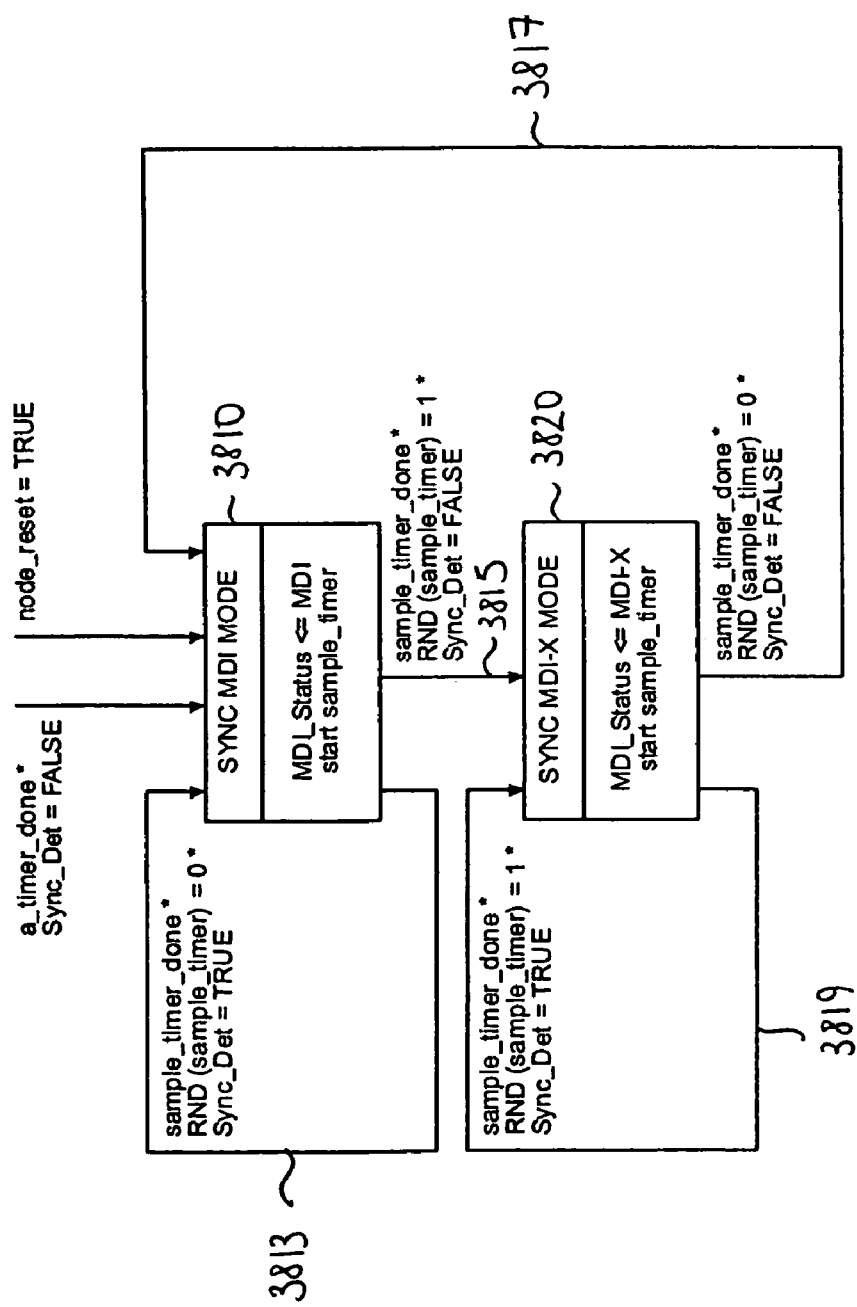
FIG. 38 schematically illustrates a state diagram representing how switching is controlled to achieve a correct polarisation for the crossover circuit.

FIG. 38 schematically illustrates a state diagram representing how switching is controlled to achieve a correct polarisation for the crossover circuit. In the state diagram state 3810 is MDI mode, in which the synchronisation signal connector contact allocations are as indicated in the left-hand column of Table 11. State 3820 is the crossover MDI-X mode, in which the synchronisation signal connector contact allocations are as indicated in the right-hand column of Table 11. When a reset is performed the audio device the state variable sync_det is FALSE, indicating that no valid synchronisation signal is currently being detected on the synchronisation signal paths. An asynchronous timer associated with the state variable a_timer in FIG. 38 ensures an arbitrary initialisation of the state machine to one of the two possible initial states: MDI mode or MDI-X mode. The period of this asynchronous timer in the present arrangement is 100 milliseconds +/−25%. The initialisation is implemented such that the probability of two different nodes taking pseudo-random bit sequence (PRBS) seed values at state machine initialisation is very low.

Consider, for example the case where the node device is initialised to the MDI state. The node waits in MDI mode 3810 for a predetermined time interval represented by the sample_timer state variable. In the present arrangement the sample timer has a period of 1 millisecond +/−25%. During this sample time interval the node evaluates its receive channel to determine whether or not it is in receipt of a valid synchronisation signal from the other end of the link. If a valid synchronisation signal is in fact detected then the state variable sync_det will have the value TRUE and the node will remain in the current configuration (MDI mode in this case) as indicated by path 3813 in FIG. 38. However, if sync_det is FALSE, indicating that no valid synchronisation signal has been detected on the receive channel, the next state is determined by the value of a pseudo-random number.

Figure 39:
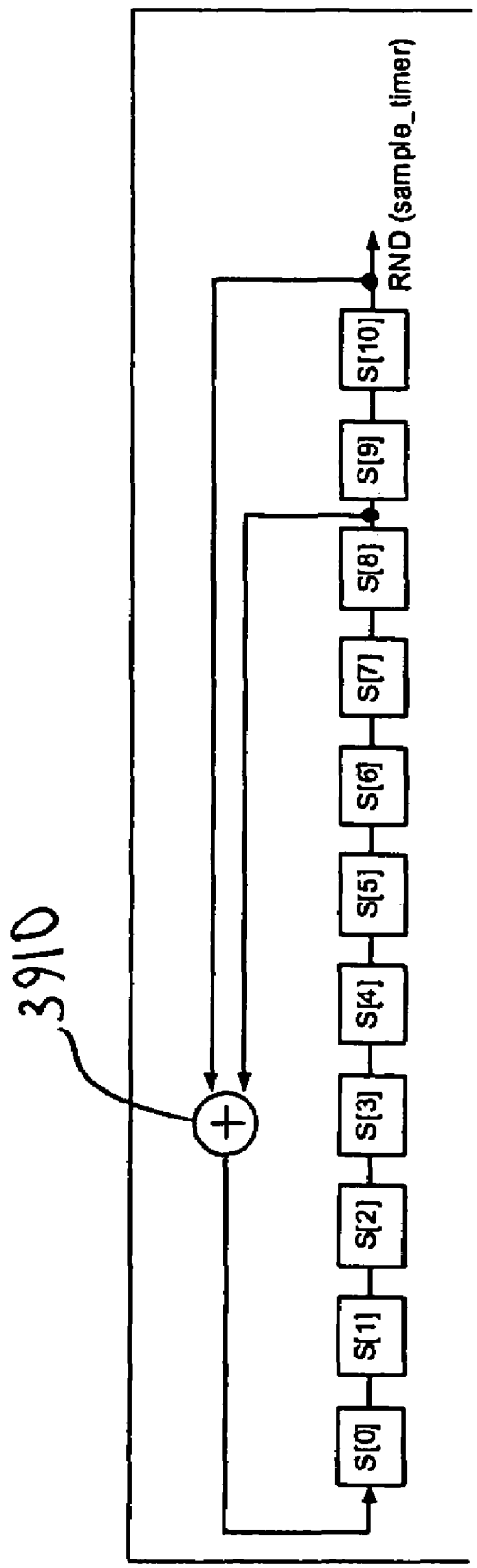
FIG. 39 schematically illustrates a Linear Feedback Shift Register (LFSR) used to create a pseudo-random sequence.

FIG. 39 schematically illustrates a Linear Feedback Shift Register (LFSR) used to create a pseudo-random sequence. The LFSR comprises 11 stages S[0] to S[11], the output from stages S[8] and S[10] being supplied to an adder 3910 whose output is fed back as an input to the first stage S[0]. The output of S[10] provides a single-bit pseudo-random sequence for use in the state machine algorithm of FIG. 38. The LFSR is controlled by the sample timer so that a value RND(sample_timer) is generated periodically.

Referring back to FIG. 38, if sync_det is FALSE and RND (sample_timer)=1 then a state transition is made from MDI mode to MDI-X mode (as indicated by path 3815) whereupon the signal allocations of each of the eight contact pins are assigned according to the right-hand column of Table 11.

However if RND(sample_timer)=0 the node will remain in the present state as indicated by path 3813. Considering the case where a transition has been made from the MDI mode 3810 to the MDI-X mode 3820 following a failure to detect a valid synchronisation signal in MDI mode and a pseudo-random number generation event of RND(sample_timer)=0. In this case the node device again waits for a time corresponding to the sample timer period and evaluates its receive channel to determine whether a valid synchronisation signal is being received from the other end of the link. If sync_det=TRUE indicating that a valid synchronisation signal has in fact been received then the node device remains in the MDI-X mode, as indicated by path 3819. However, if sync_det=FALSE then the LFSR is incremented and a decision on whether to switch states is dependent upon the pseudo-random output of the LFSR. In particular, if RND (sample_timer)=0 a transition is made from MDI-X mode to MDI mode as indicated by path 3817, whereas if RND (sample_timer)=1 the node device remains in MDI-X mode despite no valid synchronisation signal having been detected in the previous sample timer period.

FIG. 40 schematically illustrates an arrangement for audio clock transmission according to a development of the present technique. The transmission arrangement comprises a clock signal path having clock multiplexer 4010, a Low Voltage Differential Signaling (LVDS) transmitter 4020 and a clock transformer 4030 connected in series to an RJ45 connector 4040. Thus the clock signal of this arrangement is a transformer coupled M-LVDS (Multipoint Low Voltage Differential Signaling) signal. The data signal path comprises a High Resolution Multi-channel Audio Interconnection (HRMAI) logic 4050 operable to input/output audio data, connected in series to a physical layer device (PHY) 4060 which is in turn connected to a data transformer 4070 and finally to the RJ45 connector 4040. The arrangement of FIG. 40 differs from that of FIG. 6 in that the differential line driver 554 has been replaced by the LVDS transmitter 4020 and the clock multiplexer 4010 is shown. However the clock multiplexer 4010 has the same function as clock mux 3430 as shown in FIG. 34. In particular, the clock multiplexer 4010 is operable to multiplex the 64 fs clock and the fs word clock so that the clock signal contains an indication of the fs word clock phase via periodic modulation of one edge of the clock signal as described above with reference to FIG. 32. Note that the 8-bit generation described in relation to FIG. 34 is not required for the arrangement of FIG. 40. The LVDS transmitter 4020 is required in this arrangement to support auto-crossover functionality. The PHY 4060 in this arrangement is also configured such that it is capable of auto-crossover support. The PHY 4060 is synchronised form a local 25 MHz crystal oscillator (as specified in ISO/IEC 8802.3:2000(E)).

FIG. 41 schematically illustrates an arrangement for audio clock reception according to a development of the present technique. The reception arrangement comprises an RJ45 connector 4110 that provides paths to both a clock line processing sequence and a data processing sequence. The clock line processing sequence comprises a clock transformer 4120, an LVDS receiver 4130 and a word clock extraction unit 4140. The data line processing sequence comprises a data transformer 4150, a physical layer device (PHY) 4160 and a logic unit 4170 for processing both input and output audio data. The transformer—coupled clock signal is supplied to the LVDS receiver 4130 where it is converted to a logic signal. The output of the LVDS receiver 4130 is used to drive a local high-quality phase-locked loop circuit to generate a local audio reference clock. The output of the LVDS receiver 4130 is also supplied as input to the word clock extraction unit 4140 which derives a word clock signal from the received multiplexed clock signal and outputs a word clock signal to the local system.

In the arrangement of FIGS. 40 and 41 the Medium Dependent Interface (MDI) pin allocation is such that the audio data is conveyed on the same pins as conventionally used for 100Base-TX Ethernet (i.e. fast Ethernet). This audio data transmission/reception is implemented using PHY devices 4140, 4260 that support auto-crossover. Support for auto-crossover is often denoted by "auto-MDIX" in PHY datasheets.

The LVDS transmitter 4020 and LVDS receiver 4130 operate in half-duplex mode. The LVDS transmitter/receiver is connected to MDI pins via the corresponding clock line transformers 4020 or 4130, each of which has a 1:1 turns ratio. All four transformers i.e. clock line transformers 4020, 4130 and data line transformers 4020, 4130 in this arrangement are of the same 10/100Base-T transformer type. The use of half-duplex LVDS transceivers 4020, 4130 allows auto-crossover since the effective pin allocation of the transmit/receive pairs can be reversed id required.

Figure 42:
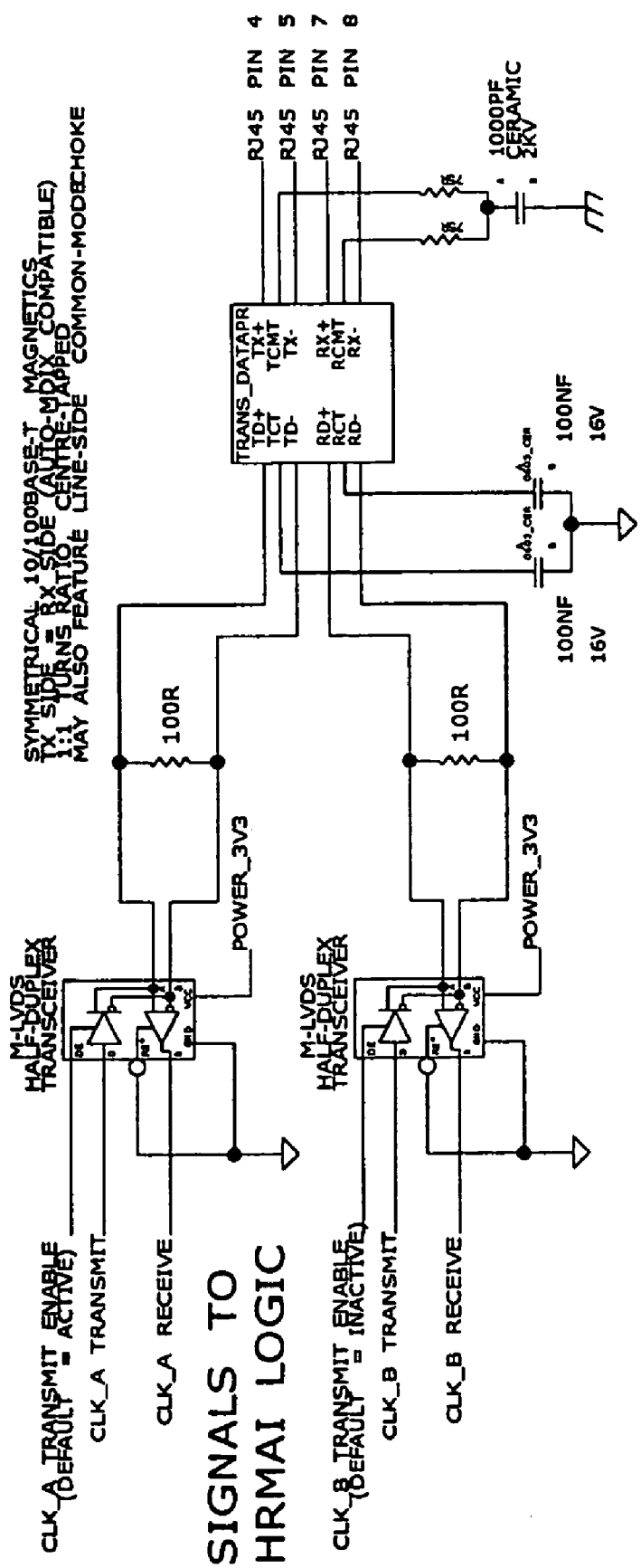
FIG. 42 schematically illustrates a synchronisation signal physical arrangement according to the development of the present technique.

FIG. 42 schematically illustrates a synchronisation signal physical arrangement according to the development of the present technique. This figure shows the connections between the LVDS transceivers 4020, 4130 (half-duplex) and the RJ45 connector 4040, 4110 pins. One arrangement according to the development of the technique incorporates all of the physical layer auto-crossover circuitry (for both audio data and sync signal) integrated into a single package. This particular arrangement uses of a 1000Base-TX (Gigabit) physical layer circuitry package featuring four symmetrical centre-tapped transformers with line-side common-mode chokes. Since such 1000Base-TX PHY devices are generally also 10/100Base-T compliant, the device also works well with the sync signal. In a modification of the arrangement having integrated physical layer auto-crossover circuitry, the circuitry can be integrated within the RJ45 socket thereby providing a significantly reduced printed circuit board (PCB) layout area. However, this precludes use of an XL-shell ruggedised RJ45 connector (which is recommended), if the RJ45 on the PCB is an external connector.

FIG. 18A shows an audio data format for the 32 DSD channel embodiment which comprises 384 four-byte data words (1536 byte frame) and FIG. 18B shows an alternative frame format for the 24 DSD channel embodiment comprising 368 four-byte data words (1472 byte frame) with a 1408-byte frame payload having 352 DSD audio data samples for 24 channels plus 88 bytes of auxiliary data.

FIG. 43 shows an audio data frame format according to the further development of the present technique. Each frame consists of 1448 bytes (or "octets"). The frame payload comprises a total of 26 logical channels, 24 of which are allocated for audio data transfer (as for the frame format of FIG. 18B) of either PCM or DSD audio data and the remaining 2 logical channels are allocated to auxiliary data transfer. bytes (or "octets").

The structure of the audio frame of FIG. 43 generally conforms to the standard ISO/IEC 8802.3-2000(E) section 3.1.1 "MAC frame format". However, in the present arrangement the frame length is 1448 octets and the LENGTH/TYPE field (octets 20-21 in FIG. 43) indicate the appropriate length value of 1422 octets. In the audio frame format of FIG. 43 octets 0-7 contain a preamble and start frame delimiter; octets 8-13 contain a MAC destination address; octets 14-19 contain a MAC source address; octets 20-21 contain a length/type field; octets 22-24 contain a Logical Link Control (LLC) header; octets 25-29 contain a SubNetwork Access Protocol (SNAP) header; octets 30-35 contain a frame format identification header; octets 36-1443 contain the data payload; and octets 1444-1447 contain a 32-bit cyclic redundancy check.

The SNAP header in octets 25-29 is an extension of the LLC header of octets 22-24. The SNAP header is a universal protocol identification system that is used in all IEEE802 networks, including Internet Protocol carried over Ethernet. The 5-octet identifier comprises the 3-octet Organisationally Unique Identifier (OUI) of the organisation defining the protocol (the AES, in this case), plus a 2-octet protocol identifier defined by that organisation. The SNAP is preceded by the 3-octet Logical Link Control header, taking the value $AA_{16}$-$AA_{16}$-$03_{16}$. The value of the LLC/SNAP header uniquely identifies the protocol according to the present technique.

FIG. 44A schematically illustrates the structure of the frame format identification header corresponding to octets 30-39 of the audio frame format of FIG. 43. Bits 0:3 of octet 30 specify the protocol minor version of the protocol according to the present technique whereas bits 4:7 specify the protocol major version. Bits 0:3 of octet 31 specify the frame type (bitstream mode audio (e.g. DSD) or AES3-compatible mode audio (PCM)). The frame type definitions are specified in FIG. 44B. Bits 4:7 of octet 31 contain flag bits used for synchronisation or other purposes. Value definitions for the frame type field are listed in FIG. 44C for bitstream mode audio (DSD) and in FIG. 44D for AES3 compatible (PCM) audio mode. Octet 32 specifies the audio format i.e. such details as the sample rate. Octets 33-34 are reserved for future use. Value definitions for the audio format field are specified in FIGS. 44E and F. Octet 35 contains an 8-bit cyclic redundancy check that is computed bit-wise (bit 0 first) over octets 30 to 34 inclusive of the frame format identifier. The CRC encoding is defined by the following generator polynomial: $G(x)=x^8+x^2+x+1$. In the event that the frame format CRC indicates that an error has occurred between transmission and reception of the data then the receiver will process that frame according to the frame format identifier of the previous frame.

The data payload contained in octets 36-1443 of FIG. 43 comprise digital audio data (either PCM or DSD), auxiliary data and error correction coding data. The data is effectively transported via 26 logical channels, 24 of which are allocated to audio data transport and 2 of which are allocated to transport of auxiliary data.

Figure 45:
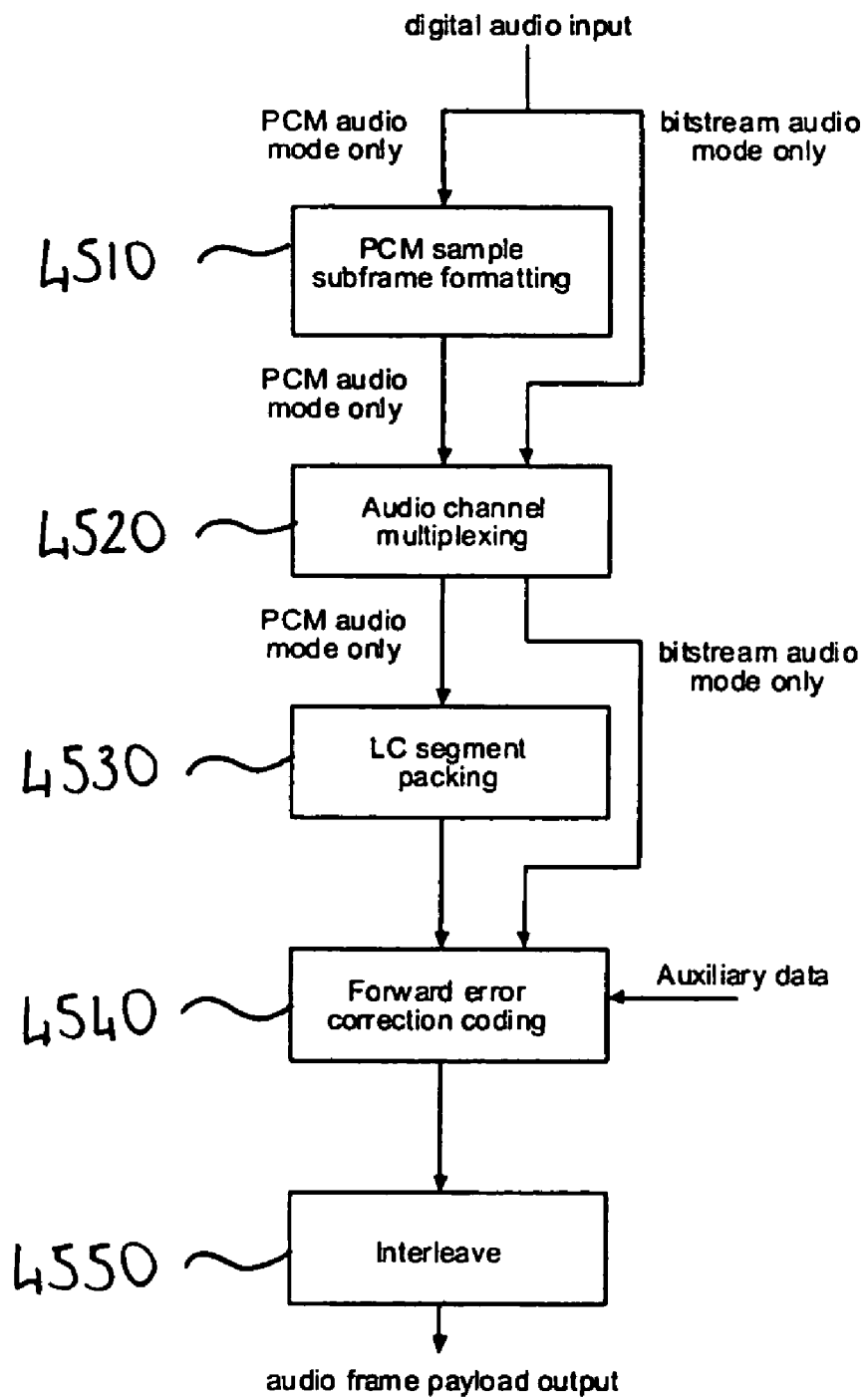
FIG. 45 schematically illustrates the frame payload formatting process according to the present technique.

FIG. 45 schematically illustrates the frame payload formatting process according to the present technique. The process comprises five distinct stages: a PCM sample subframe formatting stage 4510; an audio channel multiplexing stage 4520; an LC segment packing stage 4530; a forward error correction coding stage 4540; and an interleaving stage 4550. If the digital audio input is PCM data then all five stages of processing are performed in order to produce the frame payload. However, if the digital audio input is DSD data the PCM sample subframe formatting stage 4510 and the LC segment packing stage 4530 will be bypassed.

The PCM sample sub-frame formatting stage 4510 adapt the format of each input PCM audio sample for transmission into the 27-bit sample sub-frame structure illustrated in FIG. 26B. Bit 0 of the sample sub-frame is transmitted first and bits 0 through 23 comprise the audio sample data of a specific PCM audio sample. If the digital audio stream for transmission is compliant to AES3, then bit 24 shall comprise the User (U) bit, and bit 25 shall comprise the Channel Status (C) bit. However, if the digital audio stream for transmission is not compliant to AES3, then the U and C bits of FIG. 26B will contain logic zero. In the event that the original audio sample is less than 24 bits in length, the audio sample is right-aligned with respect such that the most significant bit (MSB) is always carried in bit 23, and any bits 0-8 not carrying audio data shall indicate logic zero. In this case, the actual audio sample length will be determined from the frame format identification header (octets 30-35 of FIG. 43).

According to this particular arrangement the M-bit (bit 26) of the AES3-mode sample sub-frame of FIG. 26B is encoded to represent the following logic indicators:

B indicator:—the AES3 'start of block' indicator (equivalent to AES3 Z-preamble of the previous embodiments). The B indicator identifies a particular sample within the audio stream.

V indicator:—indicating that the audio data has valid status. The V bit is sub-sampled every 192 PCM samples and indicated alongside the B bit.

Note that this arrangement differs from the arrangement according to FIGS. 27A to D and FIGS. 28A to E since the S indication is not required in this case. This is because the DSD synchronisation method whereby a frame flag bit is used to mark the first sample of every frame is also applied to the PCM mode in this arrangement thereby obviating the need for the S indicator.

If neither the B indicator nor the V indicator is currently being asserted then the M-bit (of FIG. 26B) indicates logic zero. In this embodiment the B and V indicators are asserted by sequences of four consecutive bits known as sync codes. The first bit of a sync code is always logic '1', and the encoding of the remaining bits is as indicated in Table 12 below.

TABLE 12

| Sync code | Indicators asserted |
|---|---|
| 1000 | B and V (AES3 validity bit = 0) |
| 1100 | B and not V (AES3 validity bit = 1) |
| other | (reserved-disregarded at receiver) |

The sync code timing is specified such that the bit immediately following the final (fourth) bit of the sync code marks the indicated sample. FIGS. 46A and B give examples of M-bit encoding according to this arrangement. In these two figures, M-bit values of a series of consecutive samples are shown (temporally earliest sample is the left-most sample). The four-bit sync code according to Table 12 is indicated in bold and the letter 'B' above the string of M-bit values indicates the sample marked as being the AES3 block start. FIG. 46A shows the sync sequence for B and not V (AES3 validity bit=1) whereas FIG. 46B shows the sync sequence for B and V (AES3 validity bit=0). On reception of an "audio invalid" flag (validity=0) in an incoming AES 3 stream, the transmitter will replace all following sample data bits with zero, until the next B-bit indicator (which will carry the "audio invalid" V bit indication to the link receiver).

Returning now to FIG. 45, the audio channel multiplexing stage 4520 maps the multi-channel digital audio streams into 24 of the 26 logical channels. This process shall determines both the assignment of audio channels to logical channels and the order of transmission of audio samples on logical channels. In this arrangement there are six different mappings corresponding to six different audio mode/sample rate combinations:

(i) Bit-stream audio (DSD) mode, bit-rate=64 fs:—the link will carry 24 audio channels. Each logical channel will carry one bit-stream audio channel. The bit-rate of the logical channel be 64 fs.

(ii) Bit-stream audio (DSD) mode, bit-rate=128 fs:—the link will carry 12 audio channels, if the audio mode is 128 fs bit-stream. Each bit-stream audio channel will be multiplexed over two of the logical channels.

(iii) PCM audio mode, sample-rate=1 fs:—the link will carry 48 audio channels, if the audio mode is 1 fs PCM. Each LC will contain two multiplexed audio channels.

(iv) PCM audio mode, sample-rate=2 fs:—the link will carry 24 audio channels, if the audio mode is 2 fs PCM. Each LC will contain one multiplexed audio channel.

(v) PCM audio mode, sample-rate=4 fs:—the link will carry 12 audio channels, if the audio mode is 4 fs PCM. Each audio channel will be multiplexed over two logical channels.

(vi) PCM audio mode, sample-rate=8 fs:—the link will carry 6 audio channels, if the audio mode is 8 fs PCM. Each audio channel will be multiplexed over four logical channels.

The LC segment packing stage 4530 of FIG. 45 is performed for PCM mode but not for DSD mode. This stage involves segmentation of the PCM data assigned to each logical channel by the insertion of null bits. Each segment (known as an LC sub-segment) is 27 bits in length, and LC sub-segment boundaries are arranged to coincide with PCM sample sub-frame boundaries wherever possible. The insertion of null bits is arranged with respect to the LC frame segmentation (6.2 and FIG. 4), in order to control the total number of PCM sample sub-frames conveyed in the LC frame segment. The number of LC sub-segments conveyed in the LC frame segment is an integer between 9 and 13 inclusive, and is dependent on the total audio data rate (i.e. audio base sample frequency), in order to reduce the number of audio samples in the transmit/receive data buffers. One suggested relationship between audio base sample frequency and the number of LC sub-segments per frame is illustrated in Table 13 below.

TABLE 13

| Audio base sample frequency range (Hz) | Number of LC sub-segments per frame |
|---|---|
| 38580-37900 | 9 |
| 37900-42110 | 10 |
| 42110-46320 | 11 |
| 46320-50530 | 12 |
| 50530-54000 | 13 |

For each possible number of LC sub-segments (or sample subframes) conveyed per frame the arrangement of LC sub-segments and padding bits is as specified in Table 9A for the previous PCM arrangement.

A number of examples of logical channel sub-segment formation and logical channel segment packing corresponding respectively to stages 4510 and 4530 of FIG. 45 will now be considered for four different audio data formats.

(i) 2 fs PCM mode with 88.2 kHz sample rate

In this case there are 24 logical channels available, so there is a simple one-to-one mapping between logical channels and audio channels. Each 1448-byte physical layer data frame takes 115,84 µs to transmit (at 100 Mbit/s PHY bit-rate), and each frame conveys one logical channel sub-segment (352 consecutive bits) of each logical channel. The frame transmission time of 115.84 µs is equal to about 10.2 samples, assuming a sample rate of 88.2 kHz. So each logical channel frame segment will convey eleven consecutive sample sub-frames from each channel. (a sample sub-frame is a 27-bit unit, comprising one 24-bit audio sample, plus three bits of associated metadata). These eleven sample sub-frames need to be distributed evenly throughout the 352-bit logical channel frame segment. Since each sample sub-frame is 27 bits, this may be achieved by following each sample sub-frame with 5 padding bits. This is 11×(27+5)=352 bits, so no extra padding bits are required at the end of the frame (corresponding to row 3 of Table 9A).

(ii) 2 fs PCM mode with 96 kHz sample rate

Next, consider 24-channel (2 fs) AES3-compatible mode, where the sample rate is 96 kHz. In this case, due to the higher sampling frequency the 115.84 µs frame transmission duration is equal to about 11.1 samples, so each logical channel frame segment will convey 12 consecutive sample sub-frames from each channel. Again, these 12 sample sub-frames should be distributed evenly throughout the 352-bit LC frame segment. Since each sample sub-frame is 27 bits, this may be achieved by following each sample sub-frame with two padding bits. This is 12×(27+2)=348 bits, so four extra padding bits are required at the end of the frame to make up the 352-bit LC frame segment length (corresponding to row 4 of Table 9A).

(iii) 4 fs, 12 channel PCM mode with sample rate of 192 kHz

This is similar to case (ii) above but in 12-channel (4 fs) mode, where the sample rate is 192 kHz. Each audio channel is multiplexed over two logical channels. But the net data rate per logical channel is identical to the previous (96 kHz) case (ii). The same structure of packing eleven 27-bit units into each LC frame segment is retained, although these units are now referred to as "LC sub-segments". Each audio sample (i.e. sample sub-frame) is multiplexed, bit-by-bit, across two logical channels, into the LC sub-segments. Each LC sub-segment therefore contains half the bits from one audio sample sub-frame, and half the bits from the following audio sample sub-frame.

The data is multiplexed bit-by-bit across the LC sub-segments to avoid the need to buffer one entire audio sample sub-frame, since this would be contrary to the objective of reducing the latency. The logical channel packing structure is retained from the simpler 2 fs case, in order to maintain consistency at the logical channel level to simplify implementation.

The 8 fs case, where each audio channel is multiplexed across four logical channels, is a simple extrapolation of the 4 fs case just described.

(iv) 1 fs PCM mode with 48 channels

In this mode two audio channels are multiplexed into each logical channel. Again, the same logical channel packing structure is retained, but two concurrent audio sample sub-frames (from different audio channels) are multiplexed, bit-by-bit, into two consecutive LC sub-segments.

Figure 47:
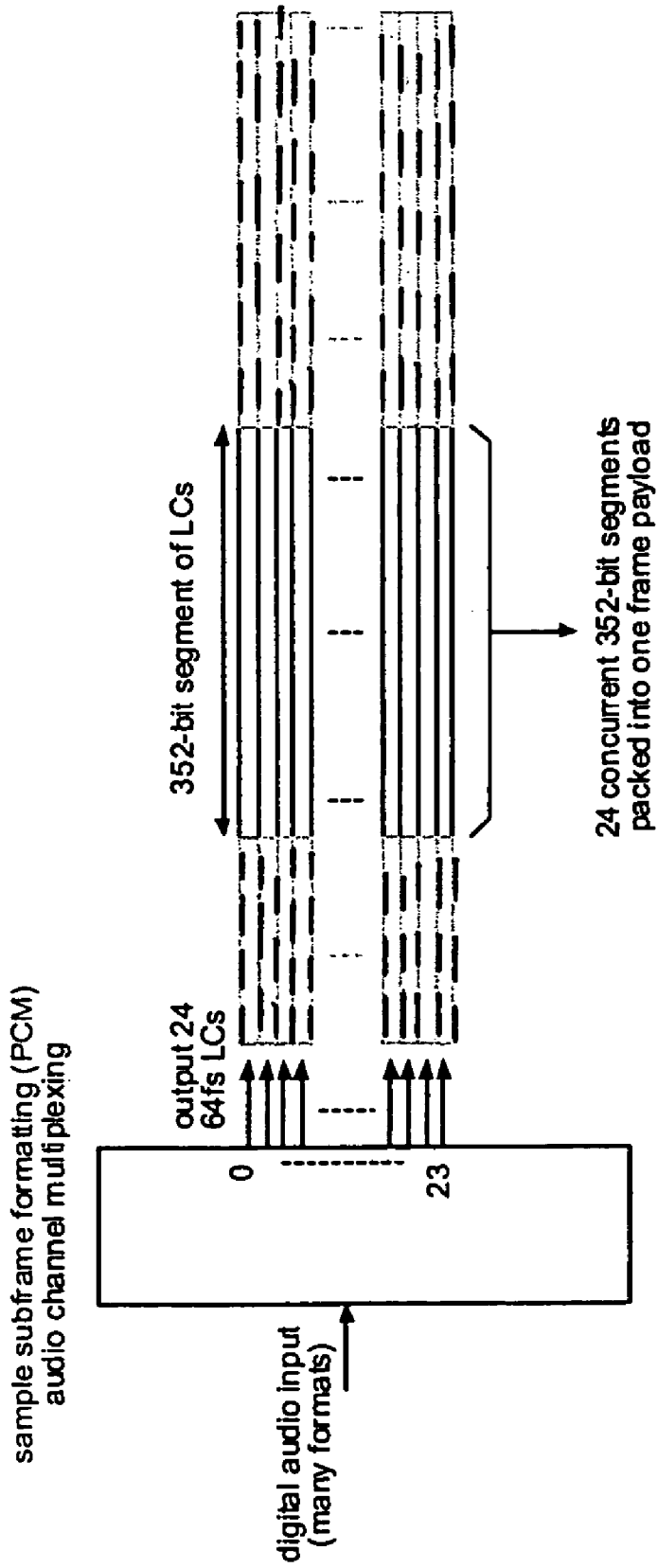
FIG. 47 schematically illustrates a logical channel frame segmentation process.

FIG. 47. schematically illustrates the logical channel frame segmentation process. Digital audio input data for transmission undergoes the stages of processing illustrated in FIG. 45 (PCM data undergoes five processing stages whereas DSD data undergoes three processing stages) and an audio frame payload output of 24 logical channels at a frequency of 64 fs is produced. Each frame payload is formed from 24 concurrent 352-bit segments of logical channel data.

Figure 48:
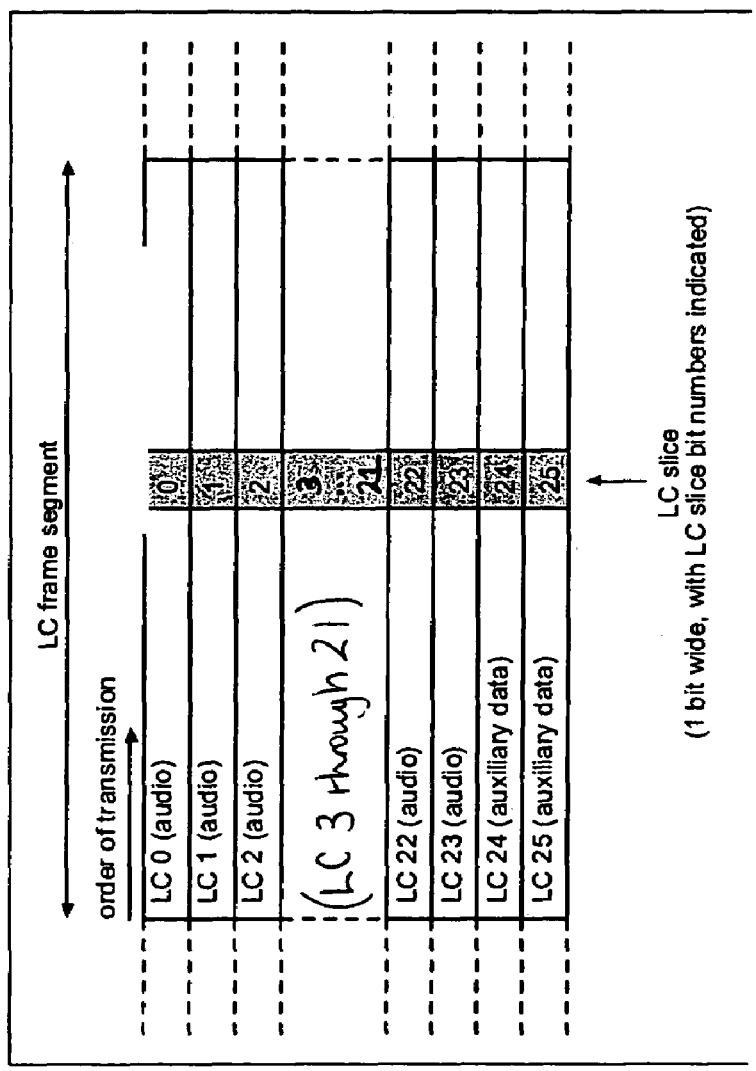
FIG. 48 schematically illustrates a 26-bit logical channel slice comprising 24 bits of audio data and 2 bits of auxiliary data.

FIG. 48 schematically illustrates a 26-bit logical channel slice comprising 24 bits of audio data and 2 bits of auxiliary data. Six parity bits are added to this LC slice to create a 32-bit encoded block as for the previous embodiments and as shown in FIG. 22 where logical channel bits 24 and 25, corresponding to the auxiliary data bits are labelled as A0 and A1 and the six parity bits are labelled P0 to P5. The parity bits are generated by performing exclusive-NOR logic operations on sub-sets of the logical channel slice of FIG. 43 as specified by the table of FIG. 23A.

As indicated at stage 4550 of FIG. 45, the 32 bit encoded blocks are interleaved before transmission on the physical layer. The interleaving process defines the order in which elements of the encoded blocks shall be transmitted on the 4-bit MII interface. In this particular arrangement the order is specified according to the relationship:

$$I(i, k) = B((32 \text{ int}(i/256) + 4(i \bmod(8)) + k), \text{int}((i/8) \bmod (32)))$$

where:

0≦i≦2815;

0≦k≦3;

I(i, k) is an array of 2816 units transmitted on the MII interface, each 4 bits wide. I(0, k) is the first to be transmitted in the frame, whereas I(2815, k) is the last; and B(m, n) is an array of 352 encoded blocks generated in the transmitter, each 32 bits wide. Encoded block B(0, n) contains the first bit of the LC segments in the frame, and encoded block B(351, n) contains the last. (0≦m≦351, 0≦n≦31).

The above definition of the interleaving relationship assumes that the interface to the physical layer device is an implementation of the Media Independent Interface (MII). However, alternative interfaces may be used provided that the resulting signal transmitted is logically identical.

FIG. 45 schematically illustrates the sequence of operations performed in the transmitter to prepare the audio data for transmission. Generally, at the receiver, the steps of FIG. 45 are performed in reverse to recover the audio data and auxiliary data. However instead of the inverse of the error correction encoding process described above, a six-bit syndrome is calculated by performing exclusive-OR logic operations on sub-sets of the received encoded blocks as described in relation to the previous arrangements with reference to FIG. 23B and Table 8.

The transceiver device according to this arrangement is operable to maintain counts of the following events in order to provide an indication to the user of the link error rate.:

a) Total number of MII symbols received since the link was established (minimum 48-bit binary counter).

b) Total corrected errors since the link was established (minimum 16-bit binary counter). A corrected error condition occurs when the error correction syndrome indicates one correctable error (see Table 8).

c) Total uncorrected errors since link was established (minimum 16-bit binary counter). An uncorrected error condition occurs when error correction syndrome indicates an uncorrectable error (see Table 8).

The system provides a indication to the user (for example, a pulse on a visible warning indicator) when an error is corrected. On detection of an uncorrected error, the local system incorporating the transceiver will indicate this to the user via an appropriate warning device. If the audio mode is PCM, the receiving section of the transceiver may use an interpolation-based algorithm to conceal an isolated error. However, if error concealment is not used or if the audio mode is DSD rather than PCM or indeed if the portion of the received PCM digital audio stream in error is too long for effective operation of the error concealment algorithm then the portion of the received digital audio stream in error will be replaced with audio silence.

Recall that in the previously described arrangement of FIG. 18B, the 88 bytes of auxiliary data were incorporated in a 1408 byte payload and the 32 bit data block comprised 24 audio data bits, 2 auxiliary data bits and 6 parity bits.

Figure 49:
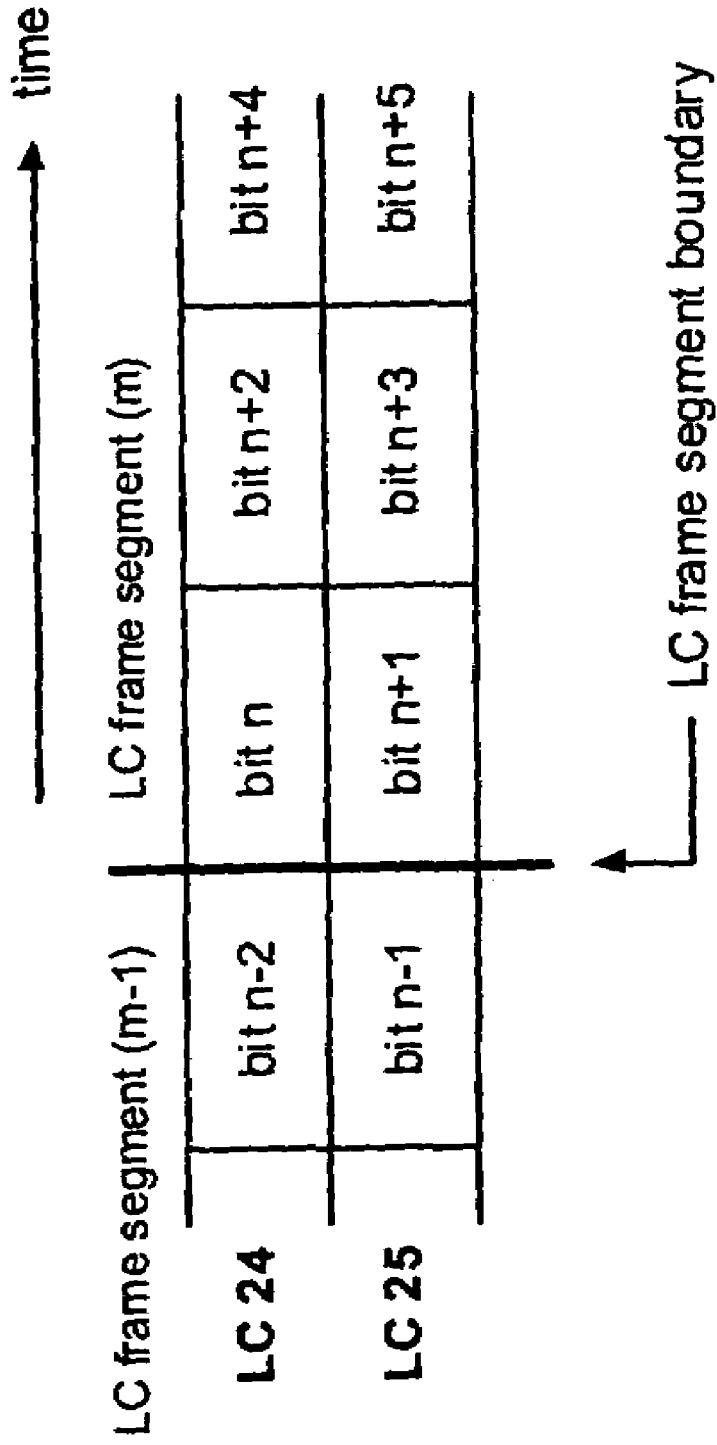
FIG. 49 schematically illustrates how the auxiliary data bits (two per LC slice) are multiplexed over two logical channels.

FIG. 49 schematically illustrates how the auxiliary data bits (two per LC slice) are multiplexed over two logical channels. The two logical channels assigned to carry auxiliary data can be considered to transport a single bit-stream, at double the bit-rate of each individual logical channel but multiplexed over the two logical channels. As shown in FIG. 49, adjacent bits of the auxiliary data stream are transported on different ones of the two assigned logical channels. Access to the auxiliary data stream is implemented within the transceiver as an Ethernet communication service. The system router contains a packet switch for auxiliary data that is independent of the audio routing. In the present arrangement the auxiliary data comprises: timecode data, transport control data, remote gain control data, router control data and metadata describing associated audio content. Table 14 below specifies a 1024-octet auxiliary data frame format according to the present arrangement.

TABLE 14

| Auxiliary data frame Octet | Content |
| --- | --- |
| 0-7 | Preamble and start frame delimiter |
| 8-13 | MAC destination address |
| 14-19 | MAC source address |
| 20-1019 | Payload |
| 1020-1023 | 32-bit frame CRC (ISO/IEC 8802.3) |

In the developed arrangement according to the present technique auxiliary data is transferred in packets (of variable size) across the link. The minimum permissible packet size is 72 octets, and the maximum permissible packet size is 512 octets. The auxiliary data packets are structured according to the IEE802.3 MAC frame format (see ISO/IEC 8802-3: 2000 (E) section 3.1.1 for further information) standard, with the exception that the maximum total frame length is 1024 bytes. The two logical channels provide a full-duplex synchronous serial interface (having a typical bit rate of 128 Fs) over which the auxiliary data packets can be carried.

The start and end of a packet is delimited by the presence in the bit-stream of the unique binary pattern: 01111111110 (0; nine 1's; 0). This binary pattern is denoted an "auxiliary data packet delimiter". In-between packets, the auxiliary data bit-stream shall comprise contiguous auxiliary data packet delimiters. The uniqueness of this pattern is assured by inserting an additional zero into the packet data after any eight consecutive 1's (a "bit-stuffing" process).

Figure 50A:
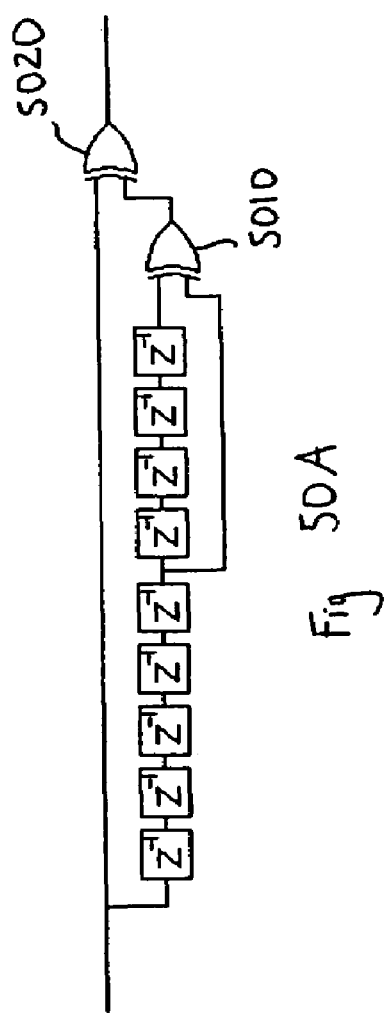
FIG. 50A schematically illustrates a convolutional scrambler and FIG. 50B schematically illustrates a corresponding convolutional descrambler.
Figure 50B:
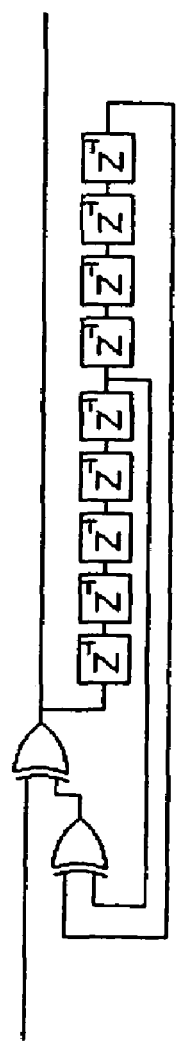

FIG. 50A schematically illustrates a convolutional encoder used to scramble the auxiliary data prior to "bit-stuffing" at the transmitter. FIG. 50B shows the corresponding descrambler that is applied to the auxiliary data at the receiver. The encoder of FIG. 50A comprises nine registers and two exclusive OR (XOR) gates 5010, 5020. A first XOR gate 5010 has one input from the last of the nine serially connected registers and a second input derived from the output of the fifth register. The second XOR gate 5020 has one input corresponding to a non-delayed signal value and a second input derived from the output of the first XOR gate 5010. The states of all nine registers in the encoder are pre-set to logic value 1 prior to transmission of each audio data frame. The convolutional decoder of FIG. 50B is appropriately arranged to reverse the convolutional encoding of the circuit of FIG. 50A. The scrambling is performed in order to randomise the data content, to avoid content-dependent changes in the overhead as a result of the "bit-stuffing" process. For example, a data stream comprising many consecutive '1' s will cause dramatically increased overhead compared to random data. Convolutional scrambling of the data prior to insertion of the sync flags and prior to bit stuffing alleviates this problem.

Figure 51:
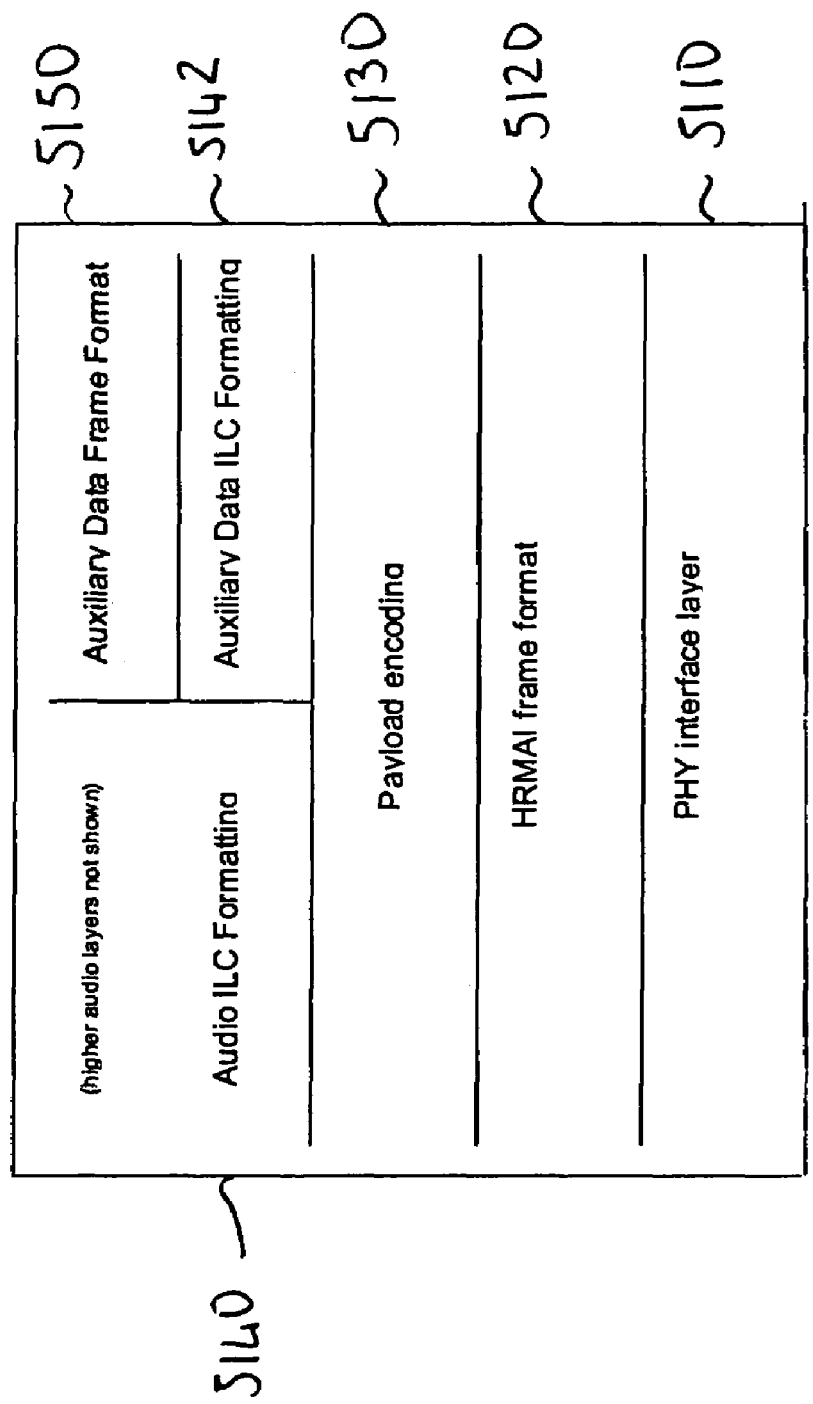
FIG. 51 schematically illustrates an auxiliary data protocol hierarchy.

FIG. 51 schematically illustrates an auxiliary data protocol hierarchy. The protocol stack comprises the following layers from lowest to highest: PHY interface layer 5110; High Resolution Multi-channel Audio Interconnect frame format layer 5120; payload encoding layer 5130; audio/auxiliary data ILC formatting layer 5140/42; and Auxiliary data frame format layer 5150. In the PHY interface layer 5110 the data comprises physical layer (Medium Independent Interface) frames prefixed only by a preamble. In the frame format layer 5120, the data comprises 1448-byte frames having Ethernet MAC headers, protocol specific identification and a 1408 byte payload. In the payload encoding layer 5140, the data is mapped into 26 logical channels and is forward error correction encoded and interleaved. In the next highest layer i.e. the audio/auxiliary data ILC formatting layer 5140/42 the data is separated into either audio data logical channel format 5140 in which the audio data is encapsulated in a format in dependence upon whether it is DSD audio data or PCM audio data and then multiplexed onto 24 of the 26 logical channels or auxiliary data logical channel format 5142 in which the auxiliary data frames are demarcated in a contiguous 128 Fs bitstream and multiplexed into the remaining two logical channels. At the highest protocol layer 5150 the auxiliary data is packaged in software-defined Ethernet frames. The higher audio layers of the protocol stack are not shown in FIG. 51. However, Internet Protocol (in conjunction with TCP, UDP or SNMP (Simple Network Management Protocol) are used in some arrangements according to the present technique to permit integration of the auxiliary data system with local IP networks that are used for system control. Such arrangements have a router device with a number of ports, the audio connections of which are interconnected by a low-latency crosspoint switch (functionally similar to a conventional audio patchbay). The auxiliary data connections are linked to a commercially-available Ethernet switch IC, which provides full Ethernet network functionality for the auxiliary data system, whilst retaining the performance benefits of the multi-channel audio connection according to the present technique and channel-switched routing for the audio. In yet further arrangements, some extra ports on the Ethernet switch IC are brought out to dedicated 100Base-TX Ethernet external connections. This allows the auxiliary data network to be fully integrated with a conventional local area network—the only restriction being the reduced bandwidth (about 5 Mbit/sec) of the above described auxiliary data links.

The synchronisation process for this developed arrangement is the same as that described above (see FIGS. 27 to 37) for the previous arrangements with one exception. Previously the PCM samples were individually labelled with sync markers via S indicator in the M-bit encoding (see FIGS. 26 to 28) whereas the DSD mode frames were synchronised by aligning the first sample in the first frame with the fs/2048 sync indicator. However in the development of these arrangements, the same synchronisation mechanism is applied to both PCM and DSD data. In particular, the DSD synchronisation mechanism whereby the first sample in the first frame is aligned with the fs/2048 sync indicator is also applied to the AES3 compatible (PCM) mode.

The synchronisation signal is transmitted by all nodes, and carried independently in both directions along the link. The synchronisation signal shall is a 64 fs clock signal, with periodic shifts in the timing of the negative edge every 2048 fs periods as described above with reference to FIG. 32. These edge timing shifts are derived from the phase of the word clock, and known as phase indicators. The synchronisation signal for transmission is derived from the local ifs word clock and 64 fs clock signals, as illustrated in FIG. 32. If a given device has multiple transceivers then all HRMAI transceivers will transmit phase indicators simultaneously.

Each transceiver incorporates means to detect whether the transmitted and received synchronisation signals have identical frequency (that is, whether both devices are synchronised to the same clock source). If the transmitted and received clock signals do not have identical frequency then a clock error condition is indicated. In particular, if the detected interval between received synchronisation signal phase indicators is found to be anything other than exactly 2048 fs periods (that is, 131072 64 fs transitions), a clock error condition shall is indicated whereupon the following actions will occur in the transceiver:

a) The audio outputs from the transceiver to the local device are muted;
b) The transmitter logic is reset following completion of the frame currently being transmitted. This reset condition persists until the next local fs/2048 synchronisation signal. The next frame transmitted shall indicate an audio stream synchronisation marker; and
c) The auxiliary data system remains fully operable, apart from a brief pause in operation while the transmitter is under reset condition.

The resulting pause in frame transmission may cause some audio samples to be lost. After the transmitted and received synchronisation signals have been measured to have identical frequency for approximately 100 ms, the audio outputs shall be unmuted. Disconnecting the link cable will cause the receiver outputs to mute without producing any audible artefacts. Connecting the link cable will cause the receiver outputs to unmute, without producing any audible artefacts.

If a device incorporating a transceiver 510, 520 is configured to synchronise its master clock from the received link synchronisation signal: it is recommended that the transceiver should inhibit transmission of a synchronisation signal, until the local device has detected clock synchronisation.

The audio stream synchronisation markers are embedded in the transmitted audio stream in dependence on the synchronisation signal phase indicators (see FIG. 32). An audio stream synchronisation marker is associated with an audio sample that is clocked into the transmitter simultaneously with transmission of a phase indicator (that is, the synchronisation markers are generated in dependence on a local 2048 fs clock). Frame transmission in both DSD mode and PCM mode is arranged such that the audio sample associated with an audio stream synchronisation marker is the first audio sample conveyed in a frame (neglecting sample reordering at the interleaving stage).

If an audio sample associated with an audio stream synchronisation marker is received, it shall be output to the local device a pre-determined and constant time after reception of the preceding synchronisation signal phase indicator. This pre-determined and constant time comprises the total latency of the link, neglecting cable propagation delay. The latency is dependent upon the audio mode and audio sampling frequency.

Figure 52:
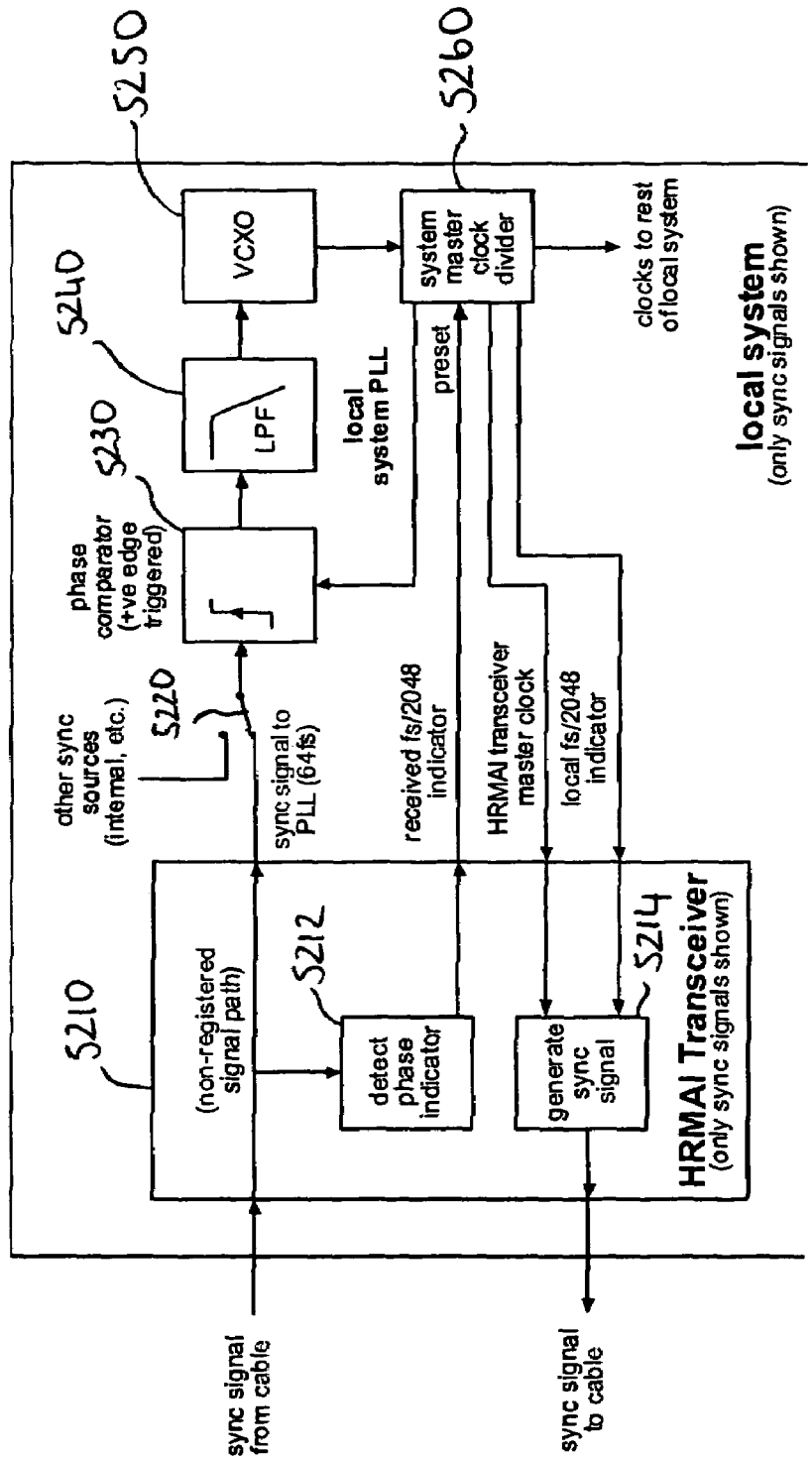
FIG. 52 schematically illustrates synchronisation connections between two transceivers.

FIG. 52 schematically illustrates synchronisation connections between the transceivers 510, 520 (see FIG. 5) according to the present technique (including transceivers of the developed arrangement that support auto-crossover) and the rest of the local system, for example an audio data recorder or A/D converter. The arrangement of FIG. 52 comprises a transceiver 5210 (counterpart of devices 510 or 520 in FIG. 5) having a phase detection module 5212 and a sync signal generation module 5214. The transceiver is connected via a switch 5220 to the phase locked loop of the local system having a positive edge-triggered phase comparator 5230 in series connection with a low-pass filter 5240 and a voltage-controlled crystal oscillator (VCXO) unit 5250. The output of the VCXO unit 5250 is supplied as input to a system master clock divider 5260 which in turn outputs clock signals to the rest of the local system. A 64 Fs sync signal derived from the cable is sent from the transceiver 5210 to the phase locked loop circuitry of the local system 5220, 5240, 5250. The phase detection indicator 5212 outputs a received fs/2048 indicator to the system master clock divider 5260. The system master clock divider 5260 outputs both a transceiver master clock signal and a local f2/2048 indicator to the sync generation module 5214 of the transceiver 5210 for output as a sync signal onto the cable.

As described above with reference to FIG. 32. The synchronisation signal is functionally a multiplex of 64 fs and fs/2048 clock signals. In practice, this is achieved by transferring a 64 fs clock in the positive edge timing of the clock signal, and modulating the pulse width of this signal to indicate the relative phase of the fs/2048 clock. Since the fs/2048 clock is phase-aligned with local word clock, the word clock is effectively conveyed across the link. The synchronisation signal may is used at the receiving device as a "clock source" (that is, an audio sample clock synchronisation source), so that a separate clock line between the devices is not required. In the arrangement of FIG. 52 the positive edges of the received sync signal from the transceiver are used to synchronise the master phase locked loop local of the local system which is VCXO based. This is the clock source for the transceiver, including the logic to detect the phase indicators in the received sync signal. The detected fs/2048 phase indicators are used to preset the local system's master clock divider, such that the signals "received fs/2048 indicator" and "local fs/2048 indicator" in FIG. 52 take identical phase. A signal labelled "local fs/2048 indicator" in FIG. 52 is derived from the most significant bit of the counter in the local system's master clock divider in the present arrangement.

In this way, the fs/2048 indicators at each end of the link take on identical frequency and phase (neglecting cable propagation delays), and hence it follows that all related audio clock signals take on identical frequency and phase. The switch 5220 in FIG. 52 allows the local system phase locked loop to synchronise from a different source, such as an internal fixed-frequency oscillator, or a "house clock" timing reference. In a link according to the present technique, only one of the devices at either end of the link may synchronise to the received clock signal (as illustrated in FIG. 52), otherwise a timing loop would occur as the phase locked loops in the two devices attempt to synchronise to each other without a stable timing reference.

Figure 53:
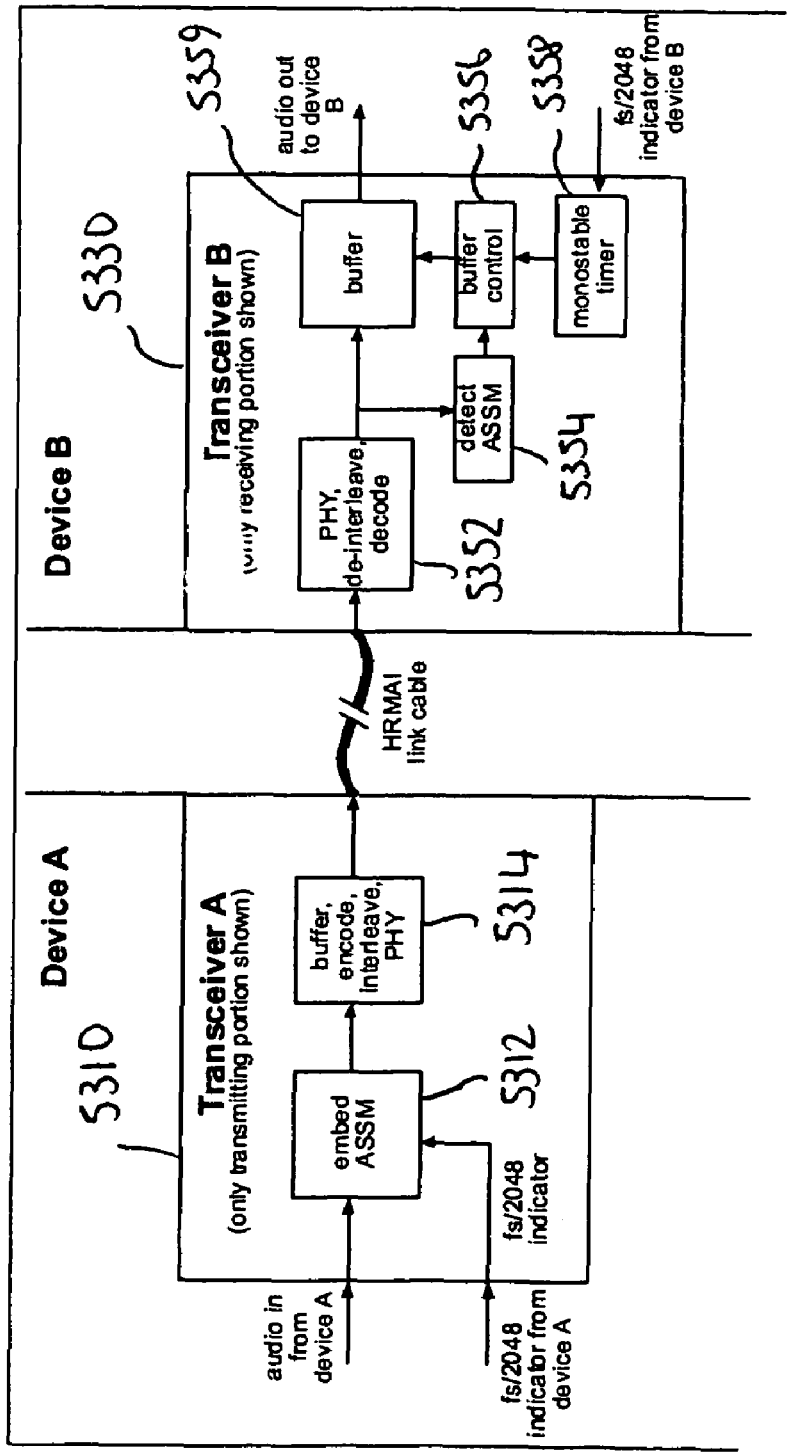
FIG. 53 schematically illustrates a hardware arrangement used to achieve audio latency control using the audio stream synchronisation markers (ASSM) according to the development of the present technique.

FIG. 53 schematically illustrates a hardware arrangement used to achieve audio latency control using the audio stream synchronisation markers (ASSMs) according to the development of the present technique (see FIGS. 46A and B). The arrangement comprises a first transceiver device 5310 having an ASSM embedding unit 5312 and a PHY processing unit 5314 that performs buffering, encoding and interleaving of the data. A second transceiver device 5330 comprises a PHY unit 5352 operable to de-interleave and decode audio data received from the first transceiver 5310 across the link and further comprises an ASSM detection module 5354, a buffer control unit 5356, a monostable timer 5358 and a buffer 5359 operable to buffer audio data prior to outputting it to the audio device associated with the second transceiver 5350. The monostable timer 5358 supplies an fs/2048 indicator from the device associated with the second transceiver 5350 to the buffer control unit 5359.

The audio stream synchronisation markers (ASSMs) effectively provide a means for the clock synchronisation system of FIG. 52 to "hook onto" the audio streams, thus controlling the audio latency. An ASSM is "embedded" in the audio stream by the ASSM embedding unit 5312, at the point where it is first clocked into the transceiver from the local system. The ASSM is generated in dependence on the local fs/2048 indicator as shown in the first transceiver device 5310. The ASSM remains attached to the specified audio sample throughout the link, until it reaches the output buffer 5359 in the receiving section of the remote link. This buffer 5359 is controlled, such that the marked audio sample is output a specified time after the fs/2048 indicator occurred. Since the ASSM was originally generated in dependence on the fs/2048 indicator, and the fs/2048 indicators at each end of the link are effectively identical, the audio sample is output a specific time after it entered the other end of the HRMAI link. This is deterministic latency control.

Once the synchronisation system of FIG. 52 is locked, the audio stream synchronisation mechanism aligns the output buffer as described above with reference to FIG. 53, to achieve the required latency. This process occurs once only at start-up, after which the latency remains constant for as long as the synchronisation system remains locked. ASSM are indicated by arranging frame transmission at start-up such that the audio sample associated with the ASSM is always located at the head of a frame payload. The frame in which this occurs has a specific Frame Format ID flag asserted (octet 31, bit 0 of the frame of FIG. 44).

Whenever an ASSM-marked audio sample is found at the receiver, it should coincide with the local fs/2048 indicator— if not, it indicates that a synchronisation error has occurred. However, such a synchronisation fault, causing misalignment of ASSM-marked samples with the fs/2048 indicator, should always result in a clock error condition due to loss of the lock condition of the phase locked loop or an incorrect phase indicator interval. Either of these conditions will cause a link reset, to correct the problem.

The invention may be embodied in software, programmable hardware (e.g. FPGA, ASIC), hardware or a combination of these. In the case of a software component, the invention also includes a providing (e.g. storage, transmission) medium by which such software is provided.

I claim:

1. A data communications system for communicating a data signal formed of successive data elements, said system comprising a transmission node, a reception node, and a link providing a data connection from said transmission node to said reception node, said transmission node comprising:
   a data clock transmitter configured to transmit a synchronization clocking signal to said reception node via said link, said synchronization clocking signal having synchronizing features occurring at a frequency lower than a data element rate; and
   an assembler configured to assemble elements of said data signal into data frames, each data frame having a plurality of successive data elements of said data signal, for transmission to said reception node via said link, said assembler being responsive to said synchronization clocking signal so as to set a synchronization flag associated with a data element having a first predetermined temporal relationship with a synchronizing feature of said synchronization clocking signal; and said reception node comprising:
- a detector configured to detect said synchronizing feature of said synchronization clocking signal received from said transmission node;
- a disassembler configured to diassemble received data frames to regenerate said data signal, said disassembler being operable to detect a data element associated with said set synchronization flag; and
- an output unit configured to output said data element associated with said set synchronization flag at a second predetermined temporal relationship with respect to said synchronizing feature of said received synchronization clocking signal, said output unit comprising a time delay arrangement, so that data elements from a data frame associated with said set synchronization flag are output a predetermined delay time after said reception node receives said synchronizing feature of said synchronization clocking signal, wherein said first and second predetermined temporal relationships are arranged so that a predetermined system latency exists between input of a data element to said transmission node and subsequent output of that data element by said reception node.

2. The system according to claim 1, wherein said first predetermined temporal relationship corresponds to a first-transmitted data element position within the data frame.

3. The system according to claim 1, wherein
said a data clock transmitter further transmits a data clock to said receiving node via said link, said data clock defining a timing of said data elements or components of said data elements, and
said reception node comprises a data clock receiver configured to receive said data clock from said transmitting node and output said data elements in accordance with said received data clock.

4. The system according to claim 3, wherein said data clock transmitter is configured to transmit a Multipoint Low-Voltage Differential Signaling signal to said receiving node.

5. The system according to claim 3, wherein:
said transmission node comprises a combiner configured to combine said synchronization clocking signal and said data clock to form a multiplexed clock signal for transmission to said reception node via said link; and
said data clock receiver comprises a demultiplexer configured to demultiplex said synchronization clocking signal and said data clock from said multiplexed clock signal.

6. The system according to claim 5, wherein said combiner comprises a timing adjuster configured to adjust the timing of a subset of clock pulses of said data clock signal in dependence on said synchronizing feature of said synchronization clocking signal.

7. The system according to claim 6, wherein:
said data clock is defined with respect to periodic reference clock edges;
said transmission node is configured to adjust the timing of one or more clock edges of said data clock other than the periodic reference edges in response to said synchronizing feature of said synchronization clocking signal; and
said reception node comprises a timing deviation detector configured to detect timing deviations in clock edges of said data clock other than the periodic reference edges.

8. The system according to claim 1, wherein said transmission node is responsive to an externally supplied synchronization clocking signal.

9. The system according to claim 1, wherein said predetermined delay time is substantially equal to a latency time required by said transmission node and said reception node to handle a data element for transmission via said link.

10. The system according to claim 1, wherein said data elements are samples of a one-bit signal.

11. The system according to claim 1, wherein said data elements are plural-bit data words.

12. The system according to claim 11, wherein said data elements comprise audio samples.

13. The system according to claim 12, wherein said data elements are derived from Audio Engineering Standard 3 (AES3) audio sample subframes.

14. The system according to claim 12, wherein said data elements are derived from one-bit, delta-sigma modulated audio samples.

15. The system according to claim 3, wherein:
said data clock defines the timing of individual data bits of each data word;
said transmission node and said reception node operate in accordance with a word clock, being a sub-multiple of said data clock, to define the timing of individual data words.

16. The system according to claim 15, wherein said synchronizing feature of said synchronization clocking signal has a constant temporal relationship to said word clock.

17. The system according to claim 16, wherein said reception node comprises a word clock extractor configured to derive said word clock from said synchronizing features of said synchronization clocking signal.

18. The system according to claim 1, wherein said link is a wired link.

19. The system according to claim 1, wherein said link comprises the physical layer of an Ethernet link.

20. The system according to claim 1, wherein said assembler is configured to set a synchronization flag associated with a data frame containing a data element having a first predetermined temporal relationship with a synchronizing feature of said synchronization clocking signal, and to position such a data element at a predetermined position within that data frame.

21. A data communications system for communicating a data signal formed of successive data elements, said system comprising a transmission node, a reception node, and a link providing a data connection from said transmission node to said reception node,
said transmission node comprising:
- a data clock transmitter configured to transmit a synchronization clocking signal to said reception node via said link, said synchronization clocking signal having synchronizing features occurring at a frequency lower than a data element rate; and
- an assembler configured to assemble elements of said data signal into data frames, each data frame having a plurality of successive data elements of said data signal, for transmission to said reception node via said link, said assembler being responsive to said synchronization clocking signal so as to set a synchronization flag associated with a data element having a first predetermined temporal relationship with a synchronizing feature of said synchronization clocking signal, said assembler comprising a frame assembly arrangement configured to receive input data elements at an input data rate and to buffer the input data elements prior to performing a frame assembly operation in which buffered data is retrieved and assembled to form the framed data, said frame assembly arrangement configured to output said framed data for transmission at a framed data rate; and said reception node comprising:
- a detector configured to detect said synchronizing feature of said synchronization clocking signal received from said transmission node;
- a disassembler comprising a frame receiving arrangement configured to receive framed data from said transmission node at said framed data rate and to buffer said received framed data, and to disassemble said buffered received frame data to regenerate said data signal, said diassembler configured to detect a data element associated with said set synchronization flag; and
- an output unit configured to output said data element associated with said set synchronization flag at a second predetermined temporal relationship with respect to said synchronizing feature of said received synchronization clocking signal, wherein said first and second predetermined temporal relationships are arranged so that a predetermined system latency exists between an input of a data element to said transmission node and a subsequent output of such data element by said reception node, and output of framed data is commenced by said frame assembly arrangement prior to assembly of a complete frame and output of data blocks is commenced by said frame receiving arrangement prior to disassembly of a complete frame of received framed data.

* * * * *